United States Patent
Westerhoff et al.

(10) Patent No.: US 11,328,381 B2
(45) Date of Patent: *May 10, 2022

(54) MULTI-USER MULTI-GPU RENDER SERVER APPARATUS AND METHODS

(71) Applicant: PME IP PTY LTD., Richmond (AU)

(72) Inventors: Malte Westerhoff, Berlin (DE); Detlev Stalling, Berlin (DE)

(73) Assignee: PME IP PTY LTD, Richmond (AU)

( * ) Notice: Subject to any disclaimer, the term of this patent is extended or adjusted under 35 U.S.C. 154(b) by 0 days.

This patent is subject to a terminal disclaimer.

(21) Appl. No.: 16/834,909

(22) Filed: Mar. 30, 2020

(65) Prior Publication Data

US 2020/0226710 A1 Jul. 16, 2020

Related U.S. Application Data

(63) Continuation of application No. 15/853,673, filed on Dec. 22, 2017, now Pat. No. 10,614,543, which is a
(Continued)

(51) Int. Cl.
*G06T 1/20* (2006.01)
*G06T 1/60* (2006.01)
(Continued)

(52) U.S. Cl.
CPC ............... *G06T 1/20* (2013.01); *G06F 3/14* (2013.01); *G06T 15/005* (2013.01); *G09G 5/363* (2013.01);
(Continued)

(58) Field of Classification Search
None
See application file for complete search history.

(56) References Cited

U.S. PATENT DOCUMENTS 2,658,310 A   11/1953 Cook
3,431,200 A   3/1969 Davis et al.
(Continued)

FOREIGN PATENT DOCUMENTS

DE   10317384   4/2004
EP   0492897   7/1992
(Continued)

OTHER PUBLICATIONS

ATI Website Index, http://www.ati.com/developer/index.html, Dec. 20, 2002, 2 pages.
(Continued)

*Primary Examiner* — Tize Ma
(74) *Attorney, Agent, or Firm* — Sci-Law Strategies PC

(57) ABSTRACT

The invention provides, in some aspects, a system for rendering images, the system having one or more client digital data processors and a server digital data processor in communications coupling with the one or more client digital data processors, the server digital data processor having one or more graphics processing units. The system additionally comprises a render server module executing on the server digital data processor and in communications coupling with the graphics processing units, where the render server module issues a command in response to a request from a first client digital data processor. The graphics processing units on the server digital data processor simultaneously process image data in response to interleaved commands from (i) the render server module on behalf of the first client digital data processor, and (ii) one or more requests from (a) the render server module on behalf of any of the other client digital data processors, and (b) other functionality on the server digital data processor.

20 Claims, 20 Drawing Sheets

Related U.S. Application Data continuation of application No. 13/831,967, filed on Mar. 15, 2013, now Pat. No. 9,904,969, which is a continuation-in-part of application No. 13/684,464, filed on Nov. 23, 2012, now Pat. No. 9,355,616, which is a continuation of application No. 12/275,421, filed on Nov. 21, 2008, now Pat. No. 8,319,781.

(60) Provisional application No. 60/989,881, filed on Nov. 23, 2007.

(51) Int. Cl.

| | | |
|---|---|---|
| *G06T 15/00* | (2011.01) | |
| *H04L 67/08* | (2022.01) | |
| *H04L 51/00* | (2022.01) | |
| *G06F 3/14* | (2006.01) | |
| *H04L 12/46* | (2006.01) | |
| *G09G 5/36* | (2006.01) | |
| *H04L 12/413* | (2006.01) | |

(52) U.S. Cl.
CPC ........ *H04L 12/413* (2013.01); *H04L 12/4625* (2013.01); *H04L 51/00* (2013.01); *H04L 67/08* (2013.01); *G06T 2210/52* (2013.01); *G09G 2340/0407* (2013.01); *G09G 2350/00* (2013.01); *G09G 2354/00* (2013.01); *G09G 2360/06* (2013.01); *G09G 2380/08* (2013.01)

(56) References Cited

U.S. PATENT DOCUMENTS

| | | |
|---|---|---|
| 3,645,040 A | 2/1972 | Ort |
| 4,137,868 A | 2/1979 | Pryor |
| 4,235,043 A | 11/1980 | Harasawa et al. |
| 4,258,661 A | 3/1981 | Margen |
| 4,267,038 A | 5/1981 | Thompson |
| 4,320,594 A | 3/1982 | Raymond |
| 4,746,795 A | 5/1988 | Stewart et al. |
| 4,905,148 A | 2/1990 | Crawford |
| 4,910,912 A | 3/1990 | Lowrey, III |
| 4,928,250 A | 5/1990 | Greenberg et al. |
| 4,958,460 A | 9/1990 | Nielson et al. |
| 4,984,160 A | 1/1991 | Saint Felix et al. |
| 5,031,117 A | 7/1991 | Minor et al. |
| 5,091,960 A | 2/1992 | Butler |
| 5,121,708 A | 6/1992 | Nuttle |
| 5,128,864 A | 7/1992 | Waggener et al. |
| 5,218,534 A | 6/1993 | Trousset et al. |
| 5,235,510 A | 8/1993 | Yamada |
| 5,241,471 A | 8/1993 | Trousset et al. |
| 5,253,171 A | 10/1993 | Hsiao et al. |
| 5,274,759 A | 12/1993 | Yoshioka |
| 5,280,428 A | 1/1994 | Wu et al. |
| 5,287,274 A | 2/1994 | Saint Felix et al. |
| 5,293,313 A | 3/1994 | Cecil |
| 5,307,264 A | 4/1994 | Waggener et al. |
| 5,355,453 A | 10/1994 | Row et al. |
| 5,368,033 A | 11/1994 | Moshfeghi |
| 5,375,156 A | 12/1994 | Kuo-Petravic et al. |
| 5,412,703 A | 5/1995 | Goodenough et al. |
| 5,412,764 A | 5/1995 | Tanaka |
| 5,442,672 A | 8/1995 | Bjorkholm et al. |
| 5,452,416 A | 9/1995 | Hilton |
| 5,488,700 A | 1/1996 | Glassner |
| 5,560,360 A | 10/1996 | Filler |
| 5,594,842 A | 1/1997 | Kaufman et al. |
| 5,602,892 A | 2/1997 | Llacer |
| 5,633,951 A | 5/1997 | Moshfeghi |
| 5,633,999 A | 5/1997 | Clowes et al. |
| 5,640,436 A | 6/1997 | Kawai et al. |
| 5,671,265 A | 9/1997 | Andress |
| 5,744,802 A | 4/1998 | Muehllehner et al. |
| 5,774,519 A | 6/1998 | Lindstrom et al. |
| 5,790,787 A | 8/1998 | Scott et al. |
| 5,793,374 A | 8/1998 | Guenter et al. |
| 5,793,879 A | 8/1998 | Benn et al. |
| 5,813,988 A | 9/1998 | Alfano et al. |
| 5,821,541 A | 10/1998 | Tumer |
| 5,825,842 A | 10/1998 | Taguchi |
| 5,838,756 A | 11/1998 | Taguchi et al. |
| 5,841,140 A | 11/1998 | McCroskey et al. |
| 5,909,476 A | 6/1999 | Cheng et al. |
| 5,930,384 A | 7/1999 | Guillemaud et al. |
| 5,931,789 A | 8/1999 | Alfano et al. |
| 5,950,203 A | 9/1999 | Stakuis |
| 5,960,056 A | 9/1999 | Lai |
| 5,963,612 A | 10/1999 | Navab |
| 5,963,613 A | 10/1999 | Navab |
| 5,963,658 A | 10/1999 | Klibanov et al. |
| 6,002,739 A | 12/1999 | Heumann |
| 6,018,562 A | 1/2000 | Willson |
| 6,032,264 A | 2/2000 | Beffa et al. |
| 6,044,132 A | 3/2000 | Navab |
| 6,049,390 A | 4/2000 | Notredame |
| 6,049,582 A | 4/2000 | Navab |
| 6,072,177 A | 6/2000 | Mccroskey et al. |
| 6,088,423 A | 7/2000 | Krug et al. |
| 6,091,422 A | 7/2000 | Ouaknine et al. |
| 6,104,827 A | 8/2000 | Benn et al. |
| 6,105,029 A | 8/2000 | Maddalozzo, Jr. et al. |
| 6,108,007 A | 8/2000 | Shochet |
| 6,108,576 A | 8/2000 | Alfano et al. |
| 6,123,733 A | 9/2000 | Dalton |
| 6,175,655 B1 | 1/2001 | George |
| 6,205,120 B1 | 3/2001 | Packer et al. |
| 6,219,061 B1 | 4/2001 | Lauer et al. |
| 6,226,005 B1 | 5/2001 | Laferriere |
| 6,236,704 B1 | 5/2001 | Navab et al. |
| 6,243,098 B1 | 6/2001 | Lauer et al. |
| 6,249,594 B1 | 6/2001 | Hibbard |
| 6,255,655 B1 | 7/2001 | McCroskey et al. |
| 6,264,610 B1 | 7/2001 | Zhu |
| 6,268,846 B1 | 7/2001 | Georgiev |
| 6,278,460 B1 | 8/2001 | Myers et al. |
| 6,282,256 B1 | 8/2001 | Grass et al. |
| 6,289,235 B1 | 9/2001 | Webber et al. |
| 6,304,771 B1 | 10/2001 | Yodh et al. |
| 6,320,928 B1 | 11/2001 | Valliant et al. |
| 6,324,241 B1 | 11/2001 | Besson |
| 6,377,257 B1 | 4/2002 | Borrel |
| 6,377,266 B1 | 4/2002 | Baldwin |
| 6,384,821 B1 | 5/2002 | Borrel |
| 6,404,843 B1 | 6/2002 | Valliant |
| 6,415,013 B1 | 7/2002 | Hsieh et al. |
| 6,470,067 B1 | 10/2002 | Harding |
| 6,470,070 B2 | 10/2002 | Menhardt |
| 6,473,793 B1 | 10/2002 | Dillon et al. |
| 6,475,150 B2 | 11/2002 | Haddad |
| 6,507,633 B1 | 1/2003 | Elbakri et al. |
| 6,510,241 B1 | 1/2003 | Valliant et al. |
| 6,519,355 B2 | 2/2003 | Nelson |
| 6,526,305 B1 | 2/2003 | Mori |
| 6,557,102 B1 | 4/2003 | Wong et al. |
| 6,559,958 B2 | 5/2003 | Motamed |
| 6,591,004 B1 | 7/2003 | VanEssen et al. |
| 6,615,063 B1 | 9/2003 | Ntziachristos et al. |
| 6,633,688 B1 | 10/2003 | Nixon |
| 6,636,623 B2 | 10/2003 | Nelson et al. |
| 6,654,012 B1 | 11/2003 | Lauer et al. |
| 6,658,142 B1 | 12/2003 | Kam et al. |
| 6,664,963 B1 | 12/2003 | Zatz |
| 6,674,430 B1 | 1/2004 | Kaufman et al. |
| 6,697,508 B2 | 2/2004 | Nelson |
| 6,707,878 B2 | 3/2004 | Claus et al. |
| 6,718,195 B2 | 4/2004 | Van Der Mark et al. |
| 6,731,283 B1 | 5/2004 | Navab |
| 6,740,232 B1 | 5/2004 | Beaulieu |
| 6,741,730 B2 | 5/2004 | Rahn et al. |
| 6,744,253 B2 | 6/2004 | Stolarczyk |
| 6,744,845 B2 | 6/2004 | Harding et al. |
| 6,745,070 B2 | 6/2004 | Wexler et al. |
| 6,747,654 B1 | 6/2004 | Laksono et al. |

(56) References Cited

U.S. PATENT DOCUMENTS

| | | |
|---|---|---|
| 6,754,299 B2 | 6/2004 | Patch |
| 6,765,981 B2 | 7/2004 | Heumann |
| 6,768,782 B1 | 7/2004 | Hsieh et al. |
| 6,770,893 B2 | 8/2004 | Nelson |
| 6,771,733 B2 | 8/2004 | Katsevich |
| 6,778,127 B2 | 8/2004 | Stolarczyk et al. |
| 6,785,409 B1 | 8/2004 | Suri |
| 6,798,417 B1 | 9/2004 | Taylor |
| 6,807,581 B1 | 10/2004 | Starr et al. |
| 6,825,840 B2 | 11/2004 | Gritz |
| 6,825,843 B2 | 11/2004 | Allen et al. |
| 6,923,906 B2 | 8/2005 | Oswald et al. |
| 6,947,047 B1 | 9/2005 | Moy et al. |
| 6,978,206 B1 | 12/2005 | Pu |
| 7,003,547 B1 | 2/2006 | Hubbard |
| 7,006,101 B1 | 2/2006 | Brown et al. |
| 7,031,022 B1 | 4/2006 | Komori et al. |
| 7,034,828 B1 | 4/2006 | Drebin et al. |
| 7,039,723 B2 | 5/2006 | Hu |
| 7,050,953 B2 | 5/2006 | Chiang et al. |
| 7,054,852 B1 | 5/2006 | Cohen |
| 7,058,644 B2 | 6/2006 | Patchet et al. |
| 7,076,735 B2 | 7/2006 | Callegari |
| 7,098,907 B2 | 8/2006 | Houston et al. |
| 7,120,283 B2 | 10/2006 | Thieret |
| 7,133,041 B2 | 11/2006 | Kaufman et al. |
| 7,154,985 B2 | 12/2006 | Dobbs |
| 7,167,176 B2 | 1/2007 | Sloan et al. |
| 7,184,041 B2 | 2/2007 | Heng et al. |
| 7,185,003 B2 | 2/2007 | Bayliss et al. |
| 7,219,085 B2 | 5/2007 | Buck et al. |
| 7,242,401 B2 | 7/2007 | Yang et al. |
| 7,262,770 B2 | 8/2007 | Sloan et al. |
| 7,274,368 B1 | 9/2007 | Keslin |
| 7,299,232 B2 | 11/2007 | Stakutis et al. |
| 7,315,926 B2 | 1/2008 | Fridella et al. |
| 7,324,116 B2 | 1/2008 | Boyd et al. |
| 7,339,585 B2 | 3/2008 | Verstraelen et al. |
| 7,472,156 B2 | 12/2008 | Philbrick et al. |
| 7,502,869 B2 | 3/2009 | Boucher et al. |
| 7,506,375 B2 | 3/2009 | Kanda et al. |
| 7,552,192 B2 | 6/2009 | Carmichael |
| 7,609,884 B1 | 10/2009 | Stalling |
| 7,693,318 B1 | 4/2010 | Stalling |
| 7,701,210 B2 | 4/2010 | Ichinose |
| 7,778,392 B1 | 8/2010 | Bergman |
| 7,876,944 B2 | 1/2011 | Stalling |
| 7,889,895 B2 | 2/2011 | Nowinski |
| 7,899,516 B2 | 3/2011 | Chen et al. |
| 7,907,759 B2 | 3/2011 | Hundley |
| 7,956,612 B2 | 6/2011 | Sorensen |
| 7,983,300 B2 | 7/2011 | Vaughan et al. |
| 7,991,837 B1 | 8/2011 | Tahan |
| 7,995,824 B2 | 8/2011 | Yim |
| 8,107,592 B2 | 1/2012 | Bergman |
| 8,189,002 B1 | 5/2012 | Westerhoff |
| 8,244,770 B2 * | 8/2012 | Turner ............... G06F 16/51 707/796 |
| 8,319,781 B2 | 11/2012 | Westerhoff |
| 8,369,600 B2 | 2/2013 | Can et al. |
| 8,386,560 B2 | 2/2013 | Ma |
| 8,392,529 B2 | 3/2013 | Westerhoff |
| 8,508,539 B2 | 8/2013 | Vlietinck |
| 8,538,108 B2 | 9/2013 | Shekhar |
| 8,542,136 B1 | 9/2013 | Owsley et al. |
| 8,548,215 B2 | 10/2013 | Westerhoff |
| 8,775,510 B2 | 7/2014 | Westerhoff |
| 8,976,190 B1 | 3/2015 | Westerhoff |
| 9,019,287 B2 | 4/2015 | Westerhoff |
| 9,167,027 B2 | 10/2015 | Westerhoff |
| 9,299,156 B2 | 3/2016 | Zalis |
| 9,355,616 B2 | 5/2016 | Westerhoff |
| 9,454,813 B2 | 9/2016 | Westerhoff |
| 9,509,802 B1 | 11/2016 | Westerhoff |
| 9,524,577 B1 | 12/2016 | Westerhoff |
| 9,531,789 B2 | 12/2016 | Westerhoff |
| 9,595,242 B1 | 3/2017 | Westerhoff |
| 9,728,165 B1 | 8/2017 | Westerhoff |
| 9,749,245 B2 | 8/2017 | Stalling |
| 9,860,300 B2 | 1/2018 | Westerhoff |
| 9,898,855 B2 | 2/2018 | Westerhoff |
| 9,904,969 B1 | 2/2018 | Westerhoff |
| 9,984,460 B2 | 5/2018 | Westerhoff |
| 9,984,478 B2 | 5/2018 | Westerhoff |
| 10,038,739 B2 | 7/2018 | Westerhoff |
| 10,043,482 B2 | 8/2018 | Westerhoff |
| 10,070,839 B2 | 9/2018 | Westerhoff |
| 10,311,541 B2 | 6/2019 | Westerhoff |
| 10,320,684 B2 | 6/2019 | Stalling |
| 10,373,368 B2 | 8/2019 | Westerhoff |
| 10,380,970 B2 | 8/2019 | Westerhoff |
| 10,395,398 B2 | 8/2019 | Westerhoff |
| 10,430,914 B2 | 10/2019 | Westerhoff |
| 10,540,803 B2 | 1/2020 | Westerhoff |
| 10,614,543 B2 | 4/2020 | Westerhoff |
| 10,631,812 B2 | 4/2020 | Westerhoff |
| 10,686,868 B2 | 6/2020 | Westerhoff |
| 10,706,538 B2 | 7/2020 | Westerhoff |
| 2001/0026848 A1 | 10/2001 | Van Der Mark |
| 2002/0016813 A1 | 2/2002 | Woods et al. |
| 2002/0034817 A1 | 3/2002 | Henry et al. |
| 2002/0049825 A1 | 4/2002 | Jewett et al. |
| 2002/0080143 A1 | 6/2002 | Morgan et al. |
| 2002/0089587 A1 | 7/2002 | White et al. |
| 2002/0099290 A1 | 7/2002 | Haddad |
| 2002/0099844 A1 | 7/2002 | Baumann et al. |
| 2002/0120727 A1 | 8/2002 | Curley et al. |
| 2002/0123680 A1 | 9/2002 | Vailant |
| 2002/0138019 A1 | 9/2002 | Wexler |
| 2002/0150202 A1 | 10/2002 | Harding |
| 2002/0150285 A1 | 10/2002 | Nelson |
| 2002/0180747 A1 | 12/2002 | Lavelle et al. |
| 2002/0184238 A1 | 12/2002 | Chylla |
| 2002/0184349 A1 | 12/2002 | Manukyan |
| 2003/0001842 A1 | 1/2003 | Munshi |
| 2003/0031352 A1 | 2/2003 | Nelson et al. |
| 2003/0059110 A1 | 3/2003 | Wilt |
| 2003/0065268 A1 | 4/2003 | Chen et al. |
| 2003/0086599 A1 | 5/2003 | Armato |
| 2003/0103666 A1 | 6/2003 | Edie et al. |
| 2003/0120743 A1 | 6/2003 | Coatney et al. |
| 2003/0123720 A1 | 7/2003 | Launav et al. |
| 2003/0149812 A1 | 8/2003 | Schoenthal et al. |
| 2003/0158786 A1 | 8/2003 | Yaron |
| 2003/0176780 A1 | 9/2003 | Arnold |
| 2003/0179197 A1 | 9/2003 | Sloan et al. |
| 2003/0194049 A1 | 10/2003 | Claus et al. |
| 2003/0220569 A1 | 11/2003 | Dione |
| 2003/0220772 A1 | 11/2003 | Chiang et al. |
| 2003/0227456 A1 | 12/2003 | Gritz |
| 2003/0234791 A1 | 12/2003 | Boyd et al. |
| 2004/0010397 A1 | 1/2004 | Barbour et al. |
| 2004/0012596 A1 | 1/2004 | Allen et al. |
| 2004/0015062 A1 | 1/2004 | Ntziachristos et al. |
| 2004/0022348 A1 | 2/2004 | Heumann |
| 2004/0059822 A1 | 3/2004 | Jiang |
| 2004/0066384 A1 | 4/2004 | Ohba |
| 2004/0066385 A1 | 4/2004 | Kilgard |
| 2004/0066891 A1 | 4/2004 | Freytag |
| 2004/0078238 A1 | 4/2004 | Thomas et al. |
| 2004/0102688 A1 | 5/2004 | Walker |
| 2004/0125103 A1 | 7/2004 | Kaufman |
| 2004/0133652 A1 | 7/2004 | Miloushev et al. |
| 2004/0147039 A1 | 7/2004 | Van Der Mark |
| 2004/0162677 A1 | 8/2004 | Bednar |
| 2004/0170302 A1 | 9/2004 | Museth et al. |
| 2004/0210584 A1 | 10/2004 | Nir et al. |
| 2004/0215858 A1 | 10/2004 | Armstrong et al. |
| 2004/0215868 A1 | 10/2004 | Solomon et al. |
| 2004/0239672 A1 | 12/2004 | Schmidt |
| 2004/0240753 A1 | 12/2004 | Hu |
| 2005/0012753 A1 | 1/2005 | Karlov |
| 2005/0017972 A1 | 1/2005 | Poole et al. |
| 2005/0066095 A1 | 3/2005 | Mullick et al. |

(56) References Cited

U.S. PATENT DOCUMENTS

| | | |
|---|---|---|
| 2005/0088440 A1 | 4/2005 | Sloan et al. |
| 2005/0128195 A1 | 6/2005 | Houston et al. |
| 2005/0152590 A1 | 7/2005 | Thieret |
| 2005/0165623 A1 | 7/2005 | Landi et al. |
| 2005/0225554 A1 | 10/2005 | Bastos et al. |
| 2005/0231503 A1 | 10/2005 | Heng et al. |
| 2005/0239182 A1 | 10/2005 | Berzin |
| 2005/0240628 A1 | 10/2005 | Jiang et al. |
| 2005/0256742 A1 | 11/2005 | Kohan et al. |
| 2005/0259103 A1 | 11/2005 | Kilgard et al. |
| 2005/0270298 A1 | 12/2005 | Thieret |
| 2005/0271302 A1 | 12/2005 | Khamene et al. |
| 2006/0010438 A1 | 1/2006 | Brady et al. |
| 2006/0010454 A1 | 1/2006 | Napoli et al. |
| 2006/0028479 A1 | 2/2006 | Chun |
| 2006/0034511 A1 | 2/2006 | Verstraelen |
| 2006/0066609 A1 | 3/2006 | Iodice |
| 2006/0197780 A1 | 9/2006 | Watkins et al. |
| 2006/0214949 A1 | 9/2006 | Zhang |
| 2006/0239540 A1 | 10/2006 | Serra |
| 2006/0239589 A1 | 10/2006 | Omernick |
| 2006/0282253 A1 | 12/2006 | Buswell et al. |
| 2007/0005798 A1 | 1/2007 | Gropper et al. |
| 2007/0038939 A1 | 2/2007 | Challen |
| 2007/0046966 A1 | 3/2007 | Mussack |
| 2007/0067497 A1 | 3/2007 | Craft et al. |
| 2007/0092864 A1 | 4/2007 | Reinhardt |
| 2007/0097133 A1 | 5/2007 | Stauffer et al. |
| 2007/0116332 A1 | 5/2007 | Cai et al. |
| 2007/0127802 A1 | 6/2007 | Odry |
| 2007/0156955 A1 | 7/2007 | Royer, Jr. |
| 2007/0165917 A1 | 7/2007 | Cao et al. |
| 2007/0185879 A1 | 8/2007 | Roublev et al. |
| 2007/0188488 A1 | 8/2007 | Choi |
| 2007/0226314 A1 | 9/2007 | Eick et al. |
| 2007/0255704 A1 | 11/2007 | Baek et al. |
| 2007/0280518 A1 | 12/2007 | Nowinski |
| 2008/0009055 A1 | 1/2008 | Lewnard |
| 2008/0042923 A1 | 2/2008 | De Laet |
| 2008/0086557 A1 | 4/2008 | Roach |
| 2008/0115139 A1 | 5/2008 | Inglett et al. |
| 2008/0137929 A1 | 6/2008 | Chen et al. |
| 2008/0147554 A1 | 6/2008 | Stevens et al. |
| 2008/0155890 A1 | 7/2008 | Oyler |
| 2008/0174593 A1 | 7/2008 | Ham |
| 2008/0208961 A1 | 8/2008 | Kim et al. |
| 2008/0224700 A1 | 9/2008 | Sorensen |
| 2008/0281908 A1 | 11/2008 | McCanne et al. |
| 2008/0317317 A1 | 12/2008 | Shekhar |
| 2009/0005693 A1 | 1/2009 | Brauner et al. |
| 2009/0043988 A1 | 2/2009 | Archer et al. |
| 2009/0077097 A1 | 3/2009 | Lacapra et al. |
| 2009/0147793 A1 | 6/2009 | Hayakawa et al. |
| 2009/0208082 A1 | 8/2009 | Westerhoff et al. |
| 2009/0210487 A1 | 8/2009 | Westerhoff et al. |
| 2009/0225076 A1 | 9/2009 | Vlietinck |
| 2009/0245610 A1 | 10/2009 | Can et al. |
| 2009/0313170 A1 | 12/2009 | Goldner et al. |
| 2010/0054556 A1 | 3/2010 | Novatzky |
| 2010/0060652 A1 | 3/2010 | Karlsson |
| 2010/0123733 A1 | 5/2010 | Zaharia |
| 2010/0174823 A1 | 7/2010 | Huang |
| 2010/0272342 A1 | 10/2010 | Berman et al. |
| 2010/0278405 A1 | 11/2010 | Kakadiaris et al. |
| 2011/0044524 A1 | 2/2011 | Wang et al. |
| 2011/0112862 A1 | 5/2011 | Yu |
| 2012/0078088 A1 | 3/2012 | Whitestone et al. |
| 2012/0226916 A1 | 9/2012 | Hahn |
| 2012/0233153 A1 | 9/2012 | Roman et al. |
| 2013/0176319 A1 | 7/2013 | Westerhoff |
| 2013/0195329 A1 | 8/2013 | Canda |
| 2015/0213288 A1 | 7/2015 | Bilodeau et al. |
| 2016/0012181 A1 | 1/2016 | Massey |
| 2017/0011514 A1 | 1/2017 | Westerhoff |
| 2017/0346883 A1 | 3/2017 | Westerhoff |
| 2017/0098329 A1 | 4/2017 | Westerhoff |
| 2017/0104811 A1 | 4/2017 | Westerhoff |
| 2017/0178593 A1 | 6/2017 | Westerhoff |
| 2019/0318512 A1 | 10/2019 | Westerhoff |

FOREIGN PATENT DOCUMENTS

| | | |
|---|---|---|
| EP | 0502187 | 9/1992 |
| EP | 0611181 | 8/1994 |
| EP | 0476070 | 8/1996 |
| EP | 0925556 | 6/1999 |
| EP | 0953943 | 11/1999 |
| EP | 0964 366 | 12/1999 |
| EP | 187340 | 3/2001 |
| EP | 2098895 | 9/2009 |
| EP | 2098994 | 9/2009 |
| EP | 2405344 | 1/2012 |
| WO | WO9016072 | 12/1990 |
| WO | WO9102320 | 2/1991 |
| WO | WO9205507 | 4/1992 |
| WO | WO9642022 | 12/1996 |
| WO | WO9810378 | 3/1998 |
| WO | WO9812667 | 3/1998 |
| WO | WO9833057 | 7/1998 |
| WO | WO0120546 | 3/2001 |
| WO | WO0134027 | 5/2001 |
| WO | WO0163561 | 8/2001 |
| WO | WO0174238 | 10/2001 |
| WO | WO0185022 | 11/2001 |
| WO | WO0241760 | 5/2002 |
| WO | WO02067201 | 8/2002 |
| WO | WO02082065 | 10/2002 |
| WO | WO03061454 | 7/2003 |
| WO | WO03088133 | 10/2003 |
| WO | WO03090171 | 10/2003 |
| WO | WO03098539 | 11/2003 |
| WO | WO04019782 | 3/2004 |
| WO | WO04020996 | 3/2004 |
| WO | WO04020997 | 3/2004 |
| WO | WO04034087 | 4/2004 |
| WO | WO04044848 | 5/2004 |
| WO | WO04066215 | 8/2004 |
| WO | WO04072906 | 8/2004 |
| WO | WO05071601 | 8/2005 |
| WO | WO09029636 | 3/2009 |
| WO | WO09067675 | 5/2009 |
| WO | WO09067680 | 5/2009 |
| WO | WO11065929 | 6/2011 |
| WO | WO2015063188 | 5/2015 |

OTHER PUBLICATIONS

Boone et al., Recognition of Chest Radiograph Orientation for Picture Archiving and Communications Systems Display Using Neural Networks, J. Digital Imaging, 1992, 5(3), 190-193.

Boone et al., Automated Recognition of Lateral from PA Chest Radiographs: Saving Seconds in a PACS Environment, J. Digital Imaging, 2003, 16(4), 345-349.

Luo et al., Automatic Image Hanging Protocol for Chest Radiographs in a PACS, IEEE Transactions on Information Technology in Biomedicine, 2006, 10(2), 302-311.

Cabral et al., Accelerated Volume Rendering and Tomographic Reconstruction Using Texture Mapping Hardware•, Silicon Graphics Computer Systems, 1995 IEEE, DD. 91-97.

Carr, Nathan A., Jesse D. Hall, John C. Hart, The ray engine, Proceedings of the ACM SIGGRAPH/EUROGRAPHICS conference on Graphics hardware, Sep. 1-2, 2002, pp. 37-46.

Chidlow, et al., Rapid Emission Tomography Reconstruction, Proceedings of the 2003 Eurographics/IEEE TVCG Workshop on Volume Graphics, Tokyo, Japan, Jul. 7-8, 2003, 13 pages.

Cohen, Michael, et al., A Progressive Refinement Approach to Fast Radiosity Image Generation, Computer Graphics, vol. 22, No. 4, Aug. 1988, pp. 75-84.

Corner, B., University of Nebraska-Lincoln, MatLab.txt, 2003, 1 page.

(56) References Cited

OTHER PUBLICATIONS

Dachille, et al., High-Quality Volume Rendering Using Texture Mapping Hardware, Siggraph/Eurographics Hardware Workshop (1998) (8 pages).
Dempster, et al., Maximum Likelihood From Incomplete Data Via The EM Algorithm, Harvard University and Educational Testing Service, Dec. 8, 1976, pp. 1-38.
Dennis, C, et al. Overview of X-Ray Computed Tomography, http://www.howstuffworks.com/framed.htm?parent=c...tm&url=http://www.ctlab.geo.utexas.edu/overview/, Dec. 26, 2002, 5 pages.
Dobbins, et al., Digital X-Ray Tomosynthesis: Current State of the Art and Clinical Potential, Physics in Medicine and Biology, vol. 48, pp. R65-R106 (2003).
Doggett, Michael, ATI, Programmability Features of Graphics Hardware, (paper) Apr. 23, 2002, pp. C1-C22.
Doggett, Michael, ATI, Programmability Features of Graphics Hardware, (slideshow) slides 1-62 31 pages.
Du, H., Sanchez-Elez, M., Tabrizi, N., Bagherzadeh, N., Anido, M. L., and Fernandez, M. 2003. Interactive ray tracing on reconfigurable SIMD MorphoSys. In Proceedings of the 2003 Conference on Asia South Pacific Design Automation (Kitakyushu, Japan, Jan. 21-24, 2003). ASPDAC. ACM, New York, NY, 471-476.
Eldridge Matthew, Homan Igehy, Pat Hanrahan, Pomegranate: a fully scalable graphics architecture, Proceedings of the 27th annual conference on Computer graphics and interactive techniques, p. 443-454, Jul. 2000.
Fang, L., et al., Fast Maximum Intensity Projection Algorithm Using Shear Warp Factorization and Reduced Resampling, Mangetic Resonance in Medicine 47:696-700 (2002).
Filtered Backprojection Reconstruction, http://www.physics.ubd.ca/-mirg/home/tutorial/fbDrecon.html, 216/2003, 5 pages.
Goddard et al., High-speed cone-beam reconstruction: an embedded systems approach, 2002, SPIE vol. 4681, pp. 483-491.
Grass et al., Three-dimensional reconstruction of high contrast objects using C-arm image intensifier projection data, 1999, Computerized Medical Imaging and Graphics, 23, pp. 311-321.
Hadwiger, Markus, et al., Hardware-Accelerated High-Quality Reconstruction of Volumetric Data on PC Graphics Hardware, VRVis Research Center, Vienna, Austria, and Institute of Computer Graphics and Algorithms, Vienna University of Technology, Austria, 9 pages.
Hastreiter et al. (Integrated registration and visualization of medical image data, Proc. Computer Graphics International, Jun. 22-26, 1998, pp. 78-85).
Hopf, M., Ertl, T., Accelerating 3d Convolution Using Graphics Hardware, Proc. IEEE Visualization, 1999, 5 pages.
Hudson, et al., Accelerated Image Reconstruction Using Ordered Subsets of Projection Data, IEEE Transactions on Medical Imaging, vol. 13, No. 4, Dec. 1994, pp. 601-609.
Image Registration Slideshow, 105 pages.
Iterative definition, Merriam-Webster on-line dictionary, printed Aug. 26, 2010, 3 pages.
Jain, Anju, A Programmable Graphics Chip, pcquest.com, Jun. 18, 2001.
Jones et al., Positron Emission Tomographic Images And Expectation Maximization: A VLSI Architecture For Multiple Iterations Per Second, Computer Technology and Imaging, Inc., 1988 IEEE, pp. 620-624.
Kajiya, J. T., Ray tracing Volume densities, Proc. Siggraph, Jul. 1984, Computer Graphics, vol. 18, No. 3,pp. 165-174.
Karlsson, Filip; Ljungstedt, Carl Johan; Ray tracing fully implemented on programmable graphics hardware, Master's Thesis, Chalmers University of Technology, Dept. of Computer Engineering, Goteborg, Sweden, copyright © 2004, 29 pages.
Kruger J. and R. Westermann, Acceleration Techniques for GPU-based Volume Rendering, Proceedings of IEEE Visualization, 2003, 6 pages.
Lange et al., EM Reconstruction Algorithms For Emission And Transmission Tomography, J Computer Assisted Tomography 8, DD. 306, et seq. (1984).
Lange et al., Globally Convergent Algorithms for Maximum a Posteriori Transmission Tomography, IEEE Transactions on Image Processing, Vo. 4, No. 10, Oct. 1995, pp. 1430-1438.
Li et al., Tomographic Optical Breast Imaging Guided by Three-Dimensional Mammography, Applied Optics, Sep. 1, 2003, vol. 42, No. 25, pp. 5181-5190.
Li, et al., A Brick Caching Scheme for 30 Medical Imaging, Apr. 15-18, 2004, IEEE International Symposium on Biomedical Imaging: Macro to Nano 2004, vol. 1, pp. 563-566.
Maes, et al. Multimodality Image Registration by Maximization of Mutual Information, IEEE Tran. on Medical Imaging, vol. 16, No. 2, Apr. 1997. pp. 187-198).
Max, N., Optical Models for Direct Volume Rendering, IEEE Transactions On Visualization and Computer Graphics, Jun. 1995, 1(2): pp. 99-108.
McCool, M. et al., Shader Algebra, 2004, pp. 787-795.
McCool, Michael J., Smash: A Next-Generation API for Programmable Graphics Accelerators, Technical Report CS-200-14, Computer Graphics Lab Dept. of Computer Science, University of Waterloo, Aug. 1, 2000.
Microsoft, Architectural Overview Direct for 3D, http://msdn.microsoft.com/library/default.asp?url=/library/en-US/dx8_c/directx_cpp/Graphics/ProgrammersGuide/GettingStarted/ Architecture, 12120/2002, 22 pages.
Mitchell, Jason L., RadeonTM 9700 Shading, SIGGRAPH 2002—State of the Art in Hardware Shading Course Notes, DD.3.1-1-3. 1-39, 39 pages.
Mitschke et al., Recovering the X-ray projection geometry for three-dimensional tomographic reconstruction with additional sensors: Attached camera versus external navigation system, 2003, Medical Image Analysis, vol. 7, pp. 65-78.
Mueller, K., and R. Yagel, Rapid 3-D Cone Beam Reconstruction With The Simultaneous Algebraic Reconstruction Technique (SART) Using 2-D Texture Mapping Hardware, IEEE Transactions On Medical Imaging, Dec. 2000, 19(12): pp. 1227-1237.
Navab, N., et al., 3D Reconstruction from Projection Matrices in a C-Arm Based 3D-Angiography System, W.M. Wells e al., eds., MICCAI'98, LNCS 1496, pp. 119-129, 1998.
Parker, S., et al., Interactive Ray Tracing for Isosurface rendering, IEEE, 1998, pp. 233-258.
PCT/US2008/084282, Preliminary and International Search Reports, dated May 11, 2011, 7 pages.
PCT/US2005/000837, Preliminary and International Search Reports, dated May 11, 2005, 7 pages.
PCT/US2008/74397, Preliminary and International Search Reports, dated Dec. 3, 2008,7 pages.
PCT/US2008/84368, Preliminary and International Search Reports, dated Jan. 13, 2009, 7 pages.
PCT/EP2016/067886, Preliminary and International Search Reports, dated Jan. 17, 2017, 18 pages.
PCT/EP2018/075744, Preliminary and International Search Reports, dated Feb. 1, 2019, 17 pages.
PCT/US2008/84376, Preliminary and International Search Reports, dated Jan. 12, 2009, 6 pages.
JP2018-524544, Office Action, dated Jun. 2, 2020, 4 pages (& English translation).
EP3329405, Office Action, dated Apr. 6, 2020, 5 pages.
Pfister, H., et al., The VolumePro real-time ray-casting System, Computer Graphics Proceedings of SIGGRAPH), Aug. 1999, No. 251-260.
Phong, B. T. Illumination for Computer Generated Pictures, Communications of the ACM, 18(6), Jun. 1975, pp. 311-317.
Porter, D. H. 2002. Volume Visualization of High Resolution Data using PC-Clusters. Tech. rep., University of Minnesota. Available at http://www.lcse.umn.edu/hvr/pc_vol_rend_L.pdf.
Potmesil, M. and Hoffert, E. M. 1989. The pixel machine: a parallel image computer. In Proceedings of the 16th Annual Conference on Computer Graphics and interactive Techniques SIGGRAPH '89. ACM, New York, NY, 69-78.
Purcell, T., et al., Real-time Ray Tracing on Programmable Graphics Hardware, Department of Computer Science, Stanford University, Stanford, CA, Submitted for review to SIGGRAPH 2002, 2002. http://graphics.stanford.edu/papers/rtongfx/rtongfx_submit.pdf.

(56) References Cited

OTHER PUBLICATIONS

Purcell, T., et al., Ray tracings on Programmable Graphics Hardware, Computer Graphics (Proceedings of SIGGRAPH), 1998, pp. 703-712.
Purcell, Timothy J., Craig Donner, Mike Cammarano, Henrik Wann Jensen, Pat Hanrahan, Photon mapping on programmable graphics hardware, Proceedings of the ACM SIGGRAPH/EUROGRAPHICS conference on Graphics hardware, Jul. 26-27, 2003, 11 pages.
Ramirez et al. (Prototypes stability analysis in the design of a binning strategy for mutual information based medical image registration, IEEE Annual Meeting of the Fuzzy Information, Jun. 27-30, 2004, vol. 2, pp. 862-866.
Rib Cage Projection, downloaded from http://www.colorado.edu/physics/2000/tomography/final_rib_cage.html on Dec. 26, 2002, 3 pages.
Roettger, Stefan, et al., Smart Hardware-Accelerated Volume Rendering, Joint EUROGRAPHICS—IEEE TCVG Symposium on Visualization, 2003, pp. 231-238, 301.
Sandborg, Michael, Computed Tomography: Physical principles and biohazards, Department of Radiation Physics, Faculty of Health Sciences, Linkoping University, Sweden, Report 81 ISSN 1102-1799, Sep. 1995 ISRN ULI-RAD-R-81-SE, 18 pages.
Sarrut et al. (Fast 30 Image Transformations for Registration Procedures, Proc. Int. Conf, on Image Analysis and Processing, Sep. 27-29, 1999, pp. 446-451.
Selldin, Hakan, Design and Implementation of an Application Programming Interface for Volume Rendering, Linkopings Universitet.
Shekhar, R.; Zagrodsky, V., Cine MPR: interactive multiplanar reformatting of four-dimensional cardiac data using hardware-accelerated texture mapping, IEEE Transactions on Information Technology in Biomedicine, vol. 7, No. 4, pp. 384-393, Dec. 2003.
Silver, et al., Determination and correction of the wobble of a C-arm gantry, Medical Imaging 2000: Image Processing, Kenneth M. Hanson, ed., Proceedings of SPIE vol. 3970 (2000).
Stevens, Grant, et al., Alignment of a Volumetric Tomography System, Med. Phys., 28 (7), Jul. 2001.
Tao, W., Tomographic mammography using a limited number of low dose cone beam projection images, Medical Physics, AIP, Melville, NY vol. 30, pp. 365-380, Mar. 2003, ISSN: 0094-2405.
Tasdizen, T., Ross Whitaker, Paul Burchard, Stanley Osher, Geometric surface processing via normal maps, ACM Transactions on Graphics (TOG), v.22 n.4, p. 1012-1033, Oct. 2003.
Tasdizen, T.; Whitaker, R.; Burchard, P.; Osher, S.; Geometric surface smoothing via anisotropic diffusion of normals, IEEE Visualization, VIS 2002, Nov. 2002, pp. 125-132.
Technical Brief: NVIDIA nfiniteFX Engine: Programmable Pixel Shaders, NVIDIA Corporation, 5 pages.
Technical Brief: NVIDIA nfiniteFX Engine: Programmable Vertex Shaders, NVIDIA Corporation, 12 pages.
Viola, I, et al., Hardware Based Nonlinear Filtering and Segmentation Using High Level Shading Languages, Technical Report TR-186-03-07, May 2003, 8 pages.
Viola, P., Alignment by Maximization of Mutual Information, PhD Thesis MIT (Also Referred To As—A1 Technical report No. 1548), MIT Artificial Intelligence Lab, Jun. 1, 1995, pp. 1-29.
Weiler, M, M. Kraus and T. Ertl, Hardware-Based View-Independent Cell Projection, Proceedings IEEE Symposium on Volume Visualization 2002, pp. 13-22.
Weiler, M. et al., Hardware-based ray casting for tetrahedral meshes, IEEE Visualization, VIS 2003,Oct. 24-24, 2003, pp. 333-340.
Weiler, M. et al., Hardware-Based view-independent Cell Projection, IEEE, 2002, pp. 13-22.
Weiskopf, D., T. Schafhitzel, T. Ertl, GPU-Based Nonlinear Ray Tracing, EUROGRAPHICS, vol. 23, No. 3, Aug. 2004.
Wen, Junhai; Zigang Wang; Bin Li; Zhengrong Liang; An investigation on the property and fast implementation of a ray-driven method for inversion of the attenuated Radon transform with variable focusing fan-beam collimators, 2003 IEEE Nuclear Science Symposium Conference Record, vol. 3, Oct. 19-25, 2003, pp. 2138-2142.
Wikipedia, Anonymous, 'Volume Rendering' May 30, 2015, retrieved Nov. 4, 2016, https://en.wikipedia.org/w/index.php?title=Volume_rendering&oldid=664765767.
Wikipedia, Anonymous, 'Tomographic Reconstruction' Dec. 6, 2014, retrieved Nov. 4, 2016, https://en.wikipedia.org/w/index.php?title=Tomographic_Reconstruction&oldid=636925688.
Wu et al., Tomographic Mammography Using A Limited Number of Low-dose Conebeam Projection Images, Med. Phys., pp. 365-380 (2003).
Xu et al., Toward a Unified Framework for Rapid 30 Computed Tomography on Commodity GPUs, Oct. 19-25, 2003, IEEE Nuclear Science Symposium Conference 2003, vol. 4, pp. 2757-2759.
Xu et al., Ultra-fast 30 Filtered Backprojection on Commodity Graphics Hardware, Apr. 1-18, 2004, IEEE International symposium on Biomedical Imaging: Macro to Nano, vol. 1, pp. 571-574 and corresponding power point presentation.

* cited by examiner

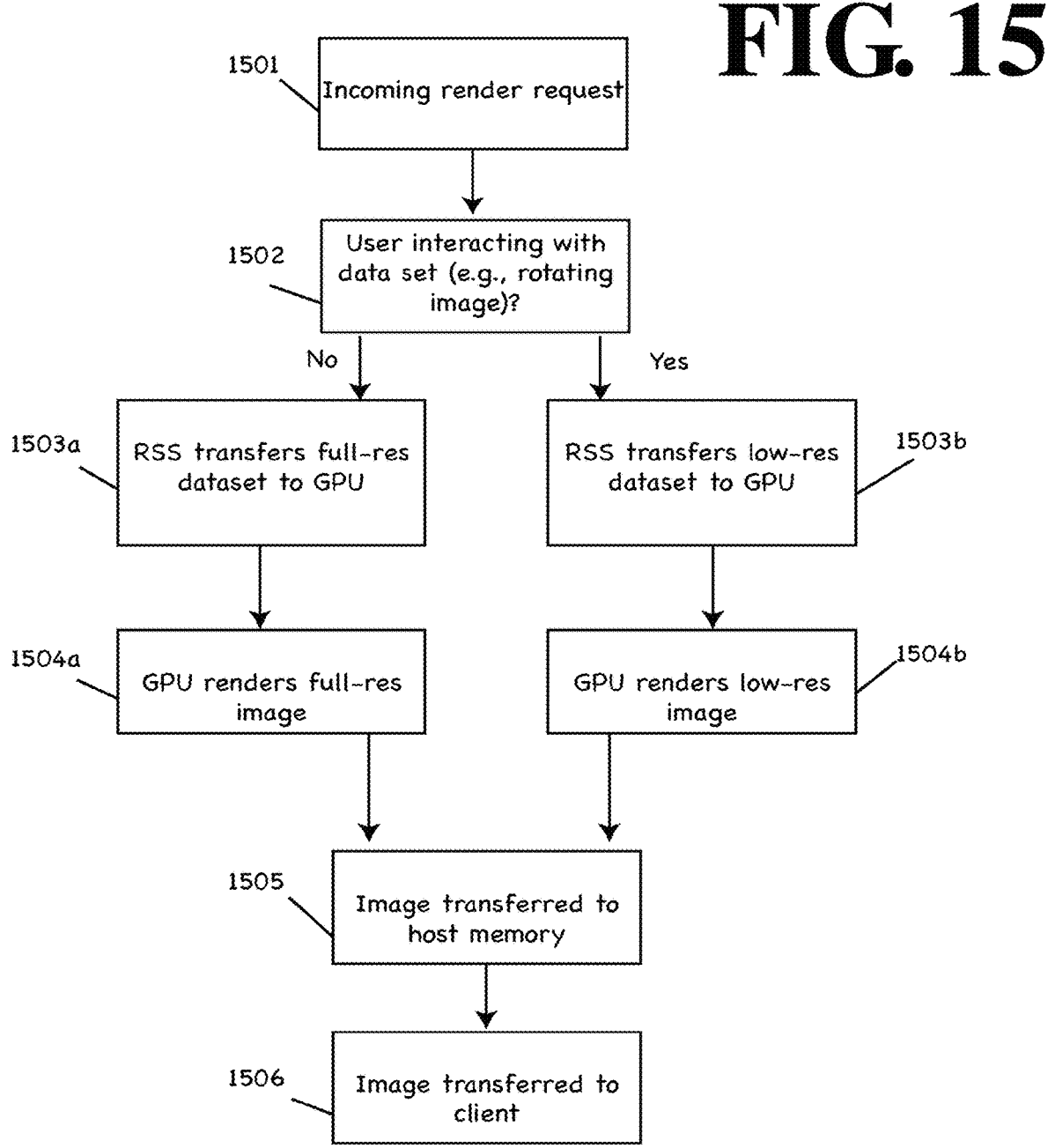

FIG. 20

List of Auto-Prior Rules

| Prior Chest CR |

○ System  ● User

[New Rule] [Move to System] [Delete Rule] [Properties...]

Auto-Prior Rule Properties

Name: Prior Chest CR
User Levels:
Comment: For any current chest study CR load prior CT or CR exams of the chest
Other: ☐ Disable    ☐ Overwrite system rule Current study must match all of the following:
- All of the following
  - Modality | Contains Any Of | CR CT
  - Any of the following
    - Body Part Examined | Equals | CHEST
    - Study Description | Contains Any Of | CHEST THORAX Prior study must match all of the following:
- All of the following
  - Modality | Contains Any Of | CR
  - Any of the following
    - Body Part Examined | Equals | CHEST
    - Study Description | Contains Any Of | CHEST THORAX

[Save] [Cancel]

MULTI-USER MULTI-GPU RENDER SERVER APPARATUS AND METHODS

This application is a continuation of (1) U.S. application Ser. No. 15/853,673 filed Dec. 22, 2017, which is a continuation of (2) U.S. application Ser. No. 13/831,967 filed Mar. 15, 2013, which issued Feb. 27, 2018 as U.S. Pat. No. 9,904,969, which is a continuation in part of (3) U.S. application Ser. No. 13/684,464 filed Nov. 23, 2012 which issued May 31, 2016 as U.S. Pat. No. 9,355,616 and which claims priority to (4) U.S. application Ser. No. 12/275,421 filed Nov. 21, 2008 which issued Nov. 27, 2012 as U.S. Pat. No. 8,319,781 and which claims the benefit of priority of (5) U.S. Provisional Patent Application Ser. No. 60/989,881, filed Nov. 23, 2007, the teachings of (1)-(5) are herein expressly incorporated by reference in their entireties.

BACKGROUND OF THE INVENTION

The invention pertains to digital data processing and, more particularly, by way of example, to the visualization of image data. It has application to areas including medical imaging, atmospheric studies, astrophysics, microscopy, spectroscopy, satellite imaging, and geophysics.

3D and 4D image data is routinely acquired with computer tomographic scanners (CT), magnetic resonance imaging scanners (MRI), confocal microscopes, 3D ultrasound devices, positron emission tomographics (PET) and other imaging devices. The medical imaging market is just one example of a market that uses these devices. It is growing rapidly, with new CT scanners collecting ever greater amounts of data even more quickly than previous generation scanners. As this trend continues across many markets, the demand for better and faster visualization methods that allow users to interact with the image data in real-time will increase.

Standard visualization methods fall within the scope of volume rendering techniques (VRT), shaded volume rendering techniques (sVRT), maximum intensity projection (MIP), oblique slicing or multi-planar reformats (MPR), axial/sagittal and coronal slice display, and thick slices (also called slabs). In the following, these and other related techniques are collectively referred to as "volume rendering." In medical imaging, for example, volume rendering is used to display 3D images from 3D image data sets, where a typical 3D image data set is a large number of 2D slice images acquired by a CT or MRI scanner and stored in a data structure.

The rendition of such images can be quite compute intensive and therefore takes a long time on a standard computer, especially, when the data sets are large. Too long compute times can, for example, prevent the interactive exploration of data sets, where a user wants to change viewing parameters, such as the viewing position interactively, which requires several screen updates per second (typically 5-25 updates/second), thus requiring rendering times of fractions of a second or less per image.

Several approaches have been taken to tackle this performance problem. Special-purchase chips have been constructed to implement volume rendering in hardware. Another approach is to employ texture hardware built into high-end graphics workstations or graphics super-computers, such as for example Silicon Graphics Onyx computers with Infinite Reality and graphics. More recently, standard graphics boards, such as NVIDIA's Geforce and Quadro FX series, as well as AMD/ATI's respective products, are also offering the same or greater capabilities as far as programmability and texture memory access are concerned.

Typically hardware for accelerated volume rendering must be installed in the computer (e.g., workstation) that is used for data analysis. While this has the advantage of permitting ready visualization of data sets that are under analysis, it has several drawbacks. First of all, every computer which is to be used for data analysis needs to be equipped with appropriate volume-rendering hardware, as well as enough main memory to handle large data sets. Second the data sets often need to be transferred from a central store (e.g., a main enterprise server), where they are normally stored, to those local Workstations prior to analysis and visualization, thus potentially causing long wait times for the user during transfer.

Several solutions have been proposed in which data processing applications running on a server are controlled from a client computer, thus, avoiding the need to equip it with the full hardware needed for image processing/visualization and also making data transfer to the client unnecessary. Such solutions include Microsoft's Windows 2003 server (with the corresponding remote desktop protocol (RDP)), Citrix Presentation Server, VNC, or SGI's OpenGL Vizserver. However, most of these solutions do not allow applications to use graphics hardware acceleration. The SGI OpenGL Vizserver did allow hardware accelerated graphics applications to be run over the network: it allocated an InfiniteReality pipeline to an application controlled over the network. However that pipeline could then not be used locally any longer and was also blocked for other users. Thus effectively all that the Vizserver was doing was extending a single workplace to a different location in the network. The same is true for VNC.

For general graphics applications (i.e., not specifically volume rendering applications), such as computer games, solutions have been proposed to combine two graphics cards on a single computer (i.e., the user's computer) in order to increase the rendering performance, specifically NVIDIA's SLI and AMD/ATI's Crossfire products. In these products, both graphics cards receive the exact same stream of commands and duplicate all resources (such as textures). Each of the cards then renders a different portion of the screen or in another mode one of the cards renders every second image and the other card renders every other image. While such a solution is transparent to the application and therefore convenient for the application developers it is very limited, too. Specifically the duplication of all textures effectively eliminates half of the available physical texture memory.

An object of the invention is to provide digital data processing methods and apparatus, and more particularly, by way of example, to provide improved such methods and apparatus for visualization of image data.

A further object of the invention is to provide methods and apparatus for rendering images.

A still further object of the invention is to provide such methods and apparatus for rendering images as have improved real-time response to a user's interaction.

Yet a still further object of the invention is to provide such methods and apparatus as allow users to interactively explore the rendered images.

SUMMARY OF THE INVENTION

The aforementioned are among the objects attained by the invention, which provides, in one aspect, a graphics system including a render server that has one or more graphics boards in one or more host systems. One or more client computers can simultaneously connect to the render server, which receives messages from the client computers, creates rendered images of data set and sends those rendered images to the client computers for display.

Related aspects of the invention provide a graphics system, for example, as described above in which rendered data sets are kept in memory attached to the render server, such as RAM memory installed in the host systems, e.g., for reuse in response to subsequent messaging by the client computers.

Further related aspects of the invention provide a graphics system, for example, as described above in which the render server maintains a queue of so-called render requests, i.e., a list of images to render. These can comprise render requests received directly in messages from the client computers and/or they can comprise requests generated as a result of such messages. One message received from the client computer can result in zero, one, or multiple render requests being generated.

A further aspect of the invention provides a graphics system, for example, of the type described above, in which the render server breaks down selected ones of the render requests into multiple smaller requests, i.e., requests which require less compute time and/or less graphics resources. A related aspect of the invention provides for scheduling the smaller (and other) requests so as to minimize an average time that a client computer waits for a response to a request. This allows (by way of non-limiting example) for concurrent treatment of requests and for serving multiple client computers with a single GPU without compromising interactivity.

Another aspect of the invention provides a graphics system, For example, of the type described above, that processes render requests in an order determined by a prioritization function that takes into account the nature of the request (e.g., interactive rendering vs. non-interactive), the client from which the request was received, the order in which the requests were received, the resources currently allocated on the graphics boards, and/or other parameters.

Yet another aspect of the invention provides a graphics system, for example, of the type described above that processes multiple render requests simultaneously. The render server of such a system can, for example, issue multiple render commands to a single graphics board and process them in time slices (in a manner analogous to a multi-tasking operating system on a CPU), thereby switching between processing different render requests multiple times before a single render request is completed.

A related aspect of the invention provides a system, for example, as described above wherein the render server combines render requests for simultaneous processing in such a way, that their total graphics resource requirements can be satisfied by resources (e.g., texture and frame buffer memory) on-board a single graphics board. This allows (by way of example) time-slicing between the simultaneously processed render requests without the computationally expensive swapping of graphics memory chunks in and out of main memory of the host (i.e., "host memory").

Another aspect of the invention provides a graphics system, for example, of the type described above, that renders images at different resolution levels, e.g., rendering a low-resolution image from a low-resolution version of the input data while rotating the data set, thus enabling faster rendering times and thereby smoother interaction. A related aspect of the invention provides such a system that adapts the resolution to the network speed and or the available processing resources. Another related aspect of the invention provides such a system wherein the render server continuously monitors one or more of these parameters and thereby allows for continuous adaptation of the resolution.

Another aspect of the invention provides a graphics system, for example, of the type described above, wherein the render server keeps local resources (such as texture memory) on one of the graphics boards allocated for the processing of a particular set of related render requests. Related aspects of the invention provide (for example) for re-use of such allocated resources for the processing of a subsequent render request in the set, thus eliminating the need to re-upload the data from host memory to texture memory for such subsequent render requests. By way of example, the render server of such a system can keep the texture memory of a graphics board allocated to the rendition of interactive render requests for low resolution versions of a data set (e.g., user-driven requests for rotation of the data set), which need to be processed with a minimal latency to allow for smooth interaction but only require a small amount of texture memory.

Another aspect of the invention provides a graphics system, for example, of the type described above, wherein the render server dispatches render commands to different graphics boards. A related aspect provides such a system that takes into account the data sets resident on these different graphics boards and uses this information to optimize such dispatching.

Further aspects of the invention provide systems employing combinations of the features described above.

Further aspects of the invention provide methods for processing images that parallel the features described above.

These and other aspects of the invention are evident in the drawings and in the description that follows.

BRIEF DESCRIPTION OF THE DRAWINGS

A more complete understanding of the invention may be attained by reference to the drawings, in which:

FIG. 15 is a flowchart illustrating a method of multi-resolution rendering in a system of the type shown in FIG. 1.

FIG. 20 shows an example of a user interface to specify rules including a dialog box to configure Study Selection rules, according to an embodiment of the invention.

DETAILED DESCRIPTION OF THE INVENTION

Definitions

Figure 1:
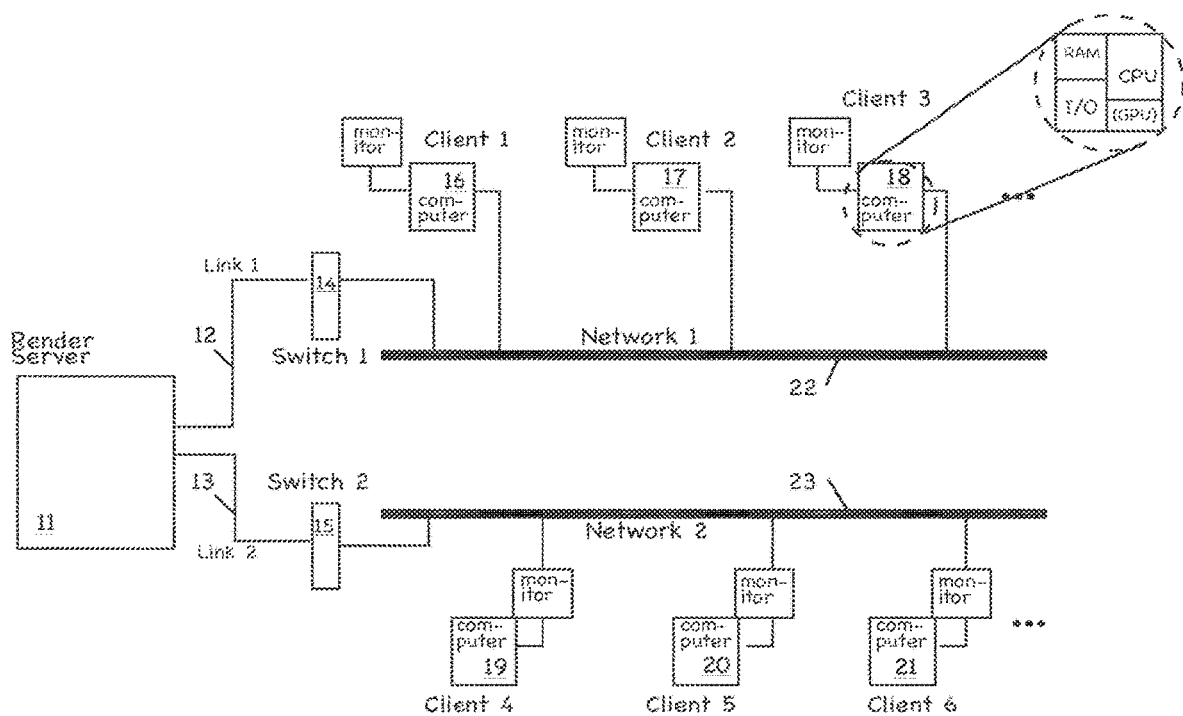
FIG. 1 depicts a client-server system according to one practice of the invention.

The transitional term "comprising" is synonymous with "including," "containing," or "characterized by," is inclusive or open-ended and does not exclude additional, unrecited elements or method steps.

The transitional phrase "consisting of" excludes any element, step, or ingredient not specified in the claim, but does not exclude additional components or steps that are unrelated to the invention such as impurities ordinarily associated with a composition.

The transitional phrase "consisting essentially of" limits the scope of a claim to the specified materials or steps and those that do not materially affect the basic and novel characteristic(s) of the claimed invention.

The term "Study" will be used to refer to the set of images produced by an examination. A Study consists of one or more images. The images can be grouped into one or more image series. Each image, each series, and the whole Study can have different parameters attached. For medical images these can be defined by the Digital Imaging and Communication in Medicine (DICOM) standard.

The term "Hanging Protocol" will be used to refer to specific conventions how X-Ray films are arranged (hung) at a light box.

The term "Display Protocol" will be used to refer to the way images are displayed in a computer system, specifically the selection of the images to be displayed, the layout of the images, as well as the rendering parameters and styles.

The term "View" will be used to refer to data corresponding to a digital image view of a Set of Images rendered with a given set of rendering parameters and rendering modes.

The term "Viewport" will be used to refer to the logical part of the screen on the client computer in which a particular View is displayed, for example the user interface on the client computer can contain four rectangular Viewports 1160 of which three show a frontal, left, and bottom view respectively of a particular data, while the fourth viewer might show a 2D cross section through the same or a different data set.

The term "Sets of Images" or "Image Set" will be used to refer to one or more images, selected based on the rules.

The term "Study Selection Rules" will be used to refer to the rules used to select the studies to be displayed.

The term "Protocol Selection Rules" will be used to refer to the rules used to select the layout of the images to be displayed.

The term "Image Set Rules" will be used to refer to the rules used to form Image Sets 1165 from the images of one or more Study by applying selection, sorting, and breaking rules.

The term "Style Rules" will be used to refer to the rules to determine which rendering type, rendering style, and rendering parameters are used for a particular Image Set 1165 in a particular viewer.

The term "Volume Rendering" will be used to refer to Volume Rendering techniques including shaded Volume Rendering techniques, maximum intensity projection (MIP), oblique slicing or multi-planar reformats (MPR), axial/sagittal and coronal slice display, and thick slices (also called slabs). In medical imaging, for example, Volume Rendering is used to display 3D images from 3D image data sets, where a typical 3D image data set is a large number of 2D slice images acquired by a CT or MRI scanner and stored in a data structure.

The term "bandwidth" and "send bandwidth" refer to various bit-rate measures, representing the available or consumed data communication resources expressed in bits per second or multiples of it.

The term "adaptive bandwidth management" means methods that continuously adjust the amount of data that is sent into a network per time in order to avoid or reduce network congestion and transfer delay . . . .

The term "buffer" or "network buffer" refers to a temporary storage area acting as a holding area, enabling the computer or network to manipulate data before transferring it to a device.

The term "client-server" refers to a computer system that selectively shares its resources; a client is a computer or computer program that initiates contact with a server in order to make use of a resource. This sharing of computer resources allows multiple people to use a computer server at the same time. Because a computer does a limited amount of work at any moment, a time-sharing system must quickly prioritize its tasks to accommodate the clients. Clients and servers exchange messages in a request-response messaging pattern: The client sends a request, and the server returns a response.

The term "application layer" or "application-level protocol" refers to the communications between computers. To communicate, the computers must have a common language, and they must follow rules so that both the client and the server know what to expect. The language and rules of communication are defined in a communications protocol. All client-server protocols operate in the application layer.

The term "lossy compression" refers to a data encoding method that compresses data by discarding or losing some of it. The procedure aims to minimize the amount of data that needs to be held, handled, and/or transmitted by a computer.

The term "network latency" can be measured either 'one-way' as the time taken for the source to send a packet to a destination or 'round-trip' from the one-way latency from source to destination plus the one-way latency from the destination back to the source.

The term "pseudo code" is an informal high-level description of the operating principle of a computer program or other algorithm.

The term "timestamp message" refers to a message that contains an indication of a point in time on either the server or the client, or the difference between two such points in time. Timestamp messages may be exchanged between client and server in both directions.

The term "Transmission Control Protocol" or TCP includes using a "congestion window" to determine how many packets can be sent at one time. The larger the congestion window size, the higher the throughput. The TCP "slow start" and "congestion avoidance" algorithms determine the size of the congestion window. The maximum congestion window is related to the amount of buffer space that the kernel allocates for each socket.

Overview

FIG. 1 depicts a system 10 according to one practice of the invention. A render server (or server digital data processor) 11, which is described in more detail below, is connected via one or more network interfaces 12, 13 and network devices such as switches or hubs 14, 15 to one or more networks 22, 23. The networks 22, 23 can be implemented utilizing Ethernet, WIFI, DSL and/or any other protocol technologies and they can be part of the internet and/or form WANs (wide area networks), LANs (local area networks), or other types of networks known in the art.

One or more client computers (or "client digital data processors") 16-21 are coupled to render server 11 for communications via the networks 22, 23. Client software running on each of the client computers 16-21 allows the respective computers 16-21 to establish a network connection to render server 11 on which server software is running. As the user interacts with the client software, messages are sent from the client computers 16-21 to the render server 11. Render server 11, generates render commands in response to the messages, further processing the render requests to generate images or partial images, which are then sent back to the respective client computer s 16-21 for further processing and/or display.

The make-up of a typical such client computer is shown, by way of example, in the break-out on FIG. 1. As illustrated, client computer 18 includes CPU 18a, dynamic memory (RAM) 18b, input/output section 18c and optional graphics processing unit 18d, all configured and operated in the conventional manner known in the art, as adapted in accord with the teachings hereof.

The components illustrated in FIG. 1 comprise conventional components of the type known in the art, as adapted in accord with the teachings hereof. Thus, by way of non-limiting example, illustrated render server 11 and client computers 16-21 comprise conventional workstations, personal computers and other digital data processing apparatus of the type available in the market place, as adapted in accord with the teachings hereof.

It will be appreciated that the system 10 of FIG. 1 illustrates just one configuration of digital data processing devices with which the invention can be practiced. Other embodiments can, for example, utilize greater or fewer numbers of client computers, networks, networking apparatus (e.g., switches or hubs) and so forth. Moreover, it will be appreciated that the invention can be practiced with additional server digital data processors. Still further, it will be appreciated that the server digital data processor 11 can, itself, function, at least in part, in the role of a client computer (e.g., generating and servicing its own requests and or generating requests for servicing by other computers) and vice versa.

Render Server

In the following section we describe the render server in more detail and how it is used to perform volume rendering.

Figure 2:
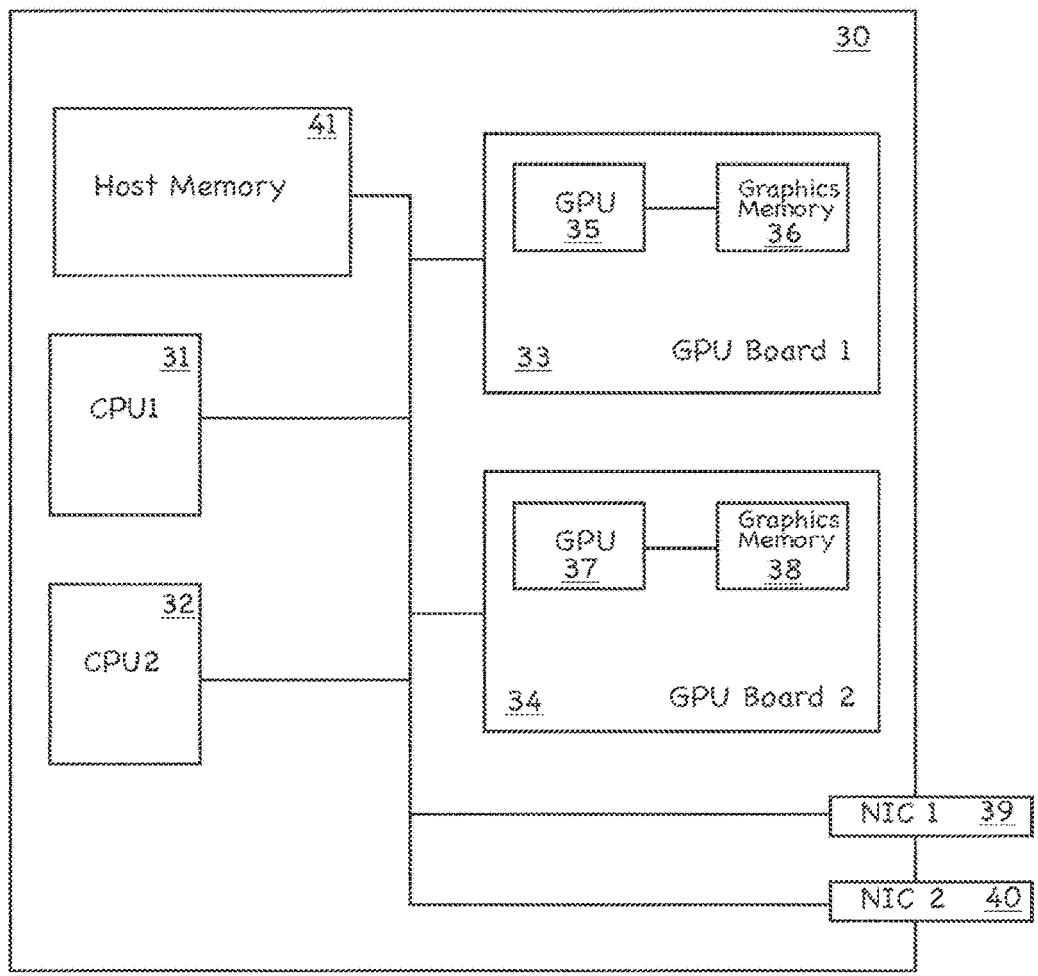
FIG. 2 depicts the host system of the render server of the type used in a system of the type shown in FIG. 1.

FIG. 2 depicts render server 11, which includes one or more host systems 30, each equipped with one or more local graphics (GPU) boards 33, 34. As those skilled in the art will appreciate, a host system has other components as well, such as a chipset, I/O components, etc., which are not depicted in the figure. The host system contains one or more central processing units (CPU) 31, 32, for example AMD Optcron or Intel Xeon CPUs. Each CPU 31, 32 can have multiple CPU cores. Connected to CPUs 31, 32 is a host memory 41.

GPU Boards 33, 34. can be connected to other system components (and, namely, for example, to CPUs 31, 32) using the PCI-Express bus, but other bus systems such as PCI or AGP can be used as well, by way of non-limiting example. In this regard, standard host mainboards exist, which provide multiple PCI-Express slots, so that multiple graphics cards can be installed. If the host system does not have sufficient slots, a daughter card can be used (e.g., of a type such as that disclosed in co-pending commonly assigned U.S. patent application Ser. No. 11/129,123, entitled "Daughter Card Approach to Employing Multiple Graphics Cards Within a System," the teachings of which are incorporated herein by reference). Alternatively, or in addition, such cards can be provided via external cable-connected cages.

Each graphics board 33, 34 has amongst other components local, on-board memory 36, 38, coupled as shown (referred to elsewhere herein as "graphics memory," "Graphics Memory," "texture memory," and the like) and a graphics processing unit (GPU) 35, 37. In order to perform volume rendering of a data set, the data set (or the portion to be processed) preferably resides in graphics memories 36, 38.

The texture (or graphics) memory 36, 38 is normally more limited than host memory 41 and often smaller than the total amount of data to be rendered, specifically for example, as in the case of the illustrated embodiment, if server 11 is used by multiple users concurrently visualizing different data sets. Therefore not all data needed for rendering can, at least in the illustrated embodiment, be kept on graphics boards 33, 34.

Instead, in the illustrated embodiment, in order to render an image, the respective portion of the data set is transferred from either an external storage device or, more typically, host memory 41 into the graphics memories 36, 38 via the system bus 42. Once the data is transferred, commands issued to GPUs 35, 37 by Render Server Software (described below) cause it to render an image with the respective rendering parameters. The resulting image is generated in graphics memories 36, 38 on graphics boards 33, 34 and once finished can be downloaded from graphics boards 33, 34, i.e., transferred into host memory 41, and then after optional post-processing and compression be transferred via network interfaces 39,40 to client computers 16-21.

The components of host 30 may be interconnected by a system bus 42 as shown. Those skilled in the art will appreciate that other connections and interconnections may be provided as well or in addition.

Render Server Software and Client Software

The process described above, as well as aspects described subsequently, is controlled by software, more specifically software running on Render Server 11 ("Render Server Software") and software running on client computers 16-21 ("Client Software"). The Render Server Software handles network communication, data management, actual rendering, and other data processing tasks such as filtering by way of employing CPUs 31, 32, GPUs 35, 37, or a combination thereof. The Client Software is responsible for allowing the user to interact, for example, to choose a data set to visualize, to choose render parameters such as color, Data Window, or the view point or camera position when e.g., rotating the data set. The client software also handles network communication with server 11 and client side display. In the following we describe one way how the Render Server Software and Client software can be implemented. In this regard, see, for example, FIG. 13, steps 1301-1310.

A component of the Render Server software listens for incoming network connections. Once a Client computers attempts to connect, the Render Server Software may accept or reject that connection potentially after exchanging authentication credentials such as a username and password and checking whether there are enough resources available on the render server.

The Render Server software listens on all established connections for incoming messages. This can be implemented for example by a loop sequentially checking each connection or by multiple threads, one for each connection, possibly being executed simultaneously on different CPUs or different CPU cores. Once a message is received, it is either processed immediately or added to a queue for later processing. Depending on the message type a response may be sent. Examples for message types are: (i) Request for a list of data sets available on the server, potentially along with filter criteria, (ii) Request to load a data set for subsequent rendering, (m) Request to render a data set with specified rendering parameters and a specified resolution level, (iv) Message to terminate a given connection, (v) message to apply a filter (for example noise removal or sharpening) etc.

Figure 13:
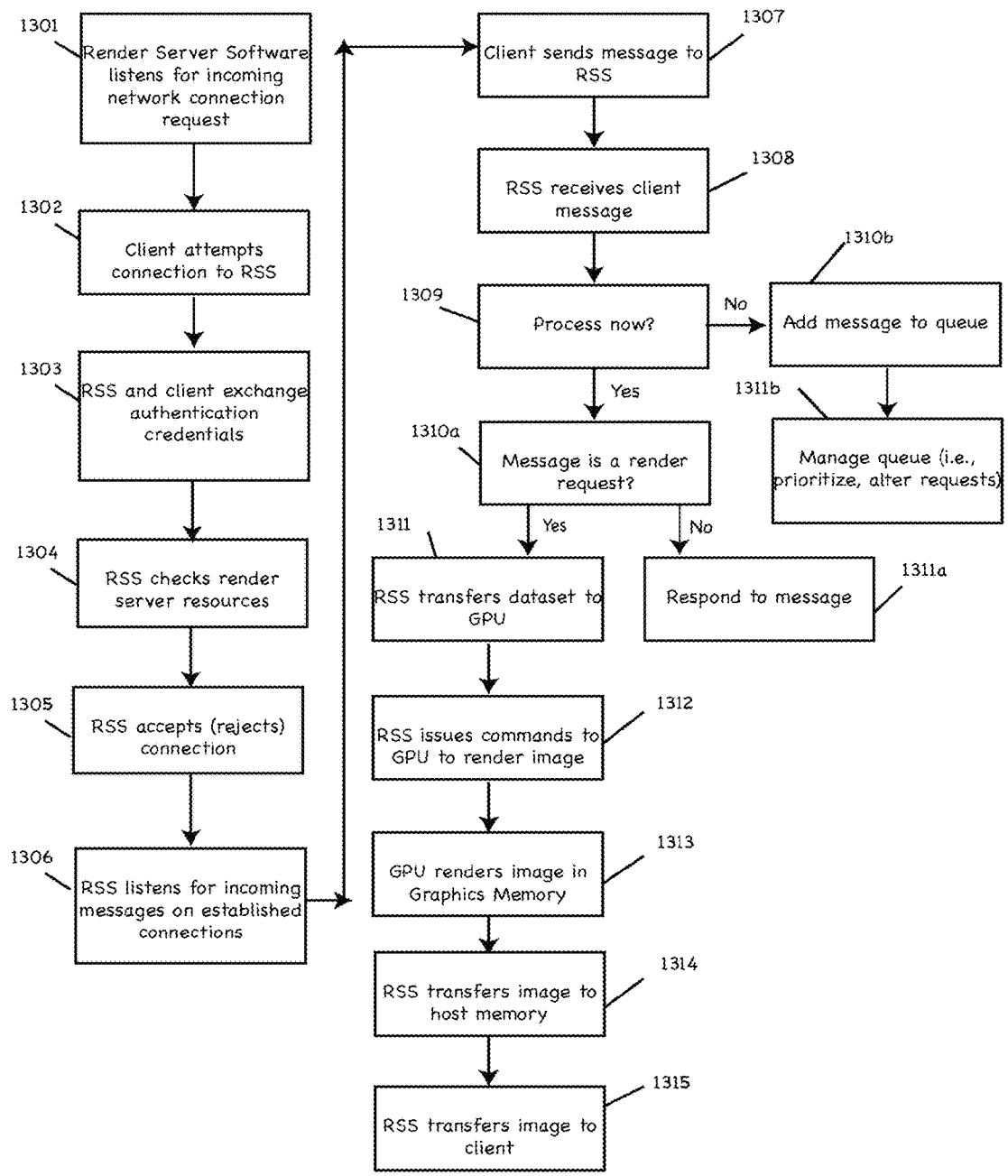
FIG. 13 is a flowchart illustrating a method of operation of the system of the type shown in FIG. 1.

FIG. 13, steps 1311-1315, illustrate the typical case in which the client computer sends a render request and the Render Server Software handles the render request using GPU 35, 37. The Render Server Software transfers the data set in question (or, as is discussed below, portions of it) into local graphics memories 36, 38 via the system bus 42, issues commands to GPUs 35, 37 to create a rendered image in graphics memories 36, 38 and transfers the rendered image back into host memory 41 for subsequent processing and network transfer back to the requesting client computer.

In the illustrated embodiment, a component (e.g., software module) within the Render Server Software prioritizes the requests added to the queue of pending requests thereby determining the order in which they are executed. Other such components of the illustrated embodiment alter requests in the queue, i.e., remove requests which are obsoleted or break down requests into multiple smaller ones (see, step 1311*b*). In these and other embodiments, still another such component of the Render Server Software determines which resources are used to process a request. Other embodiments may lack one or more of these components and/or may include additional components directed toward image rendering and related functions.

In the following, details of these components as well as other aspects are described.

When the Render Server Software handles a render request by way of using the GPU, it transfers the data set in question (or, as is discussed below, portions of it) into the local Graphics Memory via the system bus, then issues the commands necessary to create a rendered image, and then transfers back the rendered image into main memory for subsequent processing and network transfer. Even a single data set can exceed the size of the graphics memory. In order to render such a data set efficiently, it is broken down into smaller pieces which can be rendered independently. We refer to this process as bricking. As discussed later, the ability to break down one render request into multiple smaller requests, where smaller can mean that less graphics memory and/or less GPU processing time is required, is also helpful for efficiently handling multiple requests concurrently.

Figure 7:
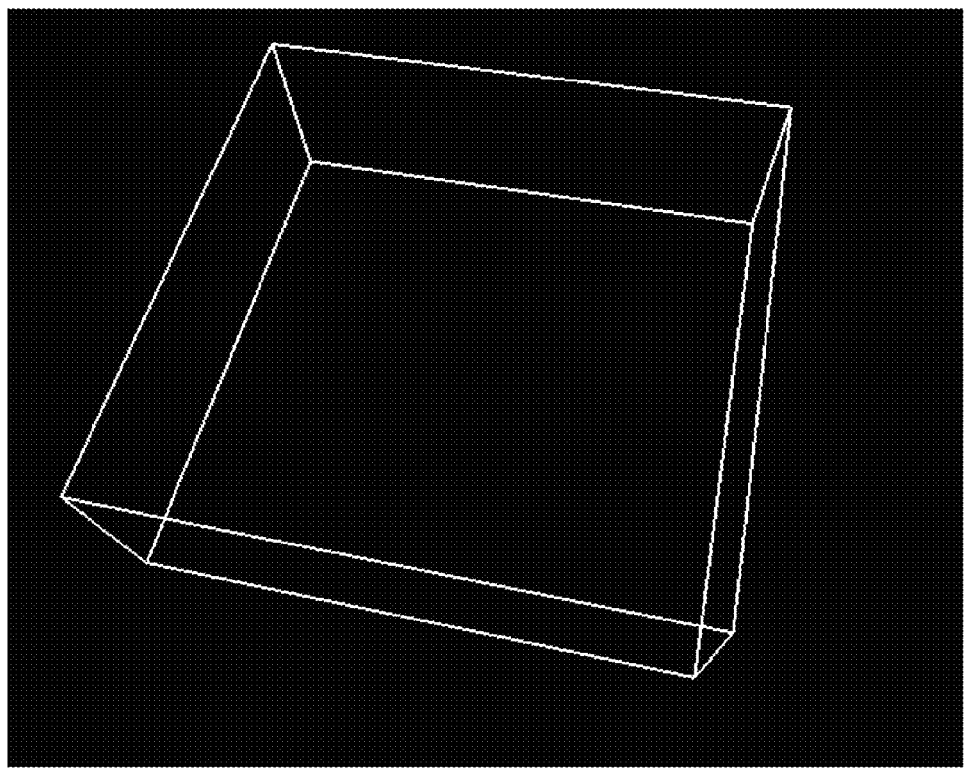
FIG. 7 depicts a 3D data set of the type suitable for processing in a system according to the invention.
Figure 9:
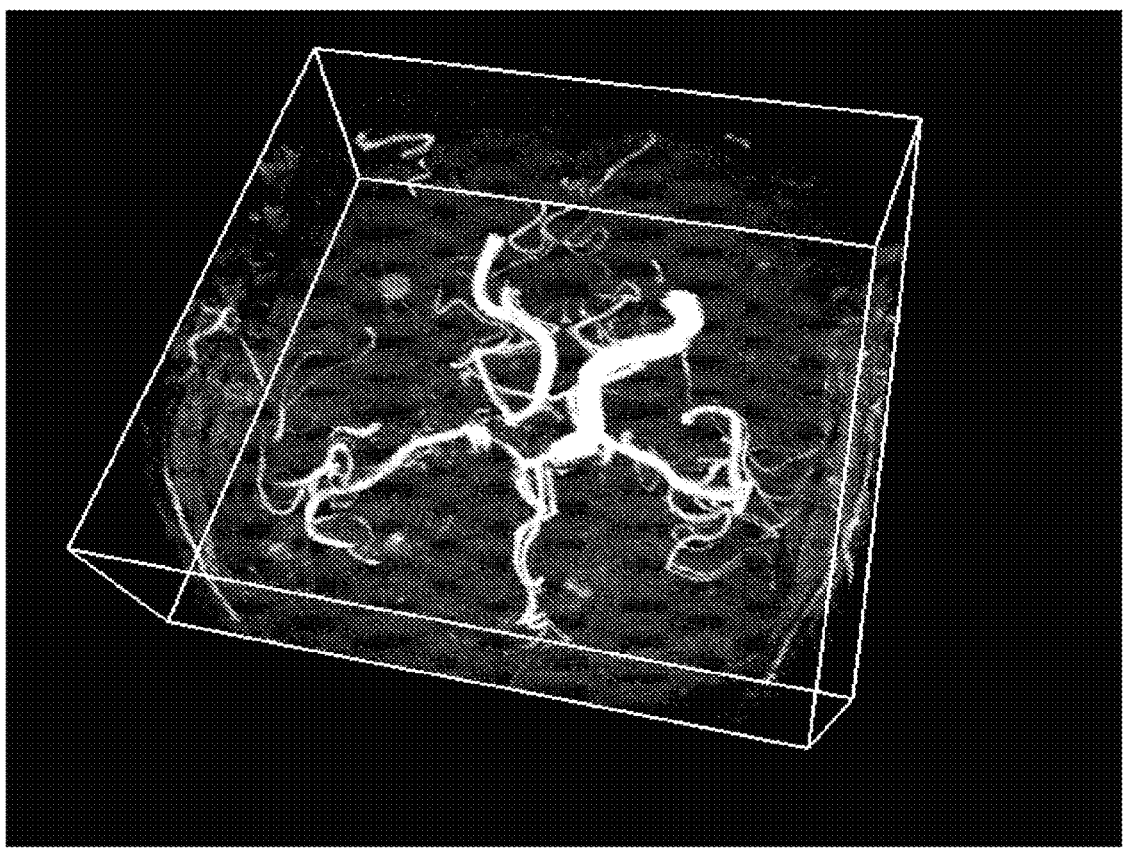
FIGS. 9-12 depict images resulting from MIP renderings of an image utilizing sub-volumes of the type shown in FIG. 8.
Figure 14:
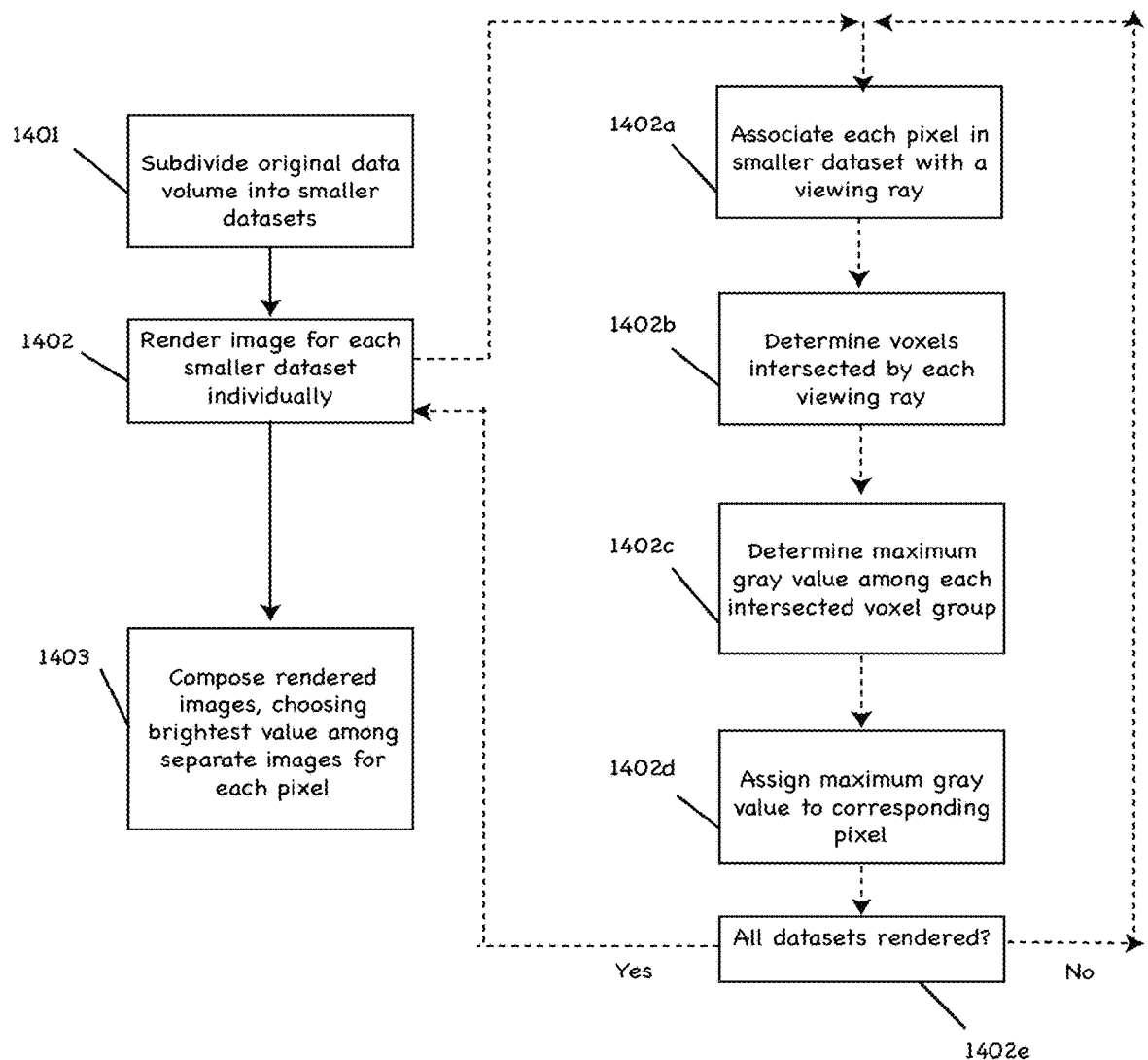
FIG. 14 is a flowchart illustrating a method of utilizing bricking to perform rendering in a system of the type shown in FIG. 1.

We now describe how such a break down can be performed. As an example, we first discuss the MIP rendering mode, though, it will be appreciated that such a methodology can be used with other rendering modes. The 3D data set can be viewed as a cuboid in three-space, consisting of a number of voxels carrying gray values. FIG. 7 depicts that data volume viewed from a certain camera position by way of displaying a bounding box. Referring to FIG. 14 (which illustrates a method for bricking according to one practice of the invention), for a given camera position, each pixel on a computer screen (screen pixel) can be associated with a viewing ray. See, step 1402*a*. The voxels intersected by each such viewing ray which intersects the cuboid are then determined. See, step 1402*b*. In the MIP rendering mode, the screen pixel is assigned the maximum gray value of any of the voxels, which the viewing ray corresponding to the screen pixel intersects. See, step 1402*c*. The resulting rendered image can be seen in FIG. 9.

Figure 8:
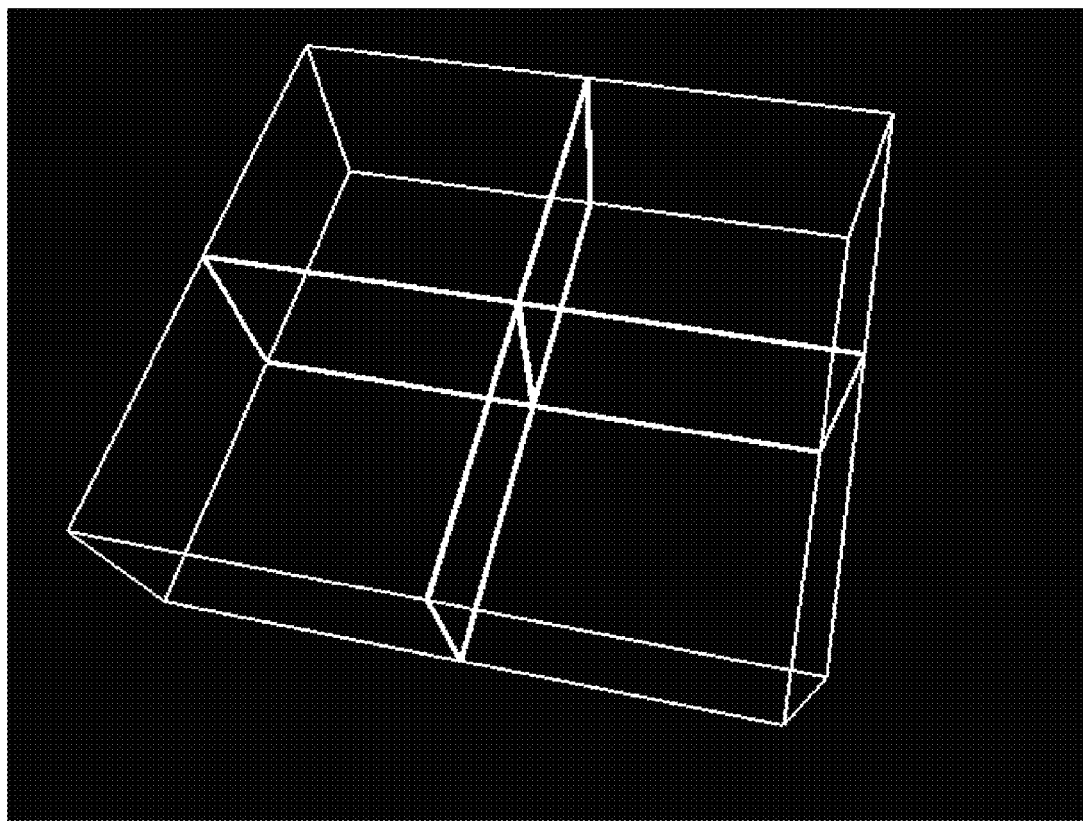
FIG. 8 depicts sub-volumes making up the data set of FIG. 7.
Figure 10:
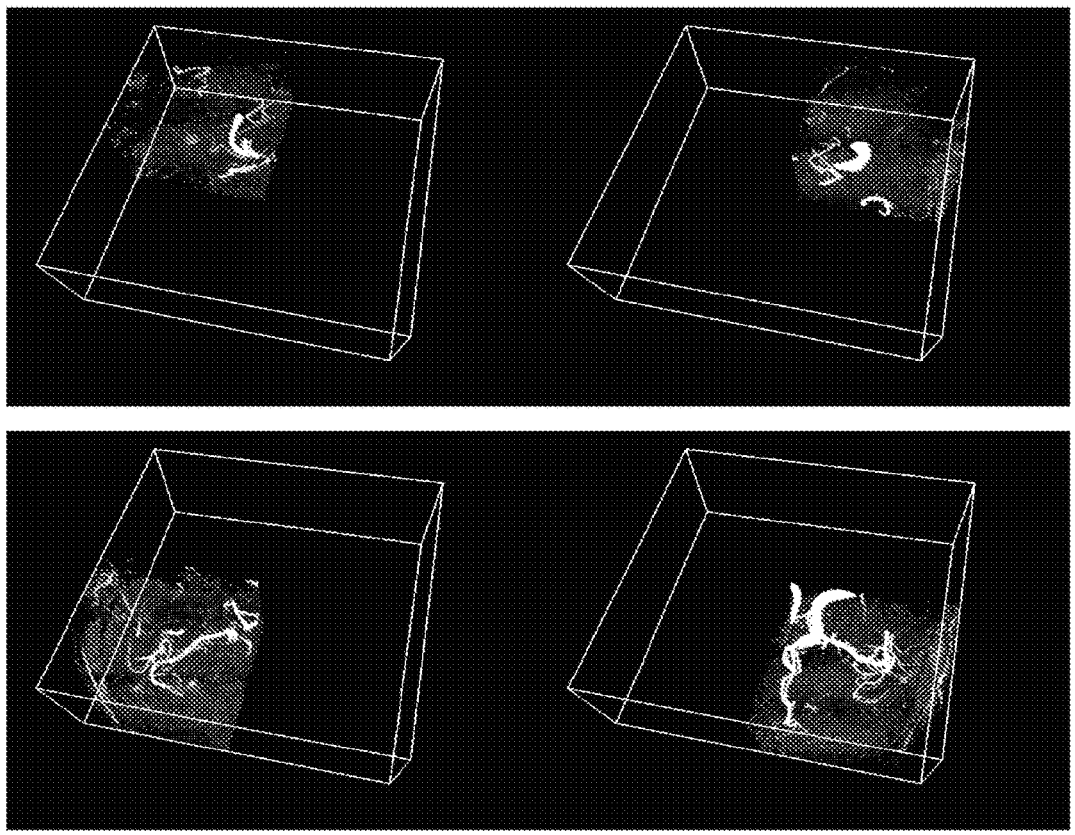
Figure 11:
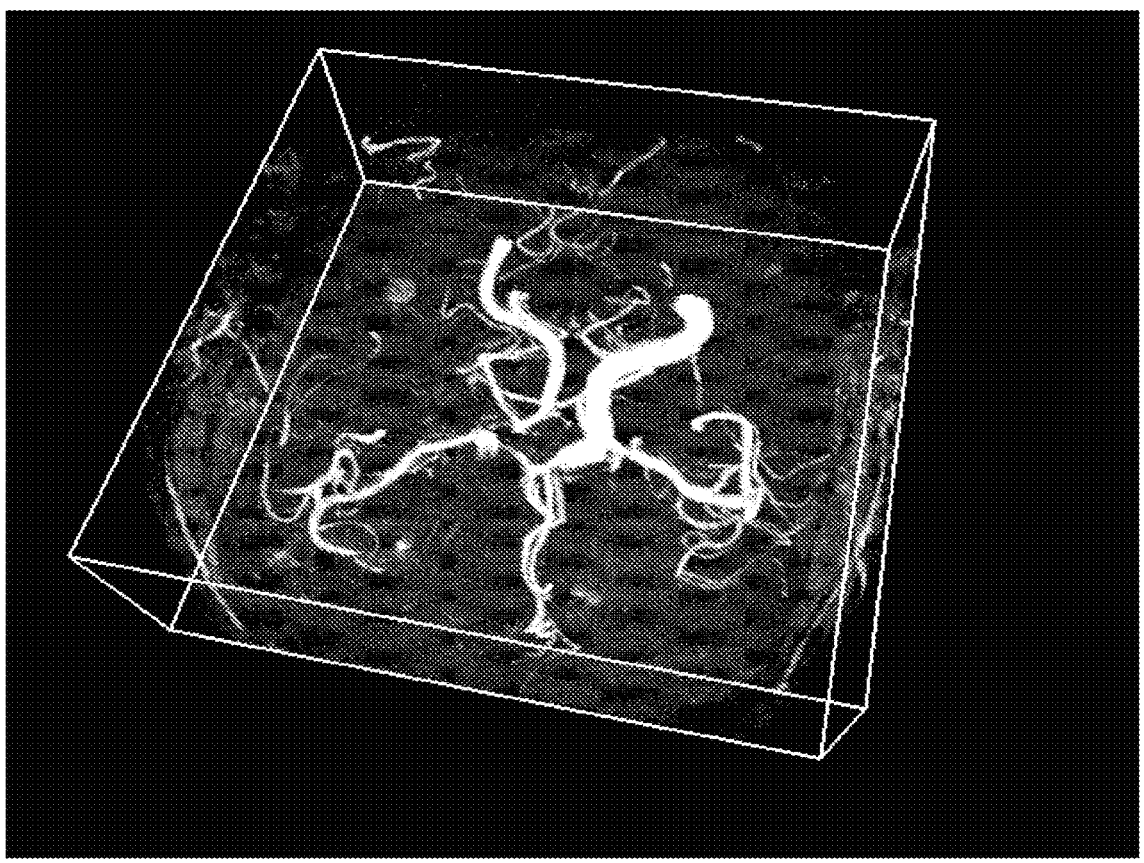

If the Render Server Software subdivides the original data volume into multiple smaller data volumes, for example if it divides the data volume into four sub volumes, then each of the sub volumes can be rendered independently, thus, effectively producing four rendered images. See, FIG. 14, steps 1401 and 1402. The subdivision for this example is illustrated in FIG. 8 by way of showing the bounding boxes of the four sub-volumes. FIG. 10 shows the individual MIP rendition of each of the four sub volumes for an example data set depicting a Magnetic Resonance Angiography image. For better orientation, the bounding box of the original data volume is shown as well. If the rendered images are then composed in such a way that for each pixel in the composed image the brightest value for that pixel from the four rendered images is chosen (see, FIG. 14, step 1403), then the resulting composed image, which is shown in FIG. 11, is identical to the MIP rendition of the full data set, seen in FIG. 8.

Figure 12:
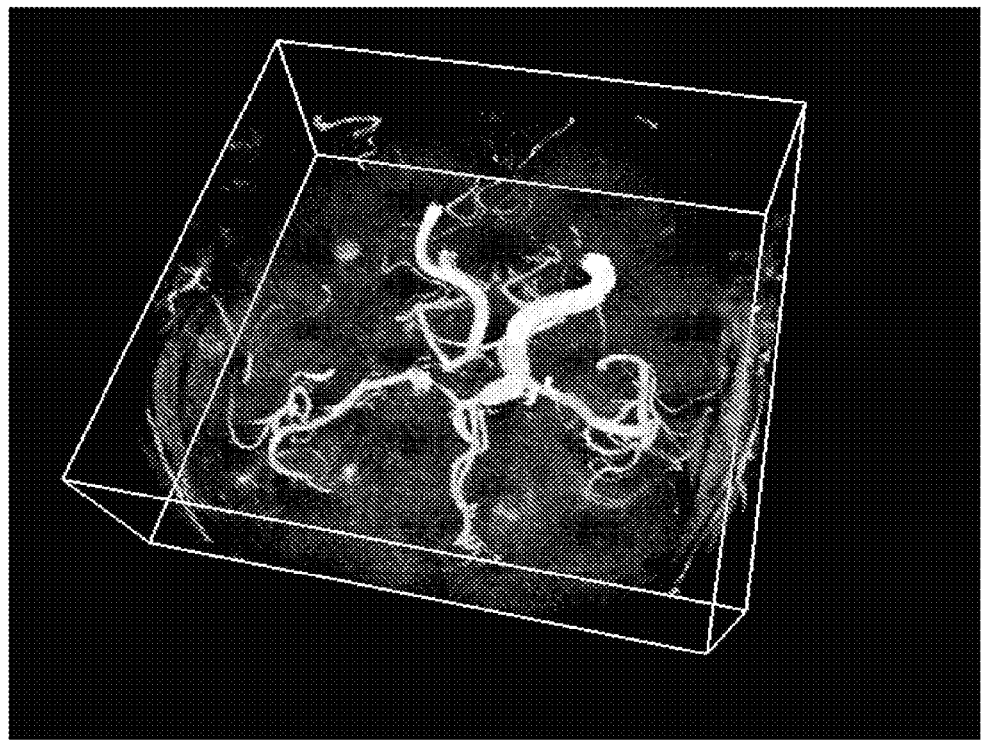

Using the correct composition function, the same breakdown approach can be used for other rendering modes as well. For example, for VRT mode, standard alpha-blending composition can be used, i.e., for each pixel of the resulting image the color opacity is computed as follows. The sub images are blended over each other in back to front order, one after the other using the formula c_result I (1−a_front) *c_back+a_front*c_front, where, a_front and c_front denote the opacity and color of the front picture respectively, and c_back denotes the color of the back picture. As those skilled in the art will appreciate, other schemes such as front to back or pre-multiplied alpha may be used with the respective formulas found in general computer graphics literature. The resulting image for VRT rendering is shown in FIG. 12.

Multi-Resolution Rendering

The time it takes to render an image depends on several criteria, such as the rendering mode, the resolution (i.e., number of pixels) of the rendered (target) image and the size of the input data set. For large data sets and high-resolution renditions, rendering can take up to several seconds, even on a fast GPU. However, when a user wants to interactively manipulate the data set, i.e., rotate it on the screen, multiple screen updates per second (typically 5-25 updates/second) are required to permit a smooth interaction. This means that the rendition of a single image must not take longer than few hundred milliseconds, ideally less than 100 milliseconds.

One way to ensure smooth rendering during users' interactive manipulations of data sets is by rendering images at a resolution according to the level of a user's interaction. One way to guarantee this is illustrated in FIG. 15. Here, by way of example, the system checks whether the user is rotating the data set (see, Step 1502). If so, the render server uses a lower resolution version of the input data and renders the images at a lower target resolution. See, steps 1503b and 1504b. Once the user stops interacting, e.g., by releasing the mouse button, a full resolution image is rendered with the full-resolution data set and the screen is updated with that image, potentially a few seconds later. See, steps 1503a and 1504a. Schemes with more than two resolutions can be used in the same way.

In the subsequent discussion we refer to the above scenario to illustrate certain aspects of the invention. We refer to the low-resolution renderings as "interactive render requests" and to the larger full resolution renditions as "high-resolution render requests". The methodologies described below are not restricted to an interaction scheme which uses two resolutions in the way described above.

Scheduling Strategies

In order to build an effective multi-user multi-GPU render server, another component of the Render Server Software is provided which dispatches, schedules and processes the render requests in a way that maximizes rendering efficiency. For example, the number of client computers which can access the render server concurrently may not be limited to the number of GPUs. That is, two or more clients might share one GPU. Render requests received by such clients therefore need to be scheduled. This section describes some factors that may be considered for the scheduling and illustrates why a trivial scheduling may not be sufficient in all cases.

Figure 3:
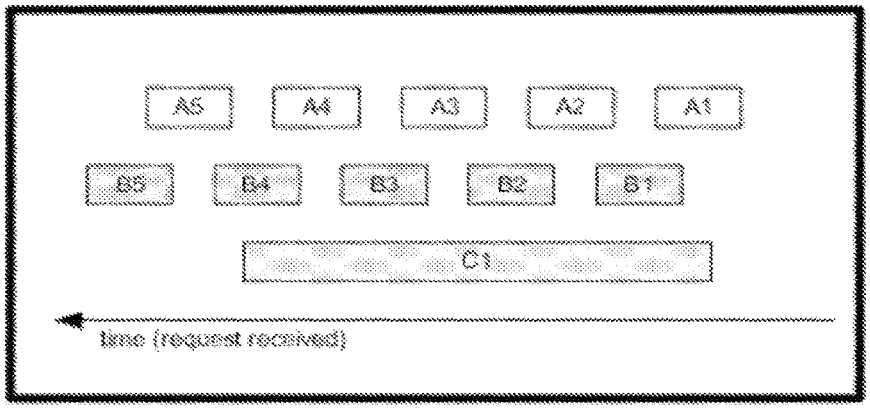
FIG. 3 depicts a timeline of incoming render requests from client computers in a system of the type shown in FIG. 1.

FIG. 3 illustrates, by way of non-limiting example, render requests coming in from three different client computers. The render requests A1, A2, . . . , A5 shall come in from a client computer A, while the render requests B1 . . . B5 come in from client computer B and the render request C1 comes from client computer C. The different sizes of the render requests in FIG. 3 symbolize the different size in the sense that larger boxes (such as C1) require more processing time and require more graphics memory than smaller ones (such as for example A1). The horizontal axis symbolizes the time axis, depicting when the render requests have been received, i.e., render request A1 has been received first, then C1, then B1, then A2, then B2, and so forth.

Figure 4:
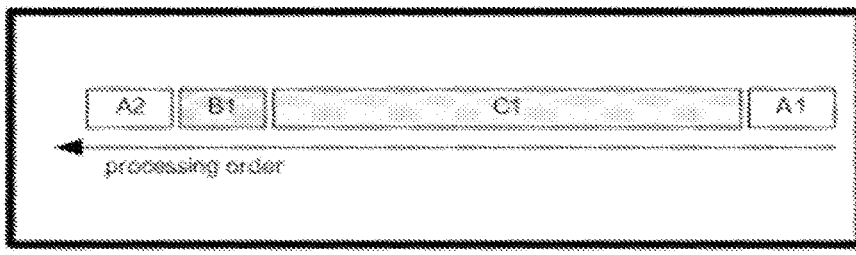
FIGS. 4-6 depict timelines For processing requests of the type shown in FIG. 3.

In one example, the "smaller" render requests A1 . . . A5 and B1 . . . B5 are interactive render requests, e.g., requests received while the user is rotating the data set, while C1 may be a high-resolution render request. By way of example, the interactive render requests might require 50 ms to process, while the high-resolution render request might take 2 seconds to render. If only one GPU was available to handle these render requests, and if the render requests were scheduled in a trivial way, on a first come-first serve basis, the result would not yield a good user experience. FIG. 4 illustrates such a case where request A1 is processed first, followed by C1, B1, A2, While render request C1 is processed, which in this example is assumed to take 5 seconds, no render requests for client A and client B would be processed. However this example assumes that the users using client A and client B are at this given time interactively manipulating, e.g., rotating, the data sets. Therefore if those clients would not receive a screen update for 2 seconds, the interaction would stall, prohibiting a smooth and interactive user experience.

An alternative strategy of not processing any high-resolution render requests as long as any interactive render requests are still pending also would not be optimal. If, in the above example, the users using clients A or B rotated their data sets for a longer period of time. e.g., half a minute or longer, then during that time they would constantly generate render requests, effectively prohibiting the request from client C to be processed at all (until both other users have completed their interaction). This is also not desired.

Methods of improved scheduling to reduce average wait time for a response to a client computer's render request are needed. We are now going to describe two alternative strategies for a better scheduling and will later describe how a combination of both leads to even better results.

Figure 5:
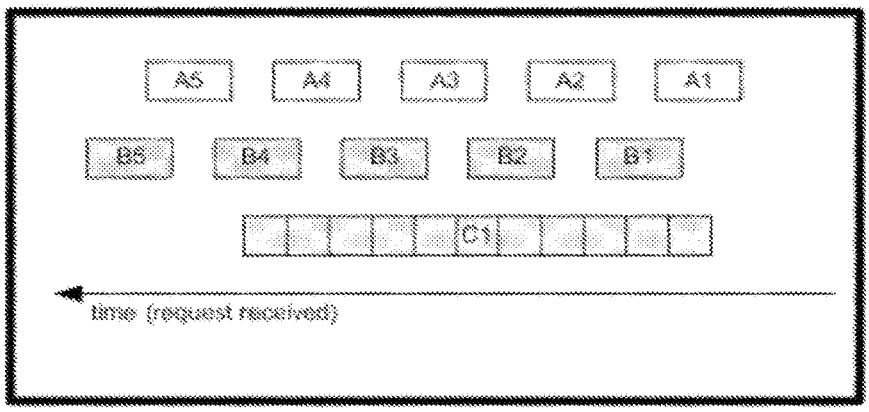
Figure 6:
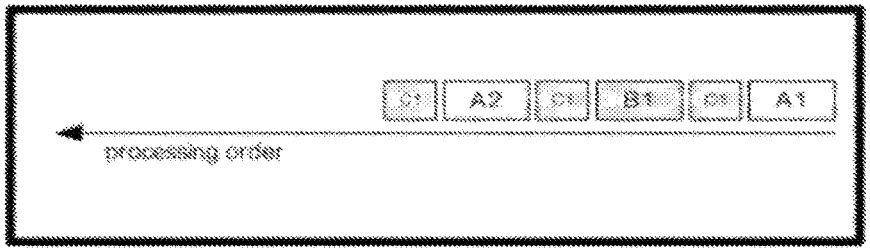

The first strategy, illustrated in FIGS. 5 and 6, involves the situation where "large" render requests are broken down into multiple smaller render requests which are processed individually. For example, here, request C1 is broken down into multiple smaller requests. Once this is done, those smaller requests can be scheduled more flexibly, for example as shown in FIG. 6. Such a scheduling has the advantage that none of the clients would see any significant stalling, only a somewhat reduced rate of screen updates per second. Still however also the high-resolution render request would not be postponed indefinitely but be processed in a timely manner.

Concurrent Rendering

The second strategy is to issue multiple render commands to the same graphics board simultaneously, i.e., issue a first command (e.g., in response to a request received from a first client computer) and then issue a second command (e.g., in response to a request received from a second client computer) before the first request is completed. Preferably, this is done so as to interleave commands that correspond to different respective client requests so that the requests are processed in smaller time slices in an alternating fashion.

This can be done in multiple ways. One way is to use multiple processes or multiple threads, each rendering using the same graphics board. In this case the operating system and graphics driver respectively handle the "simultaneous" execution of the requests. In fact, of course, the execution is not really simultaneous but broken down into small time slices in which the requests are processed in an alternating fashion. The same can be achieved by a single thread or process issuing the primitive graphics commands forming the render requests in an alternating fashion, thereby assuring that texture bindings and render target assignments are also switched accordingly.

The reason why it may be advantageous to issue multiple render commands simultaneously in contrast to a fully sequential processing as depicted, e.g., in FIG. 6, is twofold. First, it can be the case that, even after breaking down larger render requests into smaller ones, each request may still take more processing time than one would like to accept for stalling other, smaller, interactive requests. Second, a graphics board is a complex sub-system with many different processing and data transfer units, some of which can work in parallel. Therefore, certain aspects of two or more render requests being processed simultaneously can be executed truly simultaneously, e.g., while one render request consumes the compute resources on the GPU, the other consumes data transfer resources. Thus, executing the two requests simultaneously may be faster than executing them sequentially. Additionally, although the GPU simultaneously processes render commands issued by the render server CPU on behalf of multiple remote client computers, the GPU may also simultaneously process render requests (or other requests) issued by or on behalf of other functionality (e.g., requests issued by the render server CPU on behalf of a local user operating the server computer directly).

Another aspect taken into account by the Render Server Software when issuing render requests simultaneously is the total graphics resource consumption. If the sum of required graphics memory for all simultaneously processed render requests would exceed the total graphics resources on the graphics board, then a significant performance decrease would be the consequence. The reason is, that whenever the operating system or graphics driver switched from execution of request 1 to request 2, then first the data required for the processing of request 1 would have to be swapped out from graphics memory to host memory to make room for the data needed for request 2. Then the data needed for the processing of request 2 would have to be swapped in from host memory into graphics memory. This would be very time consuming and inefficient.

Figure 17:
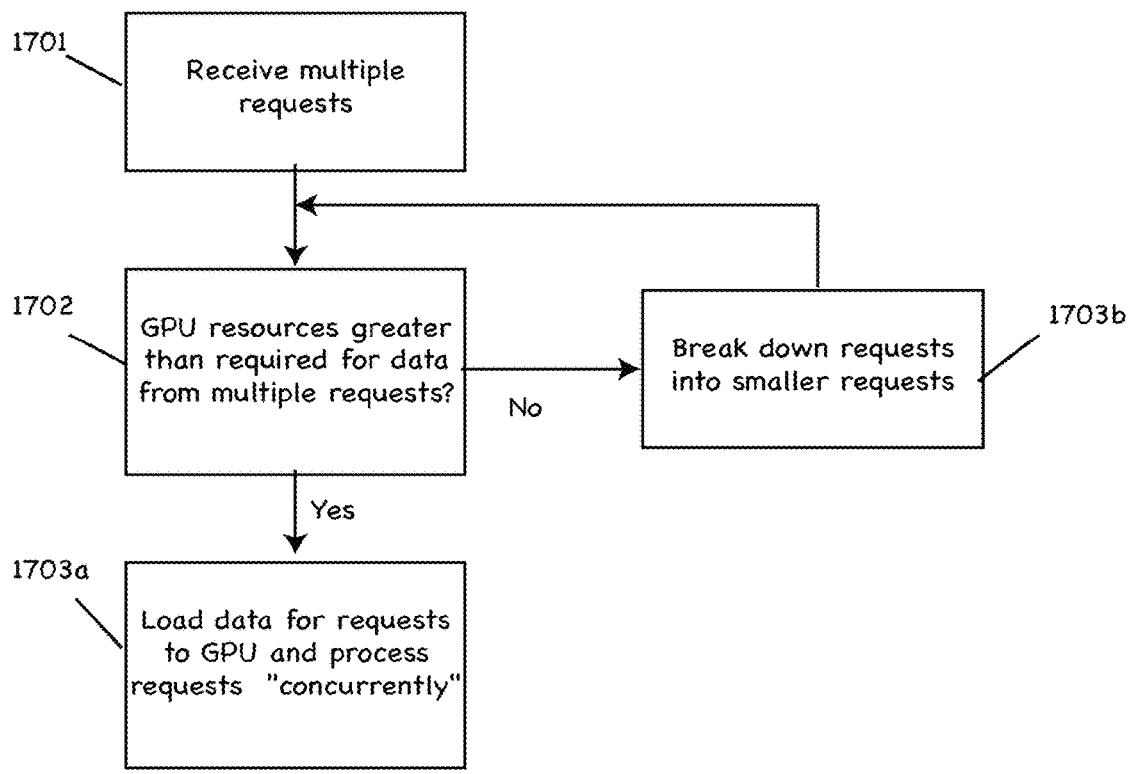
FIG. 17 is a flow chart illustrating a method of breaking down render requests into smaller requests in connection with concurrent rendering.

FIG. 17 illustrates how the method described above of breaking down render requests into smaller requests can be used with concurrent rendering. Specifically, when scheduling requests, the Render Server Software insures that requests are broken down sufficiently so that the total resource requirements for all simultaneously processed requests do fit into the totally available graphics memory of the graphics board processing these requests. See, steps 1702 and 173*b*.

Persistent Data

Figure 16A:
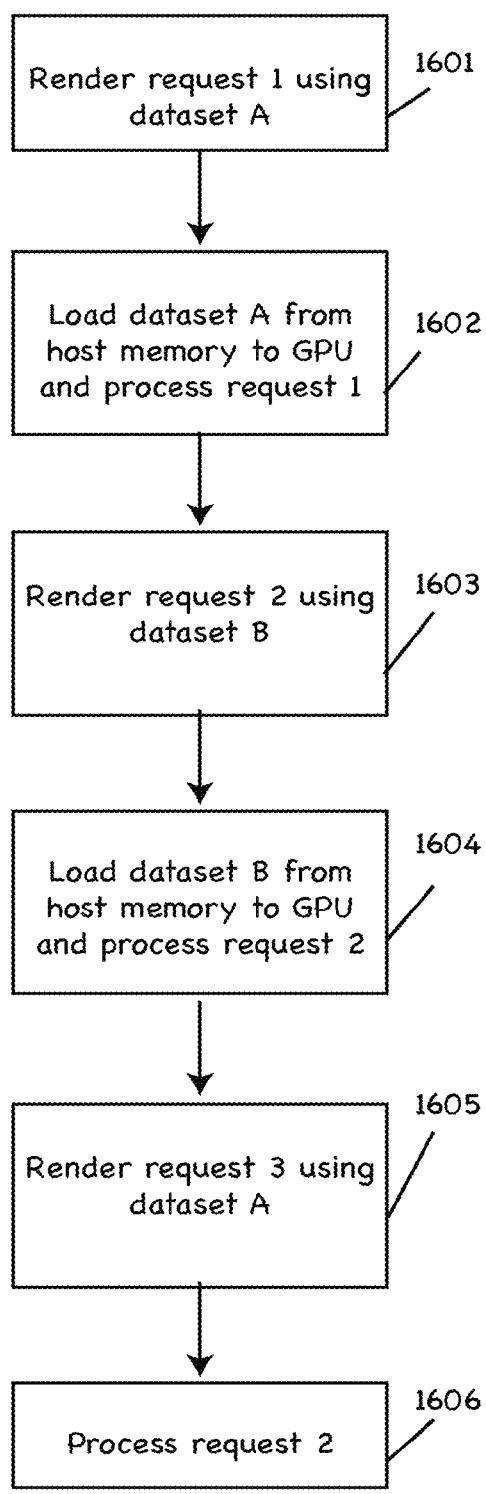
FIGS. 16A-16B are flowcharts illustrating data upload from host memory to graphics memory in a host system of the type shown in FIG. 2.

The Render Server Software additionally implements schemes to take advantage of data persistency, during scheduling and/or dispatching of requests. Very often subsequent render requests use some of the same data. For example if a user rotates a data set, then many different images will be generated all depicting the same input data set only rendered from different viewing angles. Therefore, if one request has been processed, it can be of advantage to not purge the input data from the graphics memory, but instead keep it persistent in anticipation of a future render request potentially requiring the same data. As illustrated in FIG. 16A, in this way a repeated data upload from host memory into graphics memory can be avoided. See, step 1606.

In single-GPU systems, a scheduler component of the Render Server Software may take data persistency into account and re-arrange the order of requests in such a way as to optimize the benefit drawn from persistency. In the case of FIG. 16A, for example, the scheduler might rearrange the order of the requests so that render request 3 is processed immediately subsequent to render request 1.

Figure 16B:
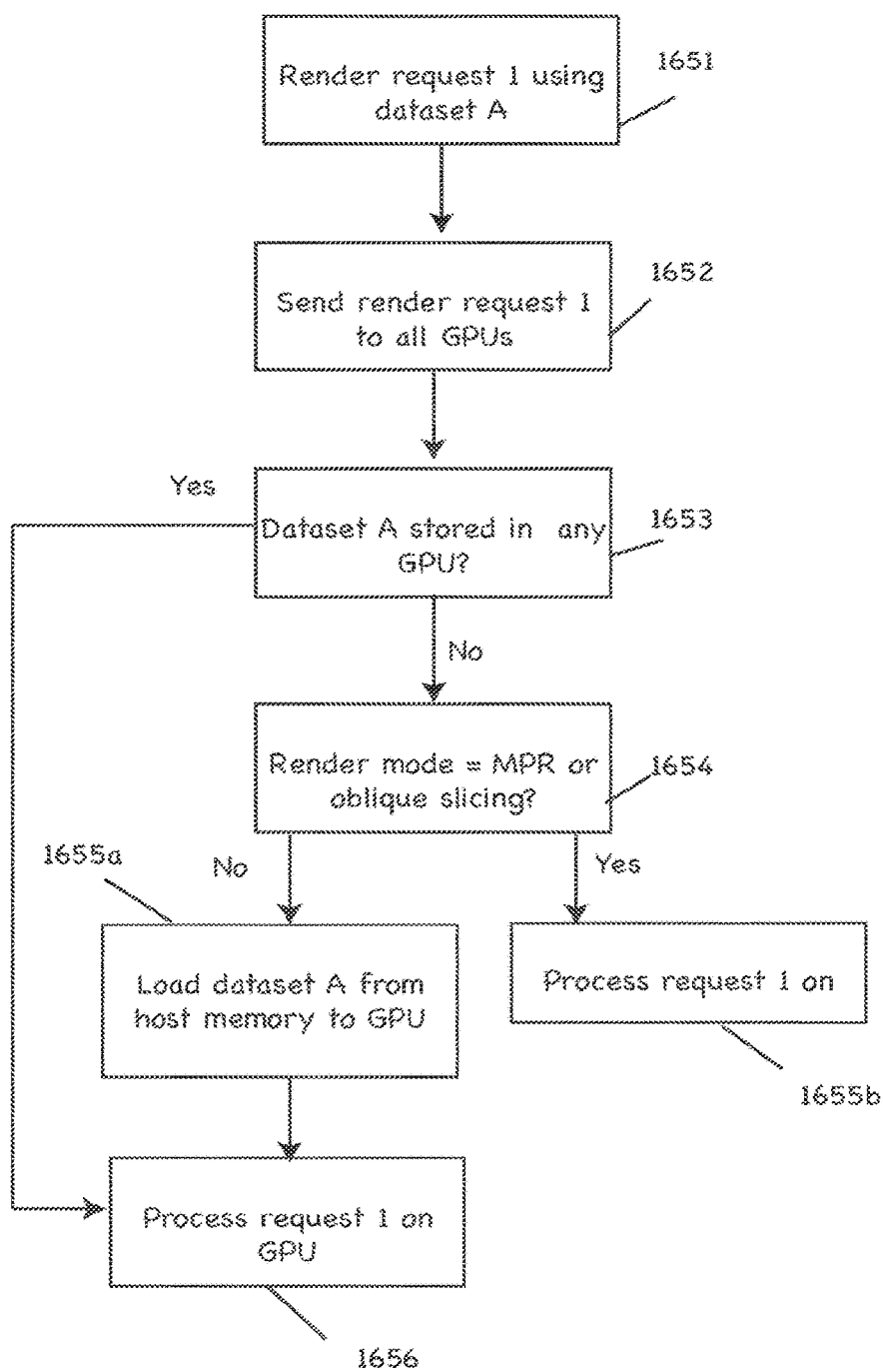

In a multi-GPU system, on the other hand, the dispatcher component of the Render Server Software takes persistency into account when deciding which GPU to use to satisfy a specific render request. For example, as mentioned above and depicted in FIG. 16*b*, render requests in multi-GPU systems are typically dispatched to all of the GPUs following the same basic scheme as described above. See, step 1652. To take advantage of data persistency, the dispatcher component attempts to dispatch the current request to a graphics processing unit in which the data set specified by the request is stored. See, steps 1653 and 1656. This will often lead to subsequent interactive render requests from the same client computer being handled by the same GPUs.

But, not all render requests need to be executed on the GPUs. Depending on resource use and the type of request, it may also be feasible to use one or more CPU cores on one or more CPUs to process a render request, or a combination of CPU and GPU. For example, rendering requests For MPR mode and oblique slicing can be executed on the CPU unless the data required is already on the GPU. See, steps 1654 and 1655*b*.

Rendering requests are only one example. As those skilled in the art will appreciate, the described embodiment can also be used in the same way to perform other data processing tasks, such as filtering, feature detection, segmentation, image registration and other tasks.

Improving the Efficiency of Transmission

In an embodiment of the present invention, the efficiency of transmission of rendered images from the server to the client can be improved using client-side caching. In an embodiment of the present invention, the efficiency of transmission of rendered images from the server to the client can be improved using partial transmission. In wide-area network situations, the network can become a bottleneck when transmitting rendered images in 'as-is' condition. In order to improve the performance and responsiveness, client-side caching and partial transmission can be used.

The term "View" will be used to refer to data corresponding to a digital image view rendered with a given set of rendering parameters and rendering modes. A View can be transmitted from server to client and can be stored in cache.

The term "Viewport" will be used to refer to the logical part of the screen on the client computer in which a particular View is displayed, for example the user interface on the client computer could contain four rectangular Viewports of which three show a frontal, left, and bottom view of a patient respectively of a particular data, while the fourth View might show a 2D cross section through the same patient or a different data set.

The term "Data Window" will be used to refer to the data range chosen by the user to display a View on a Viewport.

One example of the improvement in the efficiency of transmission relates to adaptive spatial resolution. The example of rendering high-resolution 2D X-Ray images can be used to illustrate the technique. The technique equally applies to 3D image volumes or other types of scenes. If a high-resolution X-RAY input image is to be displayed, then the resolution of the input image will typically differ from the resolution of the viewport used on the output monitor. Often the resolution of the original image will be larger (i.e. have more pixels) than the viewport on the output device. Alternatively, often only a particular sub-region of the original image will be displayed. The user of the system can typically use interactive image manipulation techniques, such as zoom and pan operations in order to explore all aspects of the image in full detail. As the user performs these manipulations, new views are being rendered on the server and transmitted to the client. Instead of transmitting these views fully and independently from the server to the client, the client can cache the previous views and compute the new view partially from that information. Only the missing data that cannot be reconstructed from the cached information can be requested from the server. This missing data can be referred to as 'delta'. In case of a pan operation, the missing data are pixels that were outside the viewport in the previous view and are now inside the viewport. In case of a zoom operation, where the magnification decreases, the new view can be computed by down-sampling the previous view. Again, the delta will consist of pixels previously not inside the viewport that now are within the viewport. In case of a zoom operation where the magnification increases, an approximation of the new view can be computed by zooming up the previous view. However this would result in a loss of detail compared to the original input image, which can be unacceptable in many applications. In order to avoid having to retransmit the full image for each new zoom level, a scheme of multiple discrete resolution levels can be used. These resolution levels can be 1:1, 1:2, 1:4, 1:8, etc. where 1:1 means the original input resolution, 1:2 means half that resolution, etc. When the client requests a rendered image the server will then actually respond to the render request with an image rendered at the next higher resolution level. The client can then slightly down-sample the image to display it. Subsequent zoom operations, up to the limit of the transmitted resolution can then be performed without further render requests to the server and hence without a performance impact due to network latency and bandwidth. The techniques described above can also be applied to volume-rendered images (e.g., VRT, sVRT, MIP, MPR, axial/sagittal and coronal slice display, thick slices or slabs), as long as an orthographic camera is used and the view direction remains unchanged as is the case when the image is zoomed or panned.

Similar to spatial resolution, partial transmission and caching can also be applied to color or grayscale resolution. For example, medical images are often acquired with a depth of 16 bits of grayscale per pixel, i.e. they can have up to 65536 different gray values. However, the output devices often only permit the display at a gray value resolution of 8 bit, i.e. 256 different shades of grey. When displaying these images, the user will choose a certain data range that will be mapped to the grey value spectrum of black to white. This data range is referred to as the Data Window. A typical example would be a Computer Tomographic (CT) image that can comprise data values ranging from −1000 to 3000. When reviewing the soft tissue aspects (such as the inner organs), a user can for example choose an initial Data Window of −200 to 200, which means that data values of −200 and lower are displayed as black, while data values of 200 and larger are displayed as white, and pixels with values between −200 and 200 are displayed as gray. If the output device is an eight bit device which can display grey values of 0 to 255, then the mapping of the input pixel intensity 'i' to the output pixel intensity 'o' taking into account the Data Window [d1, . . . , d2] will be according to the following formula:

if i<d1 then o=0
else if i>d2 then o=255
else o=255*(i−d1)/(d2−d1)

Any pixel values outside the Data Window are mapped to white or black respectively. The user can interactively change the Data Window in order to see all aspects of the image. As the user changes the Data Window, a new view needs to be rendered on the server and sent to the client. Caching can be used to reduce the network load and thus latency in transmission of the image. In order to compute the next view from the previous view, the following transformation can be used: Let [d1, . . . , d2] be the Data Window of the previous, cached view. Let [e1, . . . , e2] be the new Data Window. Then from a previous output pixel value o, the new output pixel value p can be computed if the following conditions are met: e2−e1>=d2−d1 and o>0 and o<255.

The formula to compute the new value is:
let t=o/255*(d2−d1)+d1,
if t<e1 then p=0
else if t>e2 then p=255
else p=255*(t−e1)/(e2−e1).

Those pixel values for which the above mentioned condition is not met need to be re-rendered on the server and re-transmitted. All other pixels do not need to be re-transmitted. For typical scenarios, the number of pixels that need to be re-transmitted from one view to another view can be quite small. Caching of grayscale values can be applied to rendered MPR, thick-MPR, or 3D MIP images in addition to 2D medical images. Window-level operations on such images are as common as on original 2D medical images.

Described above are methods and systems meeting the desired objects, among others. It will be appreciated that the embodiments shown and described herein are merely examples of the invention and that other embodiments, incorporating changes therein may fall within the scope of the invention.

Aspects of the Invention

In an embodiment of the present invention, a method for rendering images comprises executing a render server program on a server digital data processor, responding to a first render request from a client digital data processor in communication with the server digital data processor by executing one or more first render commands, sending in response to the first render request a first digital image View to the client digital data processor, where the first digital image View is rendered by one or more graphics units on behalf of the client digital data processor, storing in a first cache the first digital image View, responding to a second render request from the client digital data processor in communication with the server digital data processor by executing one or more second render commands, where the one or more second render commands are partial render requests based at least in part on the first digital image View stored in the first cache, sending information in response to the second render request to modify the first digital image View and generate a second digital image View to the client digital data processor, where the second digital image view is rendered by the one or more graphics units on behalf of the client digital data processor, storing in a second cache the second digital image View and repeating steps E through G in response to a third render requests from a client digital data processor in communication with the server digital data processor.

In an embodiment of the present invention, a method for rendering images comprises executing a render server program on a server digital data processor, responding to a first render request from a client digital data processor in communication with the server digital data processor by executing one or more first render commands, sending in response to the first render request a first digital image View to the client digital data processor, where the first digital image View is rendered by one or more graphics units on behalf of the client digital data processor, storing in a first cache the first digital image View, responding to a second render request from the client digital data processor in communication with the server digital data processor by executing one or more second render commands, where the one or more second render commands are partial render requests based at least in part on the first digital image View stored in the first cache, sending information in response to the second render request to modify the first digital image View and generate a second digital image View to the client digital data processor, where the second digital image view is rendered by the one or more graphics units on behalf of the client digital data processor, storing in a second cache the second digital image View and repeating steps E through G in response to a third render requests from a client digital data processor in communication with the server digital data processor, where the first cache is stored on a client memory associated with the client digital data processor.

In an embodiment of the present invention, a method for rendering images comprises executing a render server program on a server digital data processor, responding to a first render request from a client digital data processor in communication with the server digital data processor by executing one or more first render commands, sending in response to the first render request a first digital image View to the client digital data processor, where the first digital image View is rendered by one or more graphics units on behalf of the client digital data processor, storing in a first cache the first digital image View, responding to a second render request from the client digital data processor in communication with the server digital data processor by executing one or more second render commands, where the one or more second render commands are partial render requests based at least in part on the first digital image View stored in the first cache, sending information in response to the second render request to modify the first digital image View and generate a second digital image View to the client digital data processor, where the second digital image view is rendered by the one or more graphics units on behalf of the client digital data processor, storing in a second cache the second digital image View and repeating steps E through G in response to a third render requests from a client digital data processor in communication with the server digital data processor, where the first cache is stored on a server memory associated with the server digital data processor.

In an embodiment of the present invention, a method for rendering images comprises executing a render server program on a server digital data processor, responding to a first render request from a client digital data processor in communication with the server digital data processor by executing one or more first render commands, sending in response to the first render request a first digital image View to the client digital data processor, where the first digital image View is rendered by one or more graphics units on behalf of the client digital data processor, storing in a first cache the first digital image View, responding to a second render request from the client digital data processor in communication with the server digital data processor by executing one or more second render commands, where the one or more second render commands are partial render requests based at least in part on the first digital image View stored in the first cache, sending information in response to the second render request to modify the first digital image View and generate a second digital image View to the client digital data processor, where the second digital image view is rendered by the one or more graphics units on behalf of the client digital data processor, storing in a second cache the second digital image View and repeating steps E through G in response to a third render requests from a client digital data processor in communication with the server digital data processor, where the first digital image View is a first discrete resolution level selected from a plurality of discrete resolution levels.

In an embodiment of the present invention, a method for rendering images comprises executing a render server program on a server digital data processor, responding to a first render request from a client digital data processor in communication with the server digital data processor by executing one or more first render commands, sending in response to the first render request a first digital image View to the client digital data processor, where the first digital image View is rendered by one or more graphics units on behalf of the client digital data processor, storing in a first cache the first digital image View, responding to a second render request from the client digital data processor in communication with the server digital data processor by executing one or more second render commands, where the one or more second render commands are partial render requests based at least in part on the first digital image View stored in the first cache, sending information in response to the second render request to modify the first digital image View and generate a second digital image View to the client digital data processor, where the second digital image view is rendered by the one or more graphics units on behalf of the client digital data processor, storing in a second cache the second digital image View and repeating steps E through G in response to a third render requests from a client digital data processor in communication with the server digital data processor, where the first digital image View is a first discrete resolution level selected from a plurality of discrete resolution levels, where the second digital image View is a second discrete resolution level selected from the plurality of discrete resolution levels, where the first discrete resolution level is not the same as the second discrete resolution level.

In an embodiment of the present invention, a method for rendering images comprises executing a render server program on a server digital data processor, responding to a first render request from a client digital data processor in communication with the server digital data processor by executing one or more first render commands, sending in response to the first render request a first digital image View to the client digital data processor, where the first digital image View is rendered by one or more graphics units on behalf of the client digital data processor, storing in a first cache the first digital image View, responding to a second render request from the client digital data processor in communication with the server digital data processor by executing one or more second render commands, where the one or more second render commands are partial render requests based at least in part on the first digital image View stored in the first cache, sending information in response to the second render request to modify the first digital image View and generate a second digital image View to the client digital data processor, where the second digital image view is rendered by the one or more graphics units on behalf of the client digital data processor, storing in a second cache the second digital image View and repeating steps E through G in response to a third render requests from a client digital data processor in communication with the server digital data processor, where the first digital image View is a first discrete resolution level selected from a plurality of discrete resolution levels, where the plurality of discrete resolution levels include resolution levels 1:1, 1:2, 1:4 and 1:8.

In an embodiment of the present invention, a method for rendering images comprises executing a render server program on a server digital data processor, responding to a first render request from a client digital data processor in communication with the server digital data processor by executing one or more first render commands, sending in response to the first render request a first digital image View to the client digital data processor, where the first digital image View is rendered by one or more graphics units on behalf of the client digital data processor, storing in a first cache the first digital image View, responding to a second render request from the client digital data processor in communication with the server digital data processor by executing one or more second render commands, where the one or more second render commands are partial render requests based at least in part on the first digital image View stored in the first cache, sending information in response to the second render request to modify the first digital image View and generate a second digital image View to the client digital data processor, where the second digital image view is rendered by the one or more graphics units on behalf of the client digital data processor, storing in a second cache the second digital image View and repeating steps E through G in response to a third render requests from a client digital data processor in communication with the server digital data processor, where the second digital image View is a zoom of the first digital image View.

In an embodiment of the present invention, a method for rendering images comprises executing a render server program on a server digital data processor, responding to a first render request from a client digital data processor in communication with the server digital data processor by executing one or more first render commands, sending in response to the first render request a first digital image View to the client digital data processor, where the first digital image View is rendered by one or more graphics units on behalf of the client digital data processor, storing in a first cache the first digital image View, responding to a second render request from the client digital data processor in communication with the server digital data processor by executing one or more second render commands, where the one or more second render commands are partial render requests based at least in part on the first digital image View stored in the first cache, sending information in response to the second render request to modify the first digital image View and generate a second digital image View to the client digital data processor, where the second digital image view is rendered by the one or more graphics units on behalf of the client digital data processor, storing in a second cache the second digital image View and repeating steps E through G in response to a third render requests from a client digital data processor in communication with the server digital data processor, where the second digital image View is a pan of the first digital image View.

In an embodiment of the present invention, a method for rendering images comprises executing a render server program on a server digital data processor, responding to a first render request from a client digital data processor in communication with the server digital data processor by executing one or more first render commands, sending in response to the first render request a first digital image View to the client digital data processor, where the first digital image View is rendered by one or more graphics units on behalf of the client digital data processor, storing in a first cache the first digital image View, responding to a second render request from the client digital data processor in communication with the server digital data processor by executing one or more second render commands, where the one or more second render commands are partial render requests based at least in part on the first digital image View stored in the first cache, sending information in response to the second render request to modify the first digital image View and generate a second digital image View to the client digital data processor, where the second digital image view is rendered by the one or more graphics units on behalf of the client digital data processor, storing in a second cache the second digital image View and repeating steps E through G in response to a third render requests from a client digital data processor in communication with the server digital data processor, where the first digital image View stored in the first cache is sufficient to construct a discrete resolution level shown in the first digital image View.

In an embodiment of the present invention, a method for rendering images comprises executing a render server program on a server digital data processor, responding to a first render request from a client digital data processor in communication with the server digital data processor by executing one or more first render commands, sending in response to the first render request a first digital image View to the client digital data processor, where the first digital image View is rendered by one or more graphics units on behalf of the client digital data processor, storing in a first cache the first digital image View, responding to a second render request from the client digital data processor in communication with the server digital data processor by executing one or more second render commands, where the one or more second render commands are partial render requests based at least in part on the first digital image View stored in the first cache, sending information in response to the second render request to modify the first digital image View and generate a second digital image View to the client digital data processor, where the second digital image view is rendered by the one or more graphics units on behalf of the client digital data processor, storing in a second cache the second digital image View and repeating steps E through G in response to a third render requests from a client digital data processor in communication with the server digital data processor, where the first digital image View stored in the first cache is sufficient to construct a higher resolution level than shown in the first digital image View.

In an alternative embodiment of the invention, a method for rendering images comprises executing a render server program on a server digital data processor, responding to a first render request from a client digital data processor in communication with the server digital data processor by executing one or more first render commands, sending in response to the first render request a first View to the client digital data processor, where the first View is rendered by one or more graphics units on behalf of the client digital data processor, storing in a first cache the first View, responding to a second render request from the client digital data processor in communication with the server digital data processor by executing one or more second render commands, where the one or more second render commands are used to construct pixels outside a first viewport based on the second render request and the first View, sending information in response to the second render request to modify the first View and generate a second View to the client digital data processor, where the second View is rendered by the one or more graphics units on behalf of the client digital data processor, storing in a second cache the second View and repeating steps E through G in response to a third and subsequent render requests from a client digital data processor in communication with the server digital data processor.

In an alternative embodiment of the invention, a method for rendering images comprises executing a render server program on a server digital data processor, responding to a first render request from a client digital data processor in communication with the server digital data processor by executing one or more first render commands, sending in response to the first render request a first View to the client digital data processor, where the first View is rendered by one or more graphics units on behalf of the client digital data processor, storing in a first cache the first View, responding to a second render request from the client digital data processor in communication with the server digital data processor by executing one or more second render commands, where the one or more second render commands are used to construct pixels outside a first viewport based on the second render request and the first View, sending information in response to the second render request to modify the first View and generate a second View to the client digital data processor, where the second View is rendered by the one or more graphics units on behalf of the client digital data processor, storing in a second cache the second View and repeating steps E through G in response to a third and subsequent render requests from a client digital data processor in communication with the server digital data processor, where at least the first View is stored on a client memory associated with the client digital data processor.

In an alternative embodiment of the invention, a method for rendering images comprises executing a render server program on a server digital data processor, responding to a first render request from a client digital data processor in communication with the server digital data processor by executing one or more first render commands, sending in response to the first render request a first View to the client digital data processor, where the first View is rendered by one or more graphics units on behalf of the client digital data processor, storing in a first cache the first View, responding to a second render request from the client digital data processor in communication with the server digital data processor by executing one or more second render commands, where the one or more second render commands are used to construct pixels outside a first viewport based on the second render request and the first View, sending information in response to the second render request to modify the first View and generate a second View to the client digital data processor, where the second View is rendered by the one or more graphics units on behalf of the client digital data processor, storing in a second cache the second View and repeating steps E through G in response to a third and subsequent render requests from a client digital data processor in communication with the server digital data processor, where the first View is a first discrete resolution level selected from a plurality of discrete resolution levels.

In an alternative embodiment of the invention, a method for rendering images comprises executing a render server program on a server digital data processor, responding to a first render request from a client digital data processor in communication with the server digital data processor by executing one or more first render commands, sending in response to the first render request a first View to the client digital data processor, where the first View is rendered by one or more graphics units on behalf of the client digital data processor, storing in a first cache the first View, responding to a second render request from the client digital data processor in communication with the server digital data processor by executing one or more second render commands, where the one or more second render commands are used to construct pixels outside a first viewport based on the second render request and the first View, sending information in response to the second render request to modify the first View and generate a second View to the client digital data processor, where the second View is rendered by the one or more graphics units on behalf of the client digital data processor, storing in a second cache the second View and repeating steps E through G in response to a third and subsequent render requests from a client digital data processor in communication with the server digital data processor, where the first View is a first discrete resolution level selected from a plurality of discrete resolution levels, where the first cache is a higher resolution level than the first discrete resolution level.

In an alternative embodiment of the invention, a method for rendering images comprises executing a render server program on a server digital data processor, responding to a first render request from a client digital data processor in communication with the server digital data processor by executing one or more first render commands, sending in response to the first render request a first View to the client digital data processor, where the first View is rendered by one or more graphics units on behalf of the client digital data processor, storing in a first cache the first View, responding to a second render request from the client digital data processor in communication with the server digital data processor by executing one or more second render commands, where the one or more second render commands are used to construct pixels outside a first viewport based on the second render request and the first View, sending information in response to the second render request to modify the first View and generate a second View to the client digital data processor, where the second View is rendered by the one or more graphics units on behalf of the client digital data processor, storing in a second cache the second View and repeating steps E through G in response to a third and subsequent render requests from a client digital data processor in communication with the server digital data processor, where the first View is a first discrete resolution level selected from a plurality of discrete resolution levels, where the first cache is a higher resolution level than the first discrete resolution level, where the second View is a zoom of the first View constructed based on the first cache.

In an alternative embodiment of the invention, a method for rendering images comprises executing a render server program on a server digital data processor, responding to a first render request from a client digital data processor in communication with the server digital data processor by executing one or more first render commands, sending in response to the first render request a first View to the client digital data processor, where the first View is rendered by one or more graphics units on behalf of the client digital data processor, storing in a first cache the first View, responding to a second render request from the client digital data processor in communication with the server digital data processor by executing one or more second render commands, where the one or more second render commands are used to construct pixels outside a first viewport based on the second render request and the first View, sending information in response to the second render request to modify the first View and generate a second View to the client digital data processor, where the second View is rendered by the one or more graphics units on behalf of the client digital data processor, storing in a second cache the second View and repeating steps E through G in response to a third and subsequent render requests from a client digital data processor in communication with the server digital data processor, where the first View is a first discrete resolution level selected from a plurality of discrete resolution levels, where the first cache is a higher resolution level than the first discrete resolution level, where the second View is a second discrete resolution level selected from the plurality of discrete resolution levels, where the first discrete resolution level is not the same as the second discrete resolution level.

In an alternative embodiment of the invention, a method for rendering images comprises executing a render server program on a server digital data processor, responding to a first render request from a client digital data processor in communication with the server digital data processor by executing one or more first render commands, sending in response to the first render request a first View to the client digital data processor, where the first View is rendered by one or more graphics units on behalf of the client digital data processor, storing in a first cache the first View, responding to a second render request from the client digital data processor in communication with the server digital data processor by executing one or more second render commands, where the one or more second render commands are used to construct pixels outside a first viewport based on the second render request and the first View, sending information in response to the second render request to modify the first View and generate a second View to the client digital data processor, where the second View is rendered by the one or more graphics units on behalf of the client digital data processor, storing in a second cache the second View and repeating steps E through G in response to a third and subsequent render requests from a client digital data processor in communication with the server digital data processor, where the first View is a first discrete resolution level selected from a plurality of discrete resolution levels, where the first cache is a higher resolution level than the first discrete resolution level, where the plurality of discrete resolution levels include 1:1, 1:2, 1:4 and 1:8.

In an alternative embodiment of the invention, a method for rendering images comprises executing a render server program on a server digital data processor, responding to a first render request from a client digital data processor in communication with the server digital data processor by executing one or more first render commands, sending in response to the first render request a first View to the client digital data processor, where the first View is rendered by one or more graphics units on behalf of the client digital data processor, storing in a first cache the first View, responding to a second render request from the client digital data processor in communication with the server digital data processor by executing one or more second render commands, where the one or more second render commands are used to construct pixels outside a first viewport based on the second render request and the first View, sending information in response to the second render request to modify the first View and generate a second View to the client digital data processor, where the second View is rendered by the one or more graphics units on behalf of the client digital data processor, storing in a second cache the second View and repeating steps E through G in response to a third and subsequent render requests from a client digital data processor in communication with the server digital data processor, where the second View is a pan of the first View.

In a further embodiment of the invention, a system for rendering images comprises a client digital data processor, a server digital data processor in communications coupling with the one or more client digital data processors, the server digital data processor comprising one or more graphics processing units a render server, executing on the server digital data processor, the render server responding to a first render request from the one or more client digital data processors by executing one or more render commands, where the render server responds to a first render requests by sending to the client digital data processor a first View which is stored in a cache on a client memory and the render server responding to a second render request by calculating and sending to the client digital data processor information required to construct a second View based on the first View and a delta information to construct pixels outside the first View corresponding to the second View.

In a further embodiment of the invention, a system for rendering images comprises a client digital data processor, a server digital data processor in communications coupling with the one or more client digital data processors, the server digital data processor comprising one or more graphics processing units a render server, executing on the server digital data processor, the render server responding to a first render request from the one or more client digital data processors by executing one or more render commands, where the render server responds to a first render requests by sending to the client digital data processor a first View which is stored in a cache on a client memory and the render server responding to a second render request by calculating and sending to the client digital data processor information required to construct a second View based on the first View and a delta information to construct pixels outside the first View corresponding to the second View, where the render server responds to the second render request by calculating and sending to the client digital data processor only the delta information to construct pixels outside the first View.

In a further embodiment of the invention, a system for rendering images comprises a client digital data processor, a server digital data processor in communications coupling with the one or more client digital data processors, the server digital data processor comprising one or more graphics processing units a render server, executing on the server digital data processor, the render server responding to a first render request from the one or more client digital data processors by executing one or more render commands, where the render server responds to a first render requests by sending to the client digital data processor a first View which is stored in a cache on a client memory and the render server responding to a second render request by calculating and sending to the client digital data processor information required to construct a second View based on the first View and a delta information to construct pixels outside the first View corresponding to the second View, where the render server responds to the second render request by calculating a spatial difference between the second View and the first View, where spatial resolution is taken into account by sending pixels that where not contained in the first View that are contained in the second View, where the render server responds by selecting from a set of fixed resolutions a lowest resolution level sufficient to render the second View, where the render server sends to the client digital data processor the second View if a second View resolution level is greater than a first View resolution level, and where the second View is constructed from the cache if a second View resolution level is equal to or lower than the first View resolution level.

In a further embodiment of the invention, a system for rendering images comprises a client digital data processor, a server digital data processor in communications coupling with the one or more client digital data processors, the server digital data processor comprising one or more graphics processing units a render server, executing on the server digital data processor, the render server responding to a first render request from the one or more client digital data processors by executing one or more render commands, where the render server responds to a first render requests by sending to the client digital data processor a first View which is stored in a cache on a client memory and the render server responding to a second render request by calculating and sending to the client digital data processor information required to construct a second View based on the first View and a delta information to construct pixels outside the first View corresponding to the second View, where the render server response to the first render request contains the first View at a defined resolution higher than a resolution requested in the first render request.

In a further embodiment of the invention, a system for rendering images comprises a client digital data processor, a server digital data processor in communications coupling with the one or more client digital data processors, the server digital data processor comprising one or more graphics processing units a render server, executing on the server digital data processor, the render server responding to a first render request from the one or more client digital data processors by executing one or more render commands, where the render server responds to a first render requests by sending to the client digital data processor a first View which is stored in a cache on a client memory and the render server responding to a second render request by calculating and sending to the client digital data processor information required to construct a second View based on the first View and a delta information to construct pixels outside the first View corresponding to the second View, where the render server responds to the second render request by calculating a spatial difference between the second View and the first View, where the second render request requires a higher defined resolution than the first render request and the render server response to the second render request is constructed from the cache.

In a further embodiment of the invention, a system for rendering images comprises a client digital data processor, a server digital data processor in communications coupling with the one or more client digital data processors, the server digital data processor comprising one or more graphics processing units a render server, executing on the server digital data processor, the render server responding to a first render request from the one or more client digital data processors by executing one or more render commands, where the render server responds to a first render requests by sending to the client digital data processor a first View which is stored in a cache on a client memory and the render server responding to a second render request by calculating and sending to the client digital data processor information required to construct a second View based on the first View and a delta information to construct pixels outside the first View corresponding to the second View, where the delta information sent in response to the second render request takes into account a difference in gray value mapping according to the following algorithm:

let $t=o/255*(d2-d1)+d1$,
if $t<e1$ then $p=0$
else if $t>e2$ then $p=255$
else $p=255*(t-e1)/(e2-e1)$,
with o is a pixel value in the first View and p is a corresponding pixel in the second View and $d1, \ldots, d2$ are a Data Window of the first View and $e1, \ldots, e2$ are a Data Window of the second View.

In order to diagnose a traditional X-Ray examination, the images printed on films would be 'hung' in front of a light box. For multi-image examinations, as well as for comparison with priors, the 'hanging' would often follow a specific protocol. For example, a particular organization or doctor may choose for a two-view chest X-Ray with a two-view prior exam, that the films be hung from left to right as follows: Frontal view of current examination, lateral view of current examination, frontal view of prior examination, lateral view of prior examination. In contrast, the doctor may hang mammography exams with the corresponding views of current and prior next to each other, if that was more appropriate for the diagnostic workflow in that case. Thus, the organization or doctor developed a traditional 'Hanging Protocol'. Currently, the film and the light box are often being replaced by computer systems, called PACS (Picture Archiving and Communication System). PACS systems can mimic the Hanging Protocols.

Traditional X-Ray examinations typically produce one or a small number of single two dimensional (2D) images. In contrast, the more advanced imaging modalities such as Computer Tomography (CT), Magnetic Resonance Imaging (MRI) or Positron Emission Tomography (PET) can produce dozens of series, each consisting of a hundred or more images. It is possible and not uncommon to review images from these advanced modalities in the same manner as traditional X-Ray images, i.e., by hanging the individual images side-by-side, either on a light-box or using a PACS system.

The invention pertains to digital data processing and, more particularly, by way of example, to the visualization of image data. Three dimensional (3D) and four dimensional (4D) image data is routinely acquired with CT, MRI, PET, confocal microscopes, 3D ultrasound devices, and other imaging devices. The medical imaging market is just one example of a market that uses these devices. The visualization of image data market is growing rapidly, with new CT scanners collecting larger amounts of data more quickly than previous generation CT scanners. The invention has application to areas including medical imaging, atmospheric studies, astrophysics and geophysics.

With the rapid increase in the amounts and types of information that can be acquired using imaging technology, we have identified a substantial problem with integrating different types of image-based information into a form that can be used by a physician or diagnostician. Namely, although there may be many different types of image data, the forms, formats, integration, and display of relevant information is extremely difficult for a person to carry out without sophisticated computer processing. Embodiments of this invention therefore provide a computer-based analytic framework whereby image-based information from a variety of different sources can be integrated to provide increased ability to diagnose and evaluate a patient's condition. We have identified another substantial problem in the art, namely the increased likelihood of confusion of image-based information from different patients. In such situations, a physician or diagnostician may be presented with image-based information from different patients. Such inadvertent conflation can produce mis-diagnosis or mistaken non-diagnosis. In each case, the outcome for the patient can be serious, and can result in increased morbidity and mortality.

In general aspects of this invention, a First Study is first selected for review by a physician or diagnostician. Selection of a Study will generally be based on some particular characteristic. Such characteristic can be anatomical, disease-based, or both. Once a First Study is selected, an Additional Candidate Study can be selected based on the anatomical location of the First Study. Therefore, if the First Study is a Chest X-Ray, an Additional Candidate Study can be a Chest CT scan, MRI, positron-emission tomography (PET) scan, or other image of the chest. Alternatively, if a First Study is an X-Ray image of the gastrointestinal tract, an Additional Candidate Study could be a series of X-Ray images taken after ingestion of a contrast agent (such as barium). It can be appreciated that such anatomically selected Additional Candidate Studies can be applied to any organ, organ system, or tissue.

Alternatively, Additional Candidate Studies can be selected based on the type of disorder of disease being evaluated. For example, in a case in which a patient has had a diagnosis of cancer of one organ (e.g., lung), it can be desirable for Additional Candidate Studies to be targeted to identification of metastases in another organ. Thus, if a First Study is a Chest X-Ray, an Additional Candidate Study can be of the lymphatic system, head and neck, or various abdominal quadrants. Such Additional Candidate Studies may be X-ray, CT scans, MRI scans, PET scans, vascular visualizations (e.g., with injected contrast media) or histological images taken during a biopsy. Because the degree of detail (i.e., "granularity") obtained using different imaging techniques may vary widely it can be desirable to have a Rule Based process whereby the granularity of an Additional Candidate Study is increased over that of the First Study.

For example, a Chest X-Ray is a two-dimensional image in which the entirety of the chest and lungs is represented as a flat image. An Additional Candidate Study could be a CT scan, where "2-dimensional" images are acquired at a series of different "depths" (e.g., "slices") through the organ. If the 2-dimensional images are of sufficient quality to produce a 3-dimensional image of the organ with desirable degree of granularity, then the Additional Candidate Study can be depicted and displayed along with the image of the First Study.

General Rule 1 for selecting an Additional Candidate Study therefore can be:

IF (Primary.Dicom.BodyPartExamined) is "ANATOMICAL REGION 1", and (Primary.Dicom.Modality=IMAGE TYPE 1").

THEN SELECT other studies for loading, WHERE (Other.Dicom.BodyPart Examined=ANATOMICAL REGION 1") and (Other.Dicom.Modality="IMAGE TYPE 2").

If desired, in General Rule 1, Additional Candidate Studies can target "Other.Dicom.Modality="IMAGE TYPE 2").

It can be appreciated that any number of Additional Candidate Studies can be integrated using the computer-based processes of this invention.

Alternatively, General Rule 2 for selecting an Additional Candidate Study therefore can be:

IF (Primary.Dicom.Disease) is "DISEASE 1", and (Primary.Dicom.Modality=IMAGE TYPE 1")

THEN SELECT other studies for loading, WHERE (Other.Dicom.Disease)="DISEASE 1") and (Primary.Dicom.Modality="IMAGE TYPE 2").

It can be readily appreciated that application of General Rule 2 can integrate other Anatomical Regions and a number of different Image Types. It can also be appreciated that using "DICOM" in the rules, the likelihood of conflation of images from different patients can be substantially or completely eliminated.

Additionally, to consider information derived from different patients simultaneously, the selection for "DICOM" can be in a First Study, "DICOM 1" and THEN SELECT an image from "DICOM 2." Integrating this additional feature into a Rule Based computerized system can permit detection and analysis of disease "clusters" (e.g., cancer clusters; toxin-induced clusters, infection clusters, and the like).

In an embodiment of the present invention, a method or system uses a rule derived basis to display image sets. In various embodiments of the present invention, the selection of the images to be displayed, the layout of the images, i.e., the hanging, as well as the rendering parameters and styles can be determined using a rule derived basis. In an embodiment of the present invention, the user is presented with images displayed based on their preferences without having to first manually adjust parameters. Accordingly, there is a time saving in not displaying images initially in a non-rule derived basis.

These and other aspects of the invention are evident in the drawings and in the description that follows.

DETAILED DESCRIPTION OF THE INVENTION

Overview

Often, the traditional 'Hanging Protocol' is either not intuitive, cannot display the information in a manner in which it can be reviewed or is not the most efficient way to display images. Alternative ways of rendering the acquired images can be more efficient or more appropriate for displaying the information. Examples include Volume Rendering techniques or maximum intensity projections of stacks of cross-sectional images, rendering of oblique slices, rendering of thick slices or slabs, or rendering of fused images (e.g. in PET/CT). Specialized diagnostic workstations that are often specific to a clinical application area are used to provide appropriate rendering of the acquired images. As organizations and doctors require better and faster visualization methods that allow users to interact with the image data in real-time, the requirements and demands for displaying the data will increase.

Figure 19:
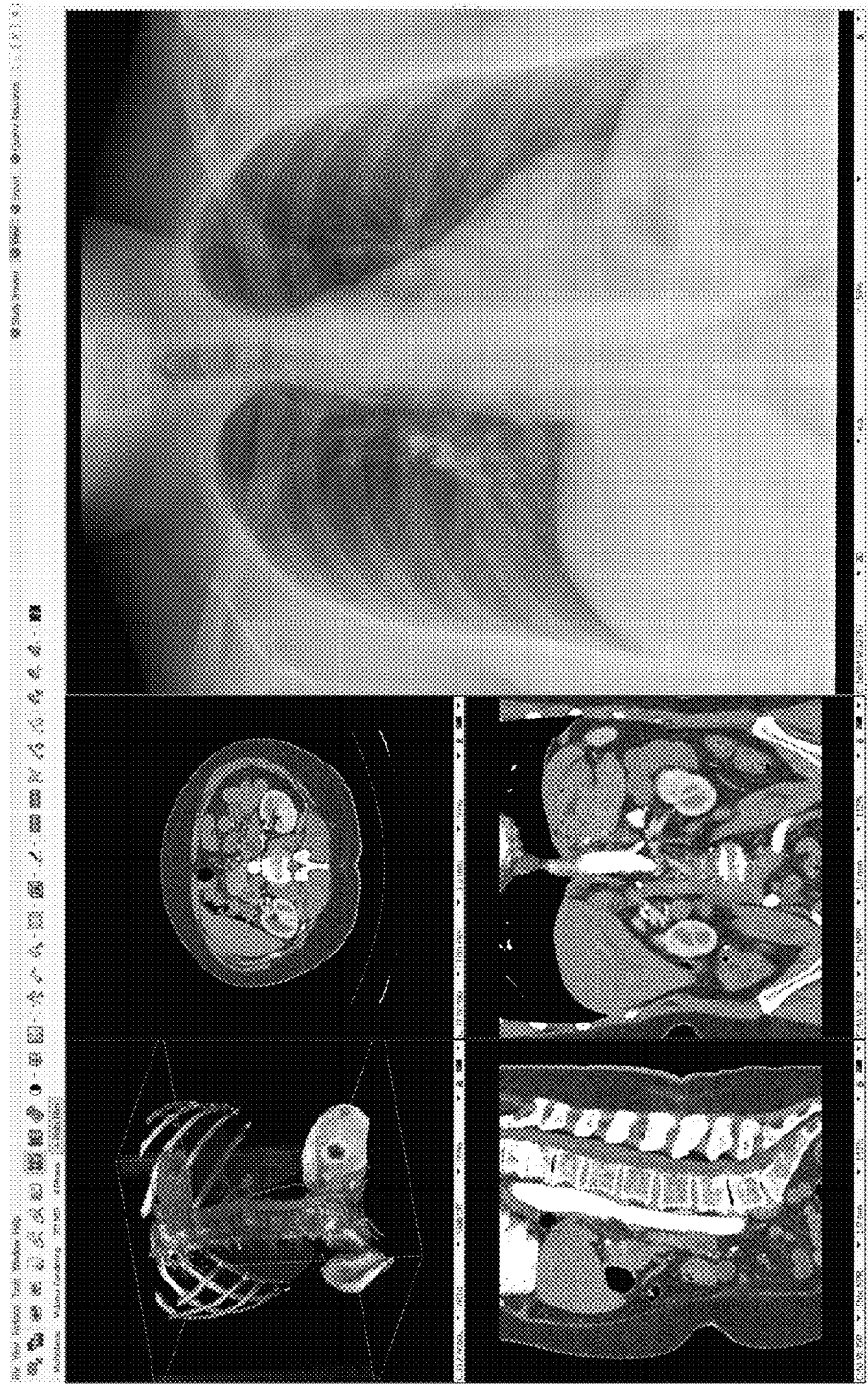
FIG. 19 depicts the resulting display for an example study, according to an embodiment of the invention.

FIG. 19 depicts an example study where the rules have created two Sets of Images. One Set of Images consists of a series of CT images forming a 3D volume, which is depicted in a volume rendered style in the Viewport 1160 in the upper left and in three orthogonal cross sections in the three other viewports in the left half of the screen. The second Set of Images consist of one chest X-Ray, assigned to a single Viewport 1160 covering the right half of the screen and rendering the X-Ray in 2D style. Appropriate data windows have been chosen by the rules to highlight the vasculature in the 3D rendering, as this is a study with contrast, as the rules can determine by the StudyDescription containing the word 'contrast'.

Figure 18:
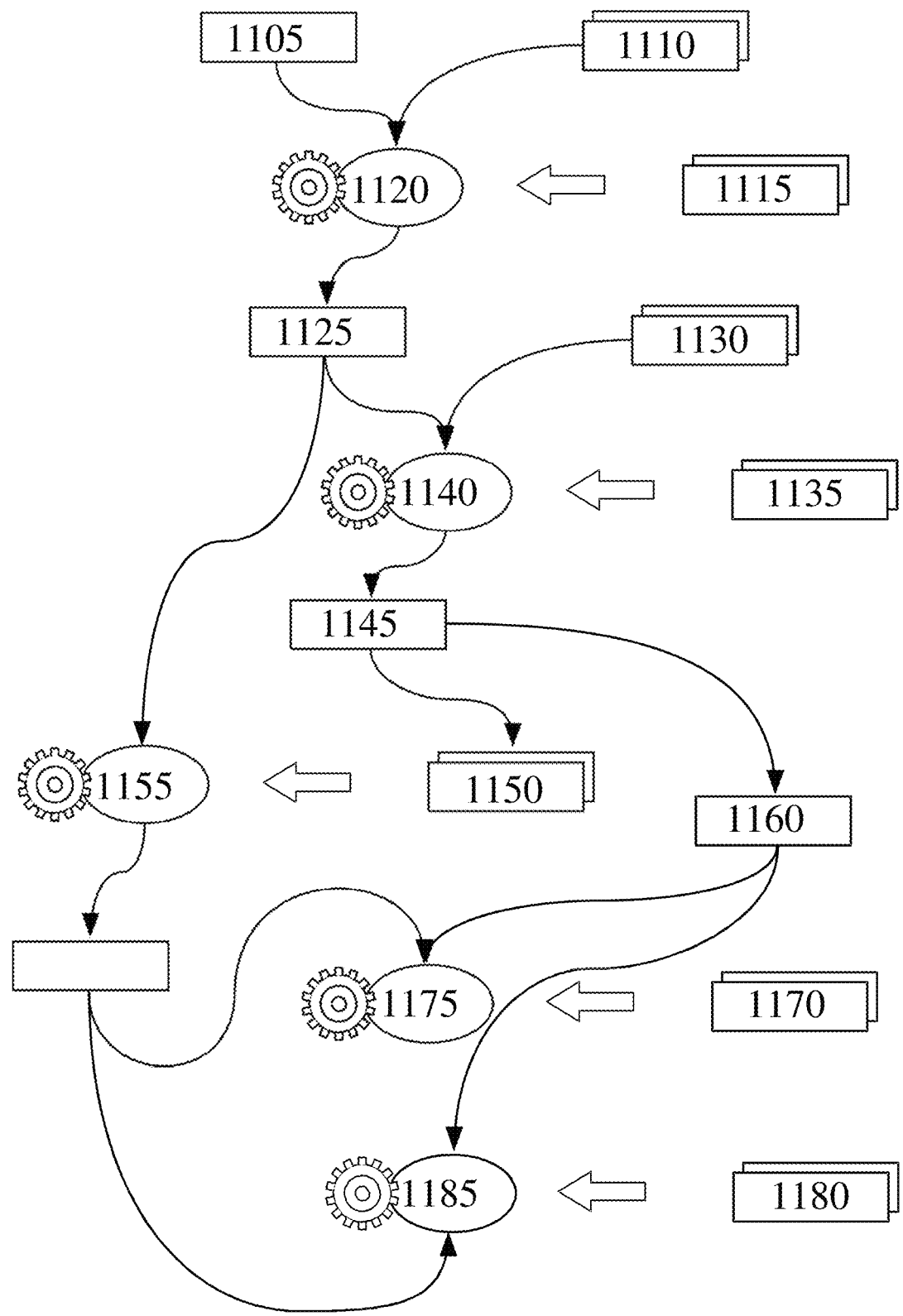
FIG. 18 depicts a flow chart showing the steps of applying various rules to the selected Study, according to an embodiment of the invention.

FIG. 18 is a flow chart showing how the rules are used to create the two Sets of Images shown in FIG. 19. As shown in FIG. 18, a primary Study 1105 which can be manually selected by a user. In step (i) 1120, based on Study Selection Rules 1115 which interrogate parameters in the primary Study 1105 such as DICOM Parameters and Abstract Tags of both the primary Study 1105 and the candidate studies 1110, the Study Selection Rules 1115 can identify additional candidate studies 1110. The second set of studies 1125 which includes the candidate studies 1110 and the primary Study 1105 are available to be loaded into Viewports 1160. In step (ii) 1140, the Protocol Selection Rules 1135 select a Display Protocol 1145 from the Available Display Protocols 1130 based on DICOM Parameters and Abstract Tags present in the second studies 1125. In step (iii) 1155, Image Set Rules 1150 are used to define a plurality of Image Sets 1165 from the second studies 1125. The one or more Viewports 1160 are defined in the Display Protocol 1145. In step (iv) 1175, Viewport Assignment Rules 1170 assign one or more Image Sets 1165 to one or more Viewports 1160. In step (v) 1185, Style Rules 1180 define a rendering style and rendering parameters. In an embodiment of the invention steps (i) through (v) are performed by a server processor running a render server program with an interface shown in FIG. 20 in which the rules (Study Selection Rules 1115, Protocol Selection Rules 1135, Image Set Rules 1150, Viewport Assignment Rules 1170, and the one or more Style Rules 1180) are used to automatically select and display the Image Sets 1165 in the Viewports 1160.

Study Selection Rules 1115

In an embodiment of the present invention, based on the Study that the user selects for display (primary Study 1105), the system can first apply user defined rules to determine additional studies to be displayed together with the primary Study 1105. Such additional studies can be prior examinations that are relevant for the diagnosis of the current Study, or additional current studies. For example, a PET examination will often be looked at together with a CT examination acquired at the same time. The set of rules are constructed as follows:

Each rule consists of a matching criterion for the primary Study 1105 (primary condition), as well as matching criteria for additional studies (secondary condition). The matching criterion is an expression consisting of operators that allow evaluating the parameters of the Study and comparing them to defined values. The parameters of the Study are any parameters defined by the DICOM standard, such as Study Description, Study Date, Modality, Patient Age, as well as any other parameters that can be derived from the DICOM parameters or from the Study itself, such as number of images, or number of image series. The operators are numeric or string based operators, such as equals, greater than, less than, contains, etc. Expressions can be combined using Boolean operators such as AND, OR, NOT. Operators can also contain more complex expressions, including user defined functions defined in an appropriate programming language, such as JavaScript or VisualBasic.

Once a primary Study 1105 has been selected for display, the primary condition of each rule is evaluated. Those rules that match, i.e., evaluate to "true" for the given primary Study 1105, will then be applied to all other studies that are available for the same patient. Those other studies for which the secondary condition matches will be added to the list of studies to be displayed.

The following rule illustrates the concept. This rule will automatically load prior Chest X-Rays or prior Chest CT if the primary Study 1105 is a Chest X-RAY.

Study Selection Rule 1:
IF (Primary.Dicom.BodyPartExamined="CHEST" and Primary.Dicom.Modality="CR") THEN SELECT other studies for loading WHERE (Other.Dicom.BodyPartExamined="CHEST" and (Other.Dicom.Modality="CR" or Other.Dicom.Modality="CT"))

The rule is expressed in pseudo-code with the primary condition specified in the IF-clause and the secondary condition expressed in the SELECT-clause.

Study Selection Rules: Normalization of DICOM Parameters

In an embodiment of the present invention, the rules can normalize DICOM parameters. As described above, a Study Selection Rule can contain arbitrary DICOM parameters. The DICOM standard specifies if a particular parameter is defined on a patient, Study, series, or image level. For example, a Study-level parameter should have the same value in all images of a Study, while a series-level parameter should have the same value in all images of a series. There are two problems related to assuming that this statement is always the case. Firstly, although a Study-level tag should have the same value for all images of a Study this is not always true. Secondly, some parameters are defined on a series- or image-level (e.g. modality is a series-level parameter) and therefore can be unavailable. In both cases it can be unclear what value is to be used when evaluating the rule. The invention described here provides different solutions to this problem.

In an embodiment of the present invention, a first approach is to choose a reference image and to read the value of a particular DICOM parameter from the reference image. The reference image can be: (i) the image that was inserted into the system first, (ii) the image with the oldest image content date, (iii) the image that was inserted into the system last, or (iv) the image with the earliest image content date. The choice of which image is to be chosen as the reference image can be configured for each parameter separately.

In an embodiment of the present invention, a second approach is to only allow original images to be chosen as the reference image. Non-viewable DICOM objects like structured reports, key objects, or presentation states are disregarded, as well as derived images such as secondary capture images or reformatted images.

In an embodiment of the present invention, a third approach is to provide a list of all distinct values that a particular DICOM parameter has in the images of a Study. In a Study Selection Rule one can then check if that list contains a particular value. The example above can then read as follows:

Study Selection Rule 2:
IF (Primary.Dicom.BodyPartExamined="CHEST" and Primary.DicomList.Modality contains "CR") THEN SELECT other studies for loading WHERE (Other.Dicom.BodyPartExamined="CHEST" and (Other.DicomList.Modality contains "CR" or Other.DicomList.Modality contains "CT"))

Study Selection Rules: Abstract Tags

In an embodiment of the present invention, the Study Selection Rules 1115 contain other derived parameters such as Abstract Tags that characterize a Study in addition to or instead of DICOM parameters. Abstract tags that are useful within Study Selection Rules 1115 include the following:

(i) RelativeStudyAge indicates relative age of Study in days compared to primary Study 1105.
(ii) PriorIndex indicates an index that enumerates all other studies from youngest to oldest.
(iii) NumImages indicates number of images in Study.
(iv) NumSeries indicated number of image series in Study.
(v) Num3DVolumes indicates number of 3D volumes in Study.
(vi) Num4DSequences indicates number of 4D sequences in Study (e.g. Cardiac CT).
(vii) HasReport indicates a flag that indicates if a report is available for a Study.
(viii) HasThinSliceVolumes indicates whether the study has at least one set of images that form a true 3D volume, i.e. a sufficiently large number of equidistant slices (the exact number can be user configurable, e.g. 30 would be a common choice) and a sufficiently small spacing between two consecutive slices to guarantee an isotropic (or close to isotropic) (again, this parameter can be user defined, values between 1 mm and 3 mm are common thresholds for CT and MR examinations).

For example, a rule that applies to a Mammogram Study and that selects at maximum three prior Mammogram studies no older than five years can read as follows:

Study Selection Rule 3:
IF (Primary.Dicom.Modality="MG" THEN SELECT other studies for loading WHERE (Other.Dicom.Modality="MG" and Other.Abstract.PriorIndex<=3 and Other.Abstract.RelativeStudyAge<5*365)

Protocol Selection Rules 1135

In an embodiment of the present invention, once the studies to be displayed are determined as described above, a suitable display protocol can be selected. This is done using matching rules. Each matching rule consists of conditions that are applied to the primary and other studies to be loaded. Like in Study Selection Rules 1115, protocol selection rules may contain DICOM parameters (either taken from a reference image or provided as a list of distinct values gathered from all images of a study), as well as abstract tags and user-defined functions. Each matching rule has a score and an associated display protocol.

In an embodiment of the present invention, all matching rules are evaluated and the display protocol of the matching rule that evaluates to true can be selected. If multiple matching rules evaluate to true, the one with the highest score can be selected.

The following example rule illustrates a matching rule that can apply for PET/CT studies of the abdomen to select a protocol named "StandardPetCTProtocol1" with a score of 10.

Protocol Selection Rule 1:
IF (Primary.Dicom.BodyPartExamined="ABDOMEN" and Primary.Dicom.Modality="CT" and Exists(Other1) and Other1.Dicom.Modality="PET") THEN SELECT "StandardPetCTProtocol1" with score=10

In an embodiment of the present invention, the rule is expressed in pseudo-code with the matching condition specified in the IF-clause and the chosen protocol specified by the SELECT.

Image Set Rules 1150

In an embodiment of the present invention, once a display protocol is selected, further rules defined within the protocol are evaluated. The next step comprises creation of so-called image sets. An image set consists of images that are logically grouped together. Usually, an image set is represented by a single preview icon in the application. It is an image set that is loaded into a viewer or tiled viewer. Note that DICOM series also represent a logical grouping of images. However, often DICOM series are not well suited for hanging of images and viewing. For example, in Mammography a single DICOM series may contain images of both left and right breast, in MRI it may contain both T1 and T2 images, or in CT it may contain both a localizer image (topogram) and a 3D image stack. In all these cases the DICOM series can be split into different logical image sets. On the other hand, multiple DICOM series may represent the phases of a single 4D cardiac data set. In this case all those series can be joined into a single logical image set.

Thus the creation of image sets based on rules is a key component of the rule-based display system, specifically for the more advanced rendering techniques. For example, the rules-based display system is used to create image sets that are very similar to the rules described above in Study Selection Rules 1115 and Protocol Selection Rules 1135 sections. A rule is a Boolean expression that can contain DICOM parameters, abstract tags, or used-defined functions that are based on the DICOM parameters, abstract tags, or used-defined functions. Image set rules however, are applied to all images of a study that was selected for loading (and not to the study itself). Image-level parameters thus represent no problem and do not need to be normalized or otherwise treated specially. All images that match an image-set rule are grouped into a respective image set.

In an embodiment of the present invention, the following rule (expressed in pseudo-code) collects all images of a current CT study:
Image Set Rule 1:
IF (Dicom.Modality="CT" and Abstract.PriorIndex=0)
THEN CREATE image set with ID 1

In an embodiment of the present invention, the resulting image sets can be assigned IDs or names that allow for referencing the image sets later in layout and display set rules. In the above example an image set with ID 1 was defined. If no image matches an image set rule, no such corresponding image set will be created.

Image Set Rules: Sorting

In an embodiment of the present invention, the order of images within an image set is an important aspect. It determines how images are shown when the user browses through the image set or how images are distributed into the tiles of a tiled viewer. In one embodiment of the present invention, in order to specify image sorting, the image set rules can contain an ordered list of sorting criteria. All images that are matched by a rule are sorted according to those criteria.

For example, the following rule collects all images of a current CT study and sorts them according to DICOM series number at first and DICOM instance/image number at second. Image Set Rule 2:
IF (Dicom.Modality="CT" and Abstract.PriorIndex=0)
THEN CREATE image set with ID 1
    SORTED BY Dicom.SeriesNumber ORDER:=ascending
    SORTED BY Dicom.InstanceNumber ORDER:=ascending Image Set Rules: Splitting In an embodiment of the present invention, sorting criteria can be extended by a split flag. With the split flag it is possible to create multiple image sets from a single image set rule. When the value of a sorting criterion with split flag set to true changes, sub-sequent images are automatically inserted into a new image set. The resulting image sets are automatically enumerated by a sub-level ID.

For example, the following rule essentially creates image sets that correspond to DICOM series, because all images with different series number will be split into different sets:
Image Set Rule 3:
IF (Dicom.Modality="CT" and Abstract.PriorIndex=0)
THEN CREATE image set with ID 1.x
    SORTED BY Dicom.SeriesNumber ORDER:=ascending SPLIT:=true
    SORTED BY Dicom.InstanceNumber ORDER:=ascending SPLIT:=false In applications where a CT has been measured, it can happen that a study contains both a soft-kernel series and a hard kernel series and both series have the same series number. In order to separate the images into different image sets the above rule can be extended by the following:
Image Set Rule 4:
IF (Dicom.Modality="CT" and Abstract.PriorIndex=0)
THEN CREATE image set with ID 1.x
    SORTED BY Condition.CTSoftTisseKernel SPLIT:=true
    SORTED BY Dicom.SeriesNumber ORDER:=ascending SPLIT:=true
    SORTED BY Dicom.InstanceNumber ORDER:=ascending SPLIT:=false Here, Condition.CTSoftTissueKernel denotes a user-defined Boolean condition that tests whether an image has a CT soft-tissue kernel. The actual implementation of this condition can for example evaluate the manufacturer (which is encoded in a DICOM parameter). Depending on its value the rule can evaluate further parameters to find out if an image was reconstructed using a soft-tissue kernel or not. Since this Boolean condition was used as a sorting criterion with the split flag set to true, all non-soft-kernel images can be put into an image set with ID 1.1 and all soft-kernel images can be put into an image set with ID 1.2 (unless the image set is further split and IDs like 1.3 or 1.4 are created).

Image Set Rules: More Abstract Tags

In an embodiment of the present invention, additional abstract tags are used in image set rules. One example is a tag that identifies whether an image has already been put into an image set. In principle, a single image can be put into multiple image sets, but sometimes this should be avoided.

This can be achieved by evaluating image set rules in a pre-defined order and introducing an abstract tag AlreadyReferenced.

For example, in CT study that has a localizer image and a 3D image stack both stored in one DICOM series, one may want to create an image set, one for the localizer and one for the 3D image stack. Accordingly, the image set rules are defined as follows:

Image Set Rule 5 (Localizer):
IF (Dicom.Modality="CT" and Condition.IsLocalizer=true)
THEN CREATE image set with ID 1
    SORTED BY Dicom.SeriesNumber ORDER:=ascending SPLIT:=true
    SORTED BY Dicom.InstanceNumber ORDER:=ascending SPLIT:=false Image Set Rule 6 (Images):
IF (Dicom.Modality="CT" and Abstract.AlreadyReferenced=false)
THEN CREATE image set with ID 2
    SORTED BY Dicom.SeriesNumber ORDER:=ascending SPLIT:=true
    SORTED BY Dicom.InstanceNumber ORDER:=ascending SPLIT:=false Here Condition.IsLocalizer is a user-defined condition that returns true if an image is a localizer image, and false otherwise. In an embodiment of the present invention, Rule 1 is applied first. Therefore the localizer image is put into a separate image set with ID 1. Next rule 2 is applied. This rule can match for all CT images including the localizer image. However, because AlreadyReferenced=false is specified, the localizer image is skipped and not placed into image set 2.

In an embodiment of the present invention, the creation of the image sets based on rules is a key component of the efficient rules based display, specifically for the more advanced rendering techniques. For example rules can be used to identify sets of 2D images that together form a 3D volume.

Viewer Assignment Rules

In another embodiment of the present invention, a display protocol defines multiple viewers, each with one or more tiles, i.e., viewports. To each viewer one or more image sets can be assigned based on Viewer Assignment Rules that are similar to the protocol section rules described herein. Viewer Assignment Rules are defined in the display protocol. The rules determine which image set shall be initially shown in a viewer. In case multiple image sets are assigned to a viewer, the one with the highest score is chosen. Afterwards users may cycle quickly through the remaining image sets using dedicated tools (Previous/Next Image Set), or pick another image set from a special image set menu.

Like the other rule types Viewer Assignment Rules contain Boolean expressions of DICOM parameters, abstract tags, or user-defined conditions based on DICOM parameters, or abstract tags. In many cases it is sufficient to specify the image sets to be assigned to a viewer by their image set ID instead of evaluating the underlying DICOM parameters and abstract tags again. Therefore, the image set ID is simply set as a separate abstract tag. In the following example the two rules load image sets with the IDs 1 and 2 into a viewer, but assign ID 1 a higher score so that this image set is initially visible (provided such an image set exists):

Viewer Assignment Rule 1:
IF (EXISTS ImageSet[1])
THEN Viewport[0].AddImageSet(ID=1, score=10)

Viewer Assignment Rule 2:
IF (EXISTS ImageSet[2])
THEN
Viewport[0].AddImageSet(ID=2, score=5)

In an embodiment of the present invention, viewer assignment rules are applied to image sets. Thus there is a possible conflict regarding ambiguous image-level and series-level tags. This conflict is resolved in the same way as described herein in the Normalization of DICOM Parameters section. This means that values of DICOM parameters, but also abstract tags, are automatically taken from some reference image. Alternatively, for all DICOM parameters a list of distinct values occurring in all images of the image set can be used in an assignment rule.

Style Rules

In one embodiment of the present invention, there is a final set of rules that specify the rendering style and other rendering parameters to be used when showing a particular image set. For example, for a CT Angiogram study, often a volume rendering style display (VRT) is desired, whereas for a study looking for lung nodules a maximum intensity projection (MIP) of 20 mm slabs may be desired. Style rules, that can be user specific, allow driving that automatically. The rules can use the same parameters as discussed above, as well as the existence or absence of certain image sets.

In one embodiment of the present invention, the system uses a global, ordered list of style rules that is evaluated independently for each viewer and each image set loaded into a viewer. An abstract tag DisplaySetID is provided that allows formulating style rules for a specific viewer or group of viewers.

Parameters driven by Style Rules include the following:
i) Rendering style (can be 2D, oblique, curved, MIP slab, 3D MIP, VRT, shaded VRT, etc.);
ii) Image alignment (left, right, top, bottom, centered);
iii) Inverse display (black on white versus white on black);
iv) Colormap or transfer function;
v) Window/level (data window);
vi) Slice thickness;
vii) Zoom factor;
viii) Camera position and orientation; and
ix) Labels/OverlayDisplay of labels, annotations and other overlay elements.

The following is an example of a style rule that activates inverse 3D MIP rendering in all viewers with a DisplaySetID between 101 and 104, provided a PET data set is loaded into those viewers (modality PT, i.e., positron emission tomography). Also, an automatic window/level setting is used that is computed from the histogram of the image set (the 2% lowest values are all mapped to white, and the 2% highest values are all mapped to black):

Style Rule 1:
IF (Abstract.DisplaySetID>100 and
    Abstract.DisplaySetID<105 and
    Dicom.Modality="PT")
THEN SET
    RenderingStyle:="3D MIP"
    Inverse:=true
    DataWindow:="2% 98%"

The following is another example of a different style rule that always causes the image set with image set ID 200 to be displayed in MPR mode using 20 mm thick slices, with a window/level as specified in the DICOM parameters, and with a zoom factor so that the whole viewer window is filled out. The rule is:

Style Rule 2:
IF (Abstract.ImageSetID=200)
THEN SET
    RenderingStyle:="MPR"
    SliceThickness:="20"
    DataWindow:="DICOM1"
    ZoomFactor:="FitToWindow"

Summary of Rule Types

Table I summarizes all types of rules that are applied in the rule-base display system:

TABLE I

| Rule Type | Applies to | Normalized Parameters | Defined where |
|---|---|---|---|
| Study Selection Rule | Studies | yes | globally |
| Protocol Selection Rule | Studies | yes | globally |
| Image Set Rule | Images | not required | protocol |
| Viewer Assignment Rule | Image Sets | yes | globally, protocol |
| Style Rule | Image Sets | yes | globally, protocol |

Described above are methods and systems for implementing a rule derived basis to display image sets. The foregoing description of embodiments of the methods, systems, and components of the present invention has been provided for the purposes of illustration and description. It is not intended to be exhaustive or to limit the invention to the precise forms disclosed. Many modifications and variations will be apparent to one of ordinary skill in the relevant arts. For example, steps performed in the embodiments of the invention disclosed can be performed in alternate orders, certain steps can be omitted, and additional steps can be added. The embodiments were chosen and described in order to best explain the principles of the invention and its practical application, thereby enabling others skilled in the art to understand the invention for various embodiments and with various modifications that are suited to the particular used contemplated. Other embodiments are possible and are covered by the invention. Such embodiments will be apparent to persons skilled in the relevant art(s) based on the teachings contained herein. The breadth and scope of the present invention should not be limited by any of the above-described exemplary embodiments, but should be defined only in accordance with the following claims and their equivalents.

Example Shown in FIG. 19

An example of how these aspects can be combined is shown in FIG. 19. In the example the user has selected a CT examination of the abdomen. The following rules have been used to determine that a recent X-Ray of the chest is relevant and shall be displayed as well:
IF (Primary.Dicom.BodyPartExamined="ABDOMEN" and Primary.Dicom.Modality="CT") THEN SELECT other studies for loading WHERE (Other.Dicom.BodyPartExamined="ABDOMEN" OR Other.Dicom.BodyPartExamined="CHEST") and (Other.Dicom.Modality="CR" or Other.Dicom.Modality="CT") AND Other.RelativeStudyAge<"90 days"

From this rule, a hanging protocol can be selected. In the example the protocol selection rules determine that the CT study is a thin slice CT study (i.e. that it has image series that form a 3D volume with sufficient resolution in all directions to display volume rendering or non-axial slices in a meaningful way). Furthermore the example rule determines that this is a study with enhanced vasculature, by looking for the key words "contrast" or "angio" in the study description.

The display protocol selection rule that applies here and select the protocol CTThinSliceVesselWithPrior can read
IF (Primary.Dicom.BodyPartExamined="ABDOMEN" and Primary.Dicom.Modality="CT" and Primary.Abstract.HasThinSliceVolumes and (Primary.Dicom.StudyDescription containsAnyOf "contrast, angio" and exists Other1 THEN SELECT "CTThinSliceVesselWithPrior" with score=10

From this image sets are generated using Image Set Rules:
IF (Dicom.Modality="CT" and Abstract.PriorIndex=0 and Condition.IsPartOfThinSliceVolume and Condition.CTSoftTisseKernel)
THEN CREATE image set with ID 1.x
    SORTED BY Abstract.NumberOfSlicesInVolume ORDER:=descending SPLIT:=true
    SORTED BY Dicom.SeriesNumber ORDER:=ascending SPLIT:=true
    SORTED BY Dicom.Abstract.VolumeIndex ORDER:=ascending SPLIT:=true
    SORTED BY Dicom.Abstract.SlicePosition ORDER:=ascending SPLIT:=false This rule will actually form sets from images that contain images that are part of a ThinSliceVolume and that have been reconstructed with a "soft tissue" kernel. Given the protocol selection rule has specifically matched for just CT studies, the conditions Dicom.Modality="CT" and Abstract.PriorIndex=0 are actually redundant, but could be useful if a different selection rule was used.

The images will first be sorted by the size of the volume of which they are part (Abstract.NumberOfSlicesInVolume), then by DICOM series. The split parameter in this case will ensure that an image set contains images from on series only. A DICOM series can sometimes contain multiple non-consecutive volumes. The abstract tag VolumeIndex will then indicate for each image, which of those volumes it is part of. If a series contains only one volume, then this will be "1" for all images in the series. The split=true in this part of the rule would result in a separate image set for each of those volumes. Finally, within each volume, the images are ordered by slice position, but not split. This way we end up with one image set for each soft kernel thin slice volume, the largest volume being the first image set (ID 1.1). This ID will be used further in subsequent rules.

The rule to form an image set from any CR prior study in this example is much simpler:
IF (Dicom.Modality="CR" and Abstract.PriorIndex=1)
THEN CREATE image set with ID 10
    SORTED BY Dicom.SeriesNumber ORDER:=ascending SPLIT:=false
    SORTED BY Dicom.InstanceNumber ORDER:=ascending SPLIT:=false This creates one image set with ID=10 containing all images for the first prior study, if that is a CR.

In practice, additional rules, such as Image Set Rule 5 and 6 (see above) will be used to collect the remaining images of the primary Study 1105. The remaining images are not shown in the layout depicted in the example FIG. 19.

The Display Protocol 1145 contains multiple layouts. The one shown in FIG. 19 is defined as follows:

```
DEFINE Layout {
    ID="Layout5";
    NAME="+PlainFilm"
    Viewports {
        { ID=50, Geometry="(0,0)-(0.25,0.5)"},
        { ID=51, Geometry="(0.25,0)-(0.5,0.5)"},
        { ID=52, Geometry="(0,0.5)-(0.25,1)"},
```

```
        { ID=53, Geometry="(0.25,0.5)-(0. 5,0.5)"},
        { ID=54, Geometry="(0.5,0)-(1,1)", Style="2D"}
        }
}
```

In this example the geometry is defined in a coordinate system having the origin in the upper left corner of the screen with the x axis pointing to the right and the y axis pointing down. Please note how parameters of the viewers can be set in the layout definition. Parameters can also be set or overridden in the assignment and style rules, as will be explained next.

In this example, viewer assignment and style rules are as follows:
IF ImageSetExists (1.1) and ImageSetExists(10) THEN
  SHOW_LAYOUT Layout5 WITH
  Viewport[0].AddImageSet(1.1)
    Viewport [0].Style="VRT(diffuse)"
    Viewport [0].Colormap="CTAngioSoftTissue"
  Viewport [1,2,3].AddImageSet(1.1)
    Viewport [1,2,3].Style="MPR"
    Viewport [1,2,3].DataWindow="DICOM1"
    Viewport [1].oriantation="axial"
    Viewport [2].oriantation="sagittal"
    Viewport [3].oriantation="coronal"
  Viewport [4].AddImageSet(10)
    IF (ImageSet[10].Dicom.Columns>1024) THEN
      Viewport[4].Zoom="FitToWindow"
    ELSE
      Viewport[4].Zoom="1:1"

In this particular example, the rule to select the layout is rather simple: It is shown if the two image sets used exist. This is because the criteria to construct these images sets have been rather specific. As will be appreciated, the proposed system gives this type of flexibility.

In an embodiment of the invention, a system of displaying one or more Sets of Images from a plurality of images comprises a processor capable of selecting a primary Study from a plurality of studies, one or more digital data processors capable of carrying out the steps including applying one or more Study Selection Rules to generate a plurality of second studies based on one or more DICOM parameters and one or more Abstract Tags from the primary Study and one or more DICOM parameters and one or more Abstract Tags from the plurality of studies, where the plurality of second studies include the primary Study, applying one or more Protocol Selection Rules to select a Display Protocol, where the one or more Protocol Selection Rules are based on one or more DICOM parameters and one or more Abstract Tags from the plurality of second studies, applying one or more Image Set Rules to define a plurality of Image Sets from the plurality of second studies, applying one or more Viewport Assignment Rules to assign one or more Image Sets from the plurality of Image Sets to one or more Viewports defined in the Display Protocol, applying one or more Style Rules to define a rendering style and rendering parameters of the one or more Viewports and graphics resources for displaying the plurality of Image Sets based on one or more of the one or more Protocol Selection Rules, the one or more Image Set Rules, the one or more Viewport Assignment Rules, and the one or more Style Rules.

In an embodiment of the invention, a system of displaying one or more Sets of Images from a plurality of images comprises a processor capable of selecting a primary Study from a plurality of studies, one or more digital data processors capable of carrying out the steps including applying one or more Study Selection Rules to generate a plurality of second studies based on one or more DICOM parameters and one or more Abstract Tags from the primary Study and one or more DICOM parameters and one or more Abstract Tags from the plurality of studies, where the plurality of second studies include the primary Study, applying one or more Protocol Selection Rules to select a Display Protocol, where the one or more Protocol Selection Rules are based on one or more DICOM parameters and one or more Abstract Tags from the plurality of second studies, applying one or more Image Set Rules to define a plurality of Image Sets from the plurality of second studies, applying one or more Viewport Assignment Rules to assign one or more Image Sets from the plurality of Image Sets to one or more Viewports defined in the Display Protocol, applying one or more Style Rules to define a rendering style and rendering parameters of the one or more Viewports and graphics resources for displaying the plurality of Image Sets based on one or more of the one or more Protocol Selection Rules, the one or more Image Set Rules, the one or more Viewport Assignment Rules, and the one or more Style Rules, where at least one study from the plurality of Image Sets is a two dimensional image.

In an embodiment of the invention, a system of displaying one or more Sets of Images from a plurality of images comprises a processor capable of selecting a primary Study from a plurality of studies, one or more digital data processors capable of carrying out the steps including applying one or more Study Selection Rules to generate a plurality of second studies based on one or more DICOM parameters and one or more Abstract Tags from the primary Study and one or more DICOM parameters and one or more Abstract Tags from the plurality of studies, where the plurality of second studies include the primary Study, applying one or more Protocol Selection Rules to select a Display Protocol, where the one or more Protocol Selection Rules are based on one or more DICOM parameters and one or more Abstract Tags from the plurality of second studies, applying one or more Image Set Rules to define a plurality of Image Sets from the plurality of second studies, applying one or more Viewport Assignment Rules to assign one or more Image Sets from the plurality of Image Sets to one or more Viewports defined in the Display Protocol, applying one or more Style Rules to define a rendering style and rendering parameters of the one or more Viewports and graphics resources for displaying the plurality of Image Sets based on one or more of the one or more Protocol Selection Rules, the one or more Image Set Rules, the one or more Viewport Assignment Rules, and the one or more Style Rules, where at least one study from the plurality of Image Sets is a three dimensional (3D) image displayed with a 3D rendering style.

In an embodiment of the invention, a system of displaying one or more Sets of Images from a plurality of images comprises a processor capable of selecting a primary Study from a plurality of studies, one or more digital data processors capable of carrying out the steps including applying one or more Study Selection Rules to generate a plurality of second studies based on one or more DICOM parameters and one or more Abstract Tags from the primary Study and one or more DICOM parameters and one or more Abstract Tags from the plurality of studies, where the plurality of second studies include the primary Study, applying one or more Protocol Selection Rules to select a Display Protocol, where the one or more Protocol Selection Rules are based on one or more DICOM parameters and one or more Abstract Tags from the plurality of second studies, applying one or more Image Set Rules to define a plurality of Image Sets from the plurality of second studies, applying one or more Viewport Assignment Rules to assign one or more Image Sets from the plurality of Image Sets to one or more Viewports defined in the Display Protocol, applying one or more Style Rules to define a rendering style and rendering parameters of the one or more Viewports and graphics resources for displaying the plurality of Image Sets based on one or more of the one or more Protocol Selection Rules, the one or more Image Set Rules, the one or more Viewport Assignment Rules, and the one or more Style Rules, where at least one of the one or more Viewports displays an oblique cross section through a volumetric image set.

In an embodiment of the invention, a system of displaying one or more Sets of Images from a plurality of images comprises a processor capable of selecting a primary Study from a plurality of studies, one or more digital data processors capable of carrying out the steps including applying one or more Study Selection Rules to generate a plurality of second studies based on one or more DICOM parameters and one or more Abstract Tags from the primary Study and one or more DICOM parameters and one or more Abstract Tags from the plurality of studies, where the plurality of second studies include the primary Study, applying one or more Protocol Selection Rules to select a Display Protocol, where the one or more Protocol Selection Rules are based on one or more DICOM parameters and one or more Abstract Tags from the plurality of second studies, applying one or more Image Set Rules to define a plurality of Image Sets from the plurality of second studies, applying one or more Viewport Assignment Rules to assign one or more Image Sets from the plurality of Image Sets to one or more Viewports defined in the Display Protocol, applying one or more Style Rules to define a rendering style and rendering parameters of the one or more Viewports and graphics resources for displaying the plurality of Image Sets based on one or more of the one or more Protocol Selection Rules, the one or more Image Set Rules, the one or more Viewport Assignment Rules, and the one or more Style Rules, where at least one of the one or more Viewports displays a maximum intensity projection of an image set.

In an embodiment of the invention, a system of displaying one or more Sets of Images from a plurality of images comprises a processor capable of selecting a primary Study from a plurality of studies, one or more digital data processors capable of carrying out the steps including applying one or more Study Selection Rules to generate a plurality of second studies based on one or more DICOM parameters and one or more Abstract Tags from the primary Study and one or more DICOM parameters and one or more Abstract Tags from the plurality of studies, where the plurality of second studies include the primary Study, applying one or more Protocol Selection Rules to select a Display Protocol, where the one or more Protocol Selection Rules are based on one or more DICOM parameters and one or more Abstract Tags from the plurality of second studies, applying one or more Image Set Rules to define a plurality of Image Sets from the plurality of second studies, applying one or more Viewport Assignment Rules to assign one or more Image Sets from the plurality of Image Sets to one or more Viewports defined in the Display Protocol, applying one or more Style Rules to define a rendering style and rendering parameters of the one or more Viewports and graphics resources for displaying the plurality of Image Sets based on one or more of the one or more Protocol Selection Rules, the one or more Image Set Rules, the one or more Viewport Assignment Rules, and the one or more Style Rules, where at least one of the one or more Viewports displays a post processed rendering of an image set.

In an embodiment of the invention, a system of displaying one or more Sets of Images from a plurality of images comprises a processor capable of selecting a primary Study from a plurality of studies, one or more digital data processors capable of carrying out the steps including applying one or more Study Selection Rules to generate a plurality of second studies based on one or more DICOM parameters and one or more Abstract Tags from the primary Study and one or more DICOM parameters and one or more Abstract Tags from the plurality of studies, where the plurality of second studies include the primary Study, applying one or more Protocol Selection Rules to select a Display Protocol, where the one or more Protocol Selection Rules are based on one or more DICOM parameters and one or more Abstract Tags from the plurality of second studies, applying one or more Image Set Rules to define a plurality of Image Sets from the plurality of second studies, applying one or more Viewport Assignment Rules to assign one or more Image Sets from the plurality of Image Sets to one or more Viewports defined in the Display Protocol, applying one or more Style Rules to define a rendering style and rendering parameters of the one or more Viewports and graphics resources for displaying the plurality of Image Sets based on one or more of the one or more Protocol Selection Rules, the one or more Image Set Rules, the one or more Viewport Assignment Rules, and the one or more Style Rules, where at least one of the one or more Viewports displays a thick slab image.

In an embodiment of the invention, a system of displaying one or more Sets of Images from a plurality of images comprises a processor capable of selecting a primary Study from a plurality of studies, one or more digital data processors capable of carrying out the steps including applying one or more Study Selection Rules to generate a plurality of second studies based on one or more DICOM parameters and one or more Abstract Tags from the primary Study and one or more DICOM parameters and one or more Abstract Tags from the plurality of studies, where the plurality of second studies include the primary Study, applying one or more Protocol Selection Rules to select a Display Protocol, where the one or more Protocol Selection Rules are based on one or more DICOM parameters and one or more Abstract Tags from the plurality of second studies, applying one or more Image Set Rules to define a plurality of Image Sets from the plurality of second studies, applying one or more Viewport Assignment Rules to assign one or more Image Sets from the plurality of Image Sets to one or more Viewports defined in the Display Protocol, applying one or more Style Rules to define a rendering style and rendering parameters of the one or more Viewports and graphics resources for displaying the plurality of Image Sets based on one or more of the one or more Protocol Selection Rules, the one or more Image Set Rules, the one or more Viewport Assignment Rules, and the one or more Style Rules, where at least one of the one or more Viewports displays a volume rendered image.

In an embodiment of the invention, a system of displaying one or more Sets of Images from a plurality of images comprises a processor capable of selecting a primary Study from a plurality of studies, one or more digital data processors capable of carrying out the steps including applying one or more Study Selection Rules to generate a plurality of second studies based on one or more DICOM parameters and one or more Abstract Tags from the primary Study and one or more DICOM parameters and one or more Abstract Tags from the plurality of studies, where the plurality of second studies include the primary Study, applying one or more Protocol Selection Rules to select a Display Protocol, where the one or more Protocol Selection Rules are based on one or more DICOM parameters and one or more Abstract Tags from the plurality of second studies, applying one or more Image Set Rules to define a plurality of Image Sets from the plurality of second studies, applying one or more Viewport Assignment Rules to assign one or more Image Sets from the plurality of Image Sets to one or more Viewports defined in the Display Protocol, applying one or more Style Rules to define a rendering style and rendering parameters of the one or more Viewports and graphics resources for displaying the plurality of Image Sets based on one or more of the one or more Protocol Selection Rules, the one or more Image Set Rules, the one or more Viewport Assignment Rules, and the one or more Style Rules, where at least one of the one or more Viewports displays a three dimensional image.

In an embodiment of the invention, a system of displaying one or more Sets of Images from a plurality of images comprises a processor capable of selecting a primary Study from a plurality of studies, one or more digital data processors capable of carrying out the steps including applying one or more Study Selection Rules to generate a plurality of second studies based on one or more DICOM parameters and one or more Abstract Tags from the primary Study and one or more DICOM parameters and one or more Abstract Tags from the plurality of studies, where the plurality of second studies include the primary Study, applying one or more Protocol Selection Rules to select a Display Protocol, where the one or more Protocol Selection Rules are based on one or more DICOM parameters and one or more Abstract Tags from the plurality of second studies, applying one or more Image Set Rules to define a plurality of Image Sets from the plurality of second studies, applying one or more Viewport Assignment Rules to assign one or more Image Sets from the plurality of Image Sets to one or more Viewports defined in the Display Protocol, applying one or more Style Rules to define a rendering style and rendering parameters of the one or more Viewports and graphics resources for displaying the plurality of Image Sets based on one or more of the one or more Protocol Selection Rules, the one or more Image Set Rules, the one or more Viewport Assignment Rules, and the one or more Style Rules, where one or more Study Selection Rules used DICOM parameters and Abstract Tags derived from a single reference image.

In an embodiment of the invention, a system of displaying one or more Sets of Images from a plurality of images comprises a processor capable of selecting a primary Study from a plurality of studies, one or more digital data processors capable of carrying out the steps including applying one or more Study Selection Rules to generate a plurality of second studies based on one or more DICOM parameters and one or more Abstract Tags from the primary Study and one or more DICOM parameters and one or more Abstract Tags from the plurality of studies, where the plurality of second studies include the primary Study, applying one or more Protocol Selection Rules to select a Display Protocol, where the one or more Protocol Selection Rules are based on one or more DICOM parameters and one or more Abstract Tags from the plurality of second studies, applying one or more Image Set Rules to define a plurality of Image Sets from the plurality of second studies, applying one or more Viewport Assignment Rules to assign one or more Image Sets from the plurality of Image Sets to one or more Viewports defined in the Display Protocol, applying one or more Style Rules to define a rendering style and rendering parameters of the one or more Viewports and graphics resources for displaying the plurality of Image Sets based on one or more of the one or more Protocol Selection Rules, the one or more Image Set Rules, the one or more Viewport Assignment Rules, and the one or more Style Rules, where the primary Study selected is a single reference image.

In an embodiment of the invention, a system of displaying one or more Sets of Images from a plurality of images comprises a processor capable of selecting a primary Study from a plurality of studies, one or more digital data processors capable of carrying out the steps including applying one or more Study Selection Rules to generate a plurality of second studies based on one or more DICOM parameters and one or more Abstract Tags from the primary Study and one or more DICOM parameters and one or more Abstract Tags from the plurality of studies, where the plurality of second studies include the primary Study, applying one or more Protocol Selection Rules to select a Display Protocol, where the one or more Protocol Selection Rules are based on one or more DICOM parameters and one or more Abstract Tags from the plurality of second studies, applying one or more Image Set Rules to define a plurality of Image Sets from the plurality of second studies, applying one or more Viewport Assignment Rules to assign one or more Image Sets from the plurality of Image Sets to one or more Viewports defined in the Display Protocol, applying one or more Style Rules to define a rendering style and rendering parameters of the one or more Viewports and graphics resources for displaying the plurality of Image Sets based on one or more of the one or more Protocol Selection Rules, the one or more Image Set Rules, the one or more Viewport Assignment Rules, and the one or more Style Rules, where the primary Study selected is a single reference image, where one or more Study Selection Rules are derived from the single reference image DICOM Parameters.

In an embodiment of the invention, a system of displaying one or more Sets of Images from a plurality of images comprises a processor capable of selecting a primary Study from a plurality of studies, one or more digital data processors capable of carrying out the steps including applying one or more Study Selection Rules to generate a plurality of second studies based on one or more DICOM parameters and one or more Abstract Tags from the primary Study and one or more DICOM parameters and one or more Abstract Tags from the plurality of studies, where the plurality of second studies include the primary Study, applying one or more Protocol Selection Rules to select a Display Protocol, where the one or more Protocol Selection Rules are based on one or more DICOM parameters and one or more Abstract Tags from the plurality of second studies, applying one or more Image Set Rules to define a plurality of Image Sets from the plurality of second studies, applying one or more Viewport Assignment Rules to assign one or more Image Sets from the plurality of Image Sets to one or more Viewports defined in the Display Protocol, applying one or more Style Rules to define a rendering style and rendering parameters of the one or more Viewports and graphics resources for displaying the plurality of Image Sets based on one or more of the one or more Protocol Selection Rules, the one or more Image Set Rules, the one or more Viewport Assignment Rules, and the one or more Style Rules, where the one or more Viewport Assignment Rules contain protocols for displaying two dimensional images in the one or more Viewports.

In an embodiment of the invention, a system of displaying one or more Sets of Images from a plurality of images comprises a processor capable of selecting a primary Study from a plurality of studies, one or more digital data processors capable of carrying out the steps including applying one or more Study Selection Rules to generate a plurality of second studies based on one or more DICOM parameters and one or more Abstract Tags from the primary Study and one or more DICOM parameters and one or more Abstract Tags from the plurality of studies, where the plurality of second studies include the primary Study, applying one or more Protocol Selection Rules to select a Display Protocol, where the one or more Protocol Selection Rules are based on one or more DICOM parameters and one or more Abstract Tags from the plurality of second studies, applying one or more Image Set Rules to define a plurality of Image Sets from the plurality of second studies, applying one or more Viewport Assignment Rules to assign one or more Image Sets from the plurality of Image Sets to one or more Viewports defined in the Display Protocol, applying one or more Style Rules to define a rendering style and rendering parameters of the one or more Viewports and graphics resources for displaying the plurality of Image Sets based on one or more of the one or more Protocol Selection Rules, the one or more Image Set Rules, the one or more Viewport Assignment Rules, and the one or more Style Rules, where the one or more Abstract Tags are selected from the group consisting of RelativeStudyAge, PriorIndex. NumImages, NumSeries, Num3DVolumes, Num4DSequences and HasReport.

In an embodiment of the invention, a system of displaying one or more Sets of Images from a plurality of images comprises a processor capable of selecting a primary Study from a plurality of studies, one or more digital data processors capable of carrying out the steps including applying one or more Study Selection Rules to generate a plurality of second studies based on one or more DICOM parameters and one or more Abstract Tags from the primary Study and one or more DICOM parameters and one or more Abstract Tags from the plurality of studies, where the plurality of second studies include the primary Study, applying one or more Protocol Selection Rules to select a Display Protocol, where the one or more Protocol Selection Rules are based on one or more DICOM parameters and one or more Abstract Tags from the plurality of second studies, applying one or more Image Set Rules to define a plurality of Image Sets from the plurality of second studies, applying one or more Viewport Assignment Rules to assign one or more Image Sets from the plurality of Image Sets to one or more Viewports defined in the Display Protocol, applying one or more Style Rules to define a rendering style and rendering parameters of the one or more Viewports and graphics resources for displaying the plurality of Image Sets based on one or more of the one or more Protocol Selection Rules, the one or more Image Set Rules, the one or more Viewport Assignment Rules, and the one or more Style Rules, where the one or more Viewport Assignment Rules include one or more Abstract Tags selected from the group consisting of Image Sets to be displayed, Rendering Style, Additional image sets for image fusion, Image Alignment, Colormap/Transfer Function, Slice Thickness, Zoom Factor, Camera position, Camera orientation and Labels/Overlay elements.

In an embodiment of the invention, a system of displaying one or more Sets of Images from a plurality of images comprises a processor capable of selecting a primary Study from a plurality of studies, one or more digital data processors capable of carrying out the steps including applying one or more Study Selection Rules to generate a plurality of second studies based on one or more DICOM parameters and one or more Abstract Tags from the primary Study and one or more DICOM parameters and one or more Abstract Tags from the plurality of studies, where the plurality of second studies include the primary Study, applying one or more Protocol Selection Rules to select a Display Protocol, where the one or more Protocol Selection Rules are based on one or more DICOM parameters and one or more Abstract Tags from the plurality of second studies, applying one or more Image Set Rules to define a plurality of Image Sets from the plurality of second studies, applying one or more Viewport Assignment Rules to assign one or more Image Sets from the plurality of Image Sets to one or more Viewports defined in the Display Protocol, applying one or more Style Rules to define a rendering style and rendering parameters of the one or more Viewports and graphics resources for displaying the plurality of Image Sets based on one or more of the one or more Protocol Selection Rules, the one or more Image Set Rules, the one or more Viewport Assignment Rules, and the one or more Style Rules, where the one or more Image Set Rules are selected from selection, sorting, and breaking rules, where the one or more Image Set Rules are Boolean expressions that contain parameters selected from the group consisting of DICOM parameters, abstract tags, and used-defined functions.

In an embodiment of the invention, a system of displaying one or more Sets of Images from a plurality of images comprises a processor capable of selecting a primary Study from a plurality of studies, one or more digital data processors capable of carrying out the steps including applying one or more Study Selection Rules to generate a plurality of second studies based on one or more DICOM parameters and one or more Abstract Tags from the primary Study and one or more DICOM parameters and one or more Abstract Tags from the plurality of studies, where the plurality of second studies include the primary Study, applying one or more Protocol Selection Rules to select a Display Protocol, where the one or more Protocol Selection Rules are based on one or more DICOM parameters and one or more Abstract Tags from the plurality of second studies, applying one or more Image Set Rules to define a plurality of Image Sets from the plurality of second studies, applying one or more Viewport Assignment Rules to assign one or more Image Sets from the plurality of Image Sets to one or more Viewports defined in the Display Protocol, applying one or more Style Rules to define a rendering style and rendering parameters of the one or more Viewports and graphics resources for displaying the plurality of Image Sets based on one or more of the one or more Protocol Selection Rules, the one or more Image Set Rules, the one or more Viewport Assignment Rules, and the one or more Style Rules, where in order to specify image sorting, the Image Set Rules contain an ordered list of sorting criteria.

In an embodiment of the invention, a system of displaying one or more Sets of Images from a plurality of images comprises a processor capable of selecting a primary Study from a plurality of studies, one or more digital data processors capable of carrying out the steps including applying one or more Study Selection Rules to generate a plurality of second studies based on one or more DICOM parameters and one or more Abstract Tags from the primary Study and one or more DICOM parameters and one or more Abstract Tags from the plurality of studies, where the plurality of second studies include the primary Study, applying one or more Protocol Selection Rules to select a Display Protocol, where the one or more Protocol Selection Rules are based on one or more DICOM parameters and one or more Abstract Tags from the plurality of second studies, applying one or more Image Set Rules to define a plurality of Image Sets from the plurality of second studies, applying one or more Viewport Assignment Rules to assign one or more Image Sets from the plurality of Image Sets to one or more Viewports defined in the Display Protocol, applying one or more Style Rules to define a rendering style and rendering parameters of the one or more Viewports and graphics resources for displaying the plurality of Image Sets based on one or more of the one or more Protocol Selection Rules, the one or more Image Set Rules, the one or more Viewport Assignment Rules, and the one or more Style Rules, where in order to specify image sorting, the Image Set Rules contain an ordered list of sorting criteria, where a split flag is used in order to specify image splitting.

In an embodiment of the invention, a system of displaying one or more Sets of Images from a plurality of images comprises a processor capable of selecting a primary Study from a plurality of studies, one or more digital data processors capable of carrying out the steps including applying one or more Study Selection Rules to generate a plurality of second studies based on one or more DICOM parameters and one or more Abstract Tags from the primary Study and one or more DICOM parameters and one or more Abstract Tags from the plurality of studies, where the plurality of second studies include the primary Study, applying one or more Protocol Selection Rules to select a Display Protocol, where the one or more Protocol Selection Rules are based on one or more DICOM parameters and one or more Abstract Tags from the plurality of second studies, applying one or more Image Set Rules to define a plurality of Image Sets from the plurality of second studies, applying one or more Viewport Assignment Rules to assign one or more Image Sets from the plurality of Image Sets to one or more Viewports defined in the Display Protocol, applying one or more Style Rules to define a rendering style and rendering parameters of the one or more Viewports and graphics resources for displaying the plurality of Image Sets based on one or more of the one or more Protocol Selection Rules, the one or more Image Set Rules, the one or more Viewport Assignment Rules, and the one or more Style Rules, where Abstract Tags are used in Image Set Rules.

In an embodiment of the invention, a system of displaying one or more Sets of Images from a plurality of images comprises a processor capable of selecting a primary Study from a plurality of studies, one or more digital data processors capable of carrying out the steps including applying one or more Study Selection Rules to generate a plurality of second studies based on one or more DICOM parameters and one or more Abstract Tags from the primary Study and one or more DICOM parameters and one or more Abstract Tags from the plurality of studies, where the plurality of second studies include the primary Study, applying one or more Protocol Selection Rules to select a Display Protocol, where the one or more Protocol Selection Rules are based on one or more DICOM parameters and one or more Abstract Tags from the plurality of second studies, applying one or more Image Set Rules to define a plurality of Image Sets from the plurality of second studies, applying one or more Viewport Assignment Rules to assign one or more Image Sets from the plurality of Image Sets to one or more Viewports defined in the Display Protocol, applying one or more Style Rules to define a rendering style and rendering parameters of the one or more Viewports and graphics resources for displaying the plurality of Image Sets based on one or more of the one or more Protocol Selection Rules, the one or more Image Set Rules, the one or more Viewport Assignment Rules, and the one or more Style Rules, where Abstract Tags are used in Image Set Rules, where an Abstract Tag identifies whether an image has already been placed into an Image Set.

In an alternative embodiment of the invention, a system of displaying one or more Sets of Images from a plurality of images comprises selecting one or more studies from a plurality of studies, one or more digital data processors for carrying out the steps including applying one or more Protocol Selection Rules to select a Display Protocol, where the one or more Protocol Selection Rules are based on one or more DICOM parameters and Abstract Tags from the plurality of studies, applying one or more Image Set Rules to define a plurality of Image Sets from the plurality of studies, applying one or more Viewport Assignment Rules to assign one or more Image Sets from the plurality of Image Sets to one or more Viewports defined in the Display Protocol, applying one or more Style Rules to define a rendering style and rendering parameters of the one or more Viewports and graphics resources for displaying the one or more Image Sets based on one or more of the Protocol Selection Rules, the one or more Image Set Rules, the one or more Viewport Assignment Rules, and the one or more Style Rules, where at least one of the one or more Viewports displays a three dimensional image.

In another alternative embodiment of the invention, a method of displaying one or more Sets of Images from a plurality of images comprises selecting a primary Study from a plurality of studies, executing on a server digital data processor a render server program which applies one or more of one or more Study Selection Rules, one or more Protocol Selection Rule, one or more Image Set Rules, one or more Viewport Assignment Rules, and one or more Style Rules to display the one or more Sets of Images including the steps of applying the one or more Study Selection Rules to generate a plurality of second studies based on one or more DICOM parameters and one or more Abstract Tags from the primary Study and one or more DICOM parameters and one or more Abstract Tags from the plurality of studies, where the plurality of second studies include the primary Study, applying the one or more Protocol Selection Rules to select a Display Protocol, where the one or more Protocol Selection Rules are based on one or more DICOM parameters and one or more Abstract Tags from the plurality of second studies, applying the one or more Image Set Rules to define a plurality of Image Sets from the plurality of second studies, applying the one or more Viewport Assignment Rules to assign one or more Image Sets from the plurality of Image Sets to one or more Viewports defined in the Display Protocol, applying the one or more Style Rules to define a rendering style and rendering parameters of the one or more Viewports and displaying the one or more Sets of Images in one or more Viewports based on one or more of the Protocol Selection Rule, the Image Set Rule, the one or more Viewport Assignment Rules, and the one or more Style Rules, where at least one of the one or more Viewports displays a volume rendered image.

In a further embodiment of the invention, a method of displaying one or more Sets of Images from a plurality of images comprises selecting a primary Study from a plurality of studies, executing on a server digital data processor a render server program which applies one or more of one or more Study selection Rules, one or more Protocol Selection Rules, one or more Image Set Rules, one or more Viewport Assignment Rules, and one or more Style Rules to display the one or more Sets of Images including the steps of applying the one or more Study Selection Rules to generate a plurality of second studies based on DICOM parameter BodyPartExamined, DICOM parameter Modality, DICOM parameter RelativeStudyAge and Abstract Tag RelativeStudyAge, Abstract Tag PriorIndex, Abstract Tag NumImages, Abstract Tag NumSeries, Abstract Tag Num3DVolumes, Abstract Tag Num4DSequences and Abstract Tag HasReport from the plurality of studies, where the plurality of second studies include the primary Study, applying the one or more Protocol Selection Rules to select a Display Protocol, where the one or more Protocol Selection Rules are based on DICOM parameter BodyPartExamined, DICOM parameter Modality, DICOM parameter HasThisSliceVolumes, DICOM parameter StudyDescription and Abstract Tags from the plurality of second studies, applying the one or more Image Set Rules to define a plurality of Image Sets from the plurality of second studies, applying the one or more Viewport Assignment Rules to assign one or more Image Sets from the plurality of Image Sets to one or more Viewports defined in the Display Protocol, applying the one or more Style Rules to define a rendering style and rendering parameters of the one or more Viewports and displaying the one or more Sets of Images in one or more Viewports based on one or more of the one or more Protocol Selection Rules, the one or more Image Set Rules, the one or more Viewport Assignment Rules, and the one or more Style Rules, where at least one of the one or more Viewports displays a post processed rendering of an image set.

In a further embodiment of the invention, a method of displaying one or more Sets of Images from a plurality of images comprises selecting a primary Study from a plurality of studies, executing on a server digital data processor a render server program which applies one or more of one or more Study selection Rules, one or more Protocol Selection Rules, one or more Image Set Rules, one or more Viewport Assignment Rules, and one or more Style Rules to display the one or more Sets of Images including the steps of applying the one or more Study Selection Rules to generate a plurality of second studies based on DICOM parameter BodyPartExamined, DICOM parameter Modality, DICOM parameter RelativeStudyAge and Abstract Tag RelativeStudyAge, Abstract Tag PriorIndex, Abstract Tag NumImages, Abstract Tag NumSeries, Abstract Tag Num3DVolumes, Abstract Tag Num4DSequences and Abstract Tag HasReport from the plurality of studies, where the plurality of second studies include the primary Study, applying the one or more Protocol Selection Rules to select a Display Protocol, where the one or more Protocol Selection Rules are based on DICOM parameter BodyPartExamined, DICOM parameter Modality, DICOM parameter HasThisSliceVolumes, DICOM parameter StudyDescription and Abstract Tags from the plurality of second studies, applying the one or more Image Set Rules to define a plurality of Image Sets from the plurality of second studies, applying the one or more Viewport Assignment Rules to assign one or more Image Sets from the plurality of Image Sets to one or more Viewports defined in the Display Protocol, applying the one or more Style Rules to define a rendering style and rendering parameters of the one or more Viewports and displaying the one or more Sets of Images in one or more Viewports based on one or more of the one or more Protocol Selection Rules, the one or more Image Set Rules, the one or more Viewport Assignment Rules, and the one or more Style Rules, where at least one of the one or more Viewports displays a post processed rendering of an image set, where the step of displaying is carried out on a client display device.

Many computer applications today demand high network bandwidth over the internet. Good examples are systems that download large amount of data such as files, music or videos. Most of the internet traffic today is carried out via the Transmission Control Protocol (TCP). The main advantage of TCP is that it provides reliable data transfer to the application layer. The application does not have to deal with lost data packets, corrupted data packets, or out-of-order arrival of packets. All types of error detection and retransmission algorithms are already implemented in the TCP protocol. Also, sophisticated methods for congestion avoidance and flow control have been added to the TCP protocol. Most of these methods are intended to optimize bandwidth, i.e., data throughput, over a network.

Maximized data throughput usually comes at the price of increased latency. For example, a common technique is to not send out small pieces of data immediately but to wait until more data is available, so that larger packets can be sent then (e.g. Nagle algorithm). This increases bandwidth but also introduces extra delay. Another approach is to send out large amounts of data before getting an acknowledgement by the receiver. This also increases bandwidth but at the same time may increase the time a data packet is in transfer.

For many applications maximum bandwidth is by far the most important criterion. Increased latency is often not a problem. This is not true for applications like voice over Internet Protocol (IP) or teleconferencing. Here low response times, i.e. low latency, are crucial. These applications usually disable the Nagle algorithm or do not use TCP at all. Often bandwidth requirements are not that high for such applications.

Another class of applications requires both high bandwidth and low latency. This is true for example for a client-server based medical image viewer. Such a system needs to display large amounts of image data which are streamed from the server to the client. Often it is advisable to send images before they are requested by the client such as in traditional streaming applications. For example, if a doctor looks at the first image of a 3D image series then it is likely that she will also look at the second image soon. But if the doctor proceeds, some images that are scheduled for later streaming suddenly have to be transferred immediately, or images have to be rendered on the server and then displayed on the client as soon as possible. Thus it is important that the server stays always responsive and that new data can be sent as quickly as possible to the client based on current user interaction.

A general aspect of network based applications is that often not all parameters of the network are known, or can be influenced by the application. For example routers or other network devices between the endpoints may introduce latencies and buffers that are not application controlled. Often the network has to be regarded a black box.

In an embodiment of the present invention, a client-server based medical image viewing system that sends data over a standard TCP connection in such a way that high data throughput is achieved without impacting responsiveness. Special timestamp messages inserted into the data stream allow the system to detect situations where network latency increases noticeably and to obtain a reliable estimate of sustained transfer bandwidth. In an embodiment of the present invention, the system applies a feedback scheme that avoids network delays by limiting send bandwidth. In various embodiments of the present invention, other parameters, in particular image compression settings, can be dynamically adjusted depending on current network latency.

In the following description, various aspects of the present invention will be described. However, it will be apparent to those skilled in the art that the present invention may be practiced with only some or all aspects of the present invention. For purposes of explanation, specific numbers, materials, and configurations are set forth in order to provide a thorough understanding of the present invention. However, it will be apparent to one skilled in the art that the present invention may be practiced without the specific details. In other instances, well-known features are omitted or simplified in order not to obscure the present invention.

Parts of the description will be presented in data processing terms, such as data, selection, retrieval, generation, and so forth, consistent with the manner commonly employed by those skilled in the art to convey the substance of their work to others skilled in the art. As is well understood by those skilled in the art, these quantities (data, selection, retrieval, generation) take the form of electrical, magnetic, or optical signals capable of being stored, transferred, combined, and otherwise manipulated through electrical, optical, and/or biological components of a processor and its subsystems.

Various operations will be described as multiple discrete steps in turn, in a manner that is most helpful in understanding the present invention; however, the order of description should not be construed as to imply that these operations are necessarily order dependent.

Various embodiments will be illustrated in terms of exemplary classes and/or objects in an object-oriented programming paradigm. It will be apparent to one skilled in the art that the present invention can be practiced using any number of different classes/objects, not merely those included here for illustrative purposes. Furthermore, it will also be apparent that the present invention is not limited to any particular software programming language or programming paradigm.

The invention is illustrated by way of example and not by way of limitation in the figures of the accompanying drawings in which like references indicate similar elements. It should be noted that references to 'an' or 'one' embodiment in this disclosure are not necessarily to the same embodiment, and such references mean at least one.

In one embodiment of the present invention, a client-server based medical image viewing system uses the TCP protocol for data transfer, but at the same time avoids network congestion and thus achieves both high data throughput and low latency. The system is non-intrusive in that it does not change the TCP implementation and does not make use of special network drivers. Instead, the transport layer is considered as a black box and only the actual performance of the network is monitored. Based on the monitoring results different actions are taken by the application itself in order to cope with the current network quality.

Water Pipe Model

Figure 21:
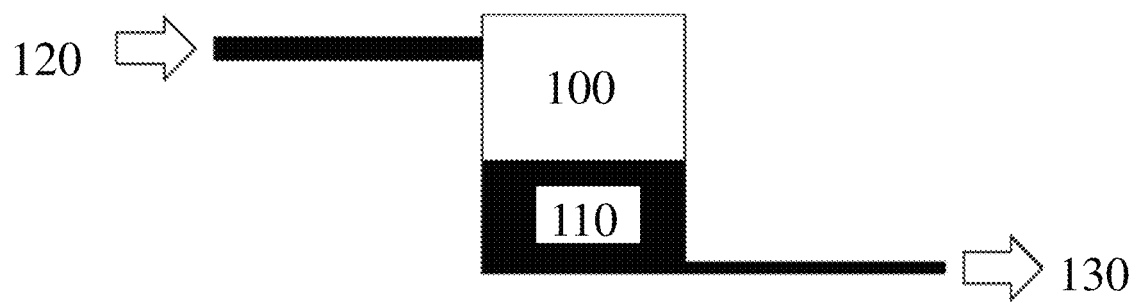
FIG. 21 is a diagram showing a simple network model with filled buffer.

The following analogy helps to illustrate an embodiment of the present invention. Assume that a network behaves like a system of water pipes of different cross-sections. Somewhere inside the system there are "water barrels" or network buffers that can fill up as shown in FIG. 21. Initially a large amount of "water" or data can be pumped into the network. "Inflow" or send bandwidth is high 120, but "outflow" or "read bandwidth" on the client side might be much smaller 130. In effect the "water barrels" or network buffers 100 fill up 110. It then takes a long time until a new "drop of water" or data packet can pass into the network. Latency has increased and the server is not able to respond quickly to user input. The result is that the "pipes" or connections are congested.

Figure 22:
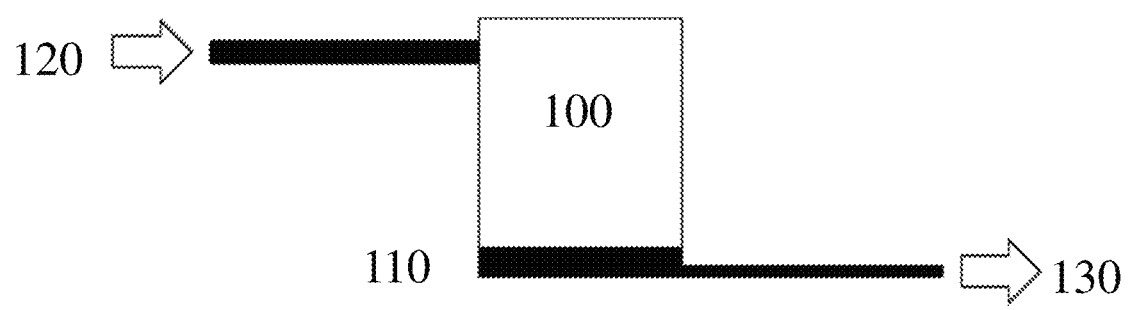
FIG. 22 is a diagram showing a simple network model with empty buffer.

In order to keep the server responsive it is important to prevent the network buffers 100 from filling up 110 as depicted in FIG. 22. In an embodiment of the invention, the server can only send as much data into the network 120 as the thinnest pipe or weakest connection can convey 130. Note, that the overall throughput or bandwidth is not decreased if send bandwidth is limited.

Detecting Latency Increase

Figure 23:
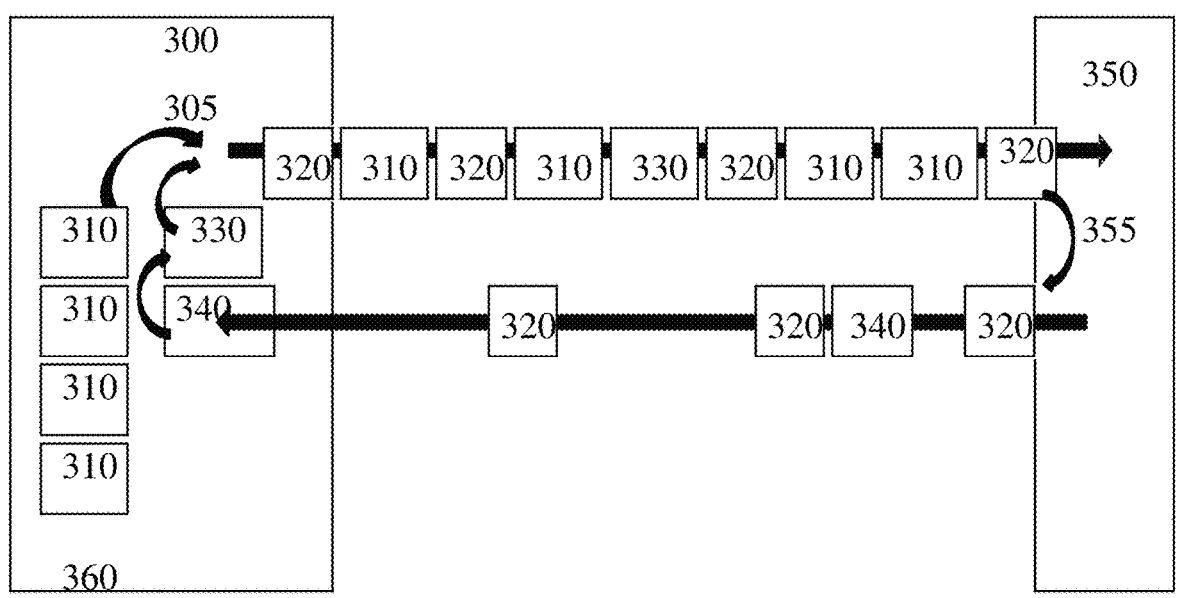
FIG. 23 is flowchart showing an overview of transferring timestamp messages and other data between the client and server.

In an embodiment of the present invention, the system uses its own message-based protocol that is transported over a TCP connection. In this embodiment, all benefits of TCP are retained for ease of use and reliability. Small timestamp messages are sent from the server to the client and back from the client to the server. FIG. 23 is a flowchart depicting an overview of the message-based protocol and timestamp messages. These timestamp messages allow an estimate of the current network bandwidth to determine when network latency will increase due to congestion or decrease due to de-congestion. In FIG. 23 the server is on the left 300 and the client is on the right 350. The server has a transfer queue 360 that holds multiple data packets 310 queued for transfer. In addition, the client may request 340 extra packets 330 from the server. Data packets requested by the client have precedence 305 over packets originating from the transfer queue. Inserted into the data stream are timestamp messages 320 which are first sent from the server to the client and then returned by the client 355.

A timestamp message that the server sends to the client only contains the time 't' in milliseconds since the server was started. In addition, the server stores the timestamp message in a First In, First Out (FIFO) queue. Together with the message the server also stores the total number of bytes 'c' that were sent to the client up to that point in time, as well as the current send bandwidth $b_{send}$ in bytes/sec.

In an embodiment of the present invention, every timestamp message that arrives at the client is immediately sent back to the server. In an embodiment of the present invention, the order of messages is preserved. In an embodiment of the present invention, messages that are sent back to the server contain the difference 'd' between the client time (measured in milliseconds since client was started) and the server time 't' that was contained in the incoming timestamp message. In an embodiment of the present invention, it is not required that clocks on server and client are synchronized, i.e., that both clocks were started at the same time.

In an embodiment of the present invention, the smallest value $d_{min}$ that occurs in any of the timestamp messages that arrive back at the server defines a baseline for detecting increased latency. Without synchronized clocks it is difficult if not impossible to determine how long it really takes for a message to pass from the server to the client. However, it is possible to determine how much more travel time was needed for an arbitrary message compared to the fastest message. This increase of travel time or delay is given by $e=d-d_{min}$. If 'e' increases significantly it is apparent that network buffers are filling up and that send bandwidth must be reduced.

Estimating Bandwidth

In an embodiment of the present invention, a key requirement for the system to be able to choose a reasonable send bandwidth and to adjust other application settings to network quality is a reliable estimate of sustained transfer bandwidth. An estimate is computed as follows:

If a timestamp message arrives back at the server, it is taken out of the FIFO queue. The time that was spent on the client between receiving the last two timestamp messages is given by:

$$T = t_i - t_{i-1} + d_i - d_{i-1}$$

The amount of data C that was read in that time is given by the number of bytes that were sent between the last two timestamp messages:

$$C = c_i - c_{i-1}$$

From these quantities the read bandwidth at the client is determined as:

$$b_{read} = C/T.$$

In an embodiment of the present invention, if send bandwidth $b_{send}$ is significantly larger than read bandwidth $b_{read}$ (e.g. by more than 30%) we assume that the network is saturated and that $b_{read}$ is a good estimate of transfer bandwidth. In an embodiment of the present invention, a running average is computed of multiple (e.g. 10) such $b_{read}$ samples in order to obtain a best estimate $b_{est}$ of transfer bandwidth. In an unexpected result, in order to quickly get reliable results, especially shortly after the client was started and the network is not yet saturated, it turned out to be beneficial to also include $b_{read}$ samples into the running average if they are significantly larger than the current best estimate (e.g. by more than 40%). Further, in an embodiment of the present invention, outliers can be discarded by clamping $b_{read}$ so that it does not exceed twice the current best estimate $b_{est}$.

Limiting Send Bandwidth

In an embodiment of the present invention, a good estimate $b_{est}$ of sustained transfer bandwidth allows the transfer to be slowed in case latency increases noticeably. In an embodiment of the present invention, send bandwidth is limited if the delay 'e' exceeds a certain threshold $e_{max}$. In an embodiment of the present invention, send bandwidth is limited when e is greater than approximately 40 msec. In an alternative embodiment of the present invention, send bandwidth is limited when e is greater than approximately 50 msec. When calculating 'e' approximately refers to plus or minus twenty percent. In an embodiment of the present invention, a bandwidth limit $b_{limit}$ of approximately sixty (60) percent of $b_{est}$ is enforced when 'e' exceeds $e_{max}$. In an alternative embodiment of the present invention, a bandwidth limit $b_{limit}$ of approximately seventy (70) percent of $b_{est}$ is enforced when 'e' exceeds $e_{max}$. When calculating 'b' approximately refers to plus or minus twenty percent. In an embodiment of the present invention, if delay 'e' later drops below $e_{max}$, the bandwidth limit is gradually lifted again by incrementing the current limit by a value that is increased if extra latency is reduced.

In various embodiments of the present invention, extra safeguards can be incorporated into the scheme in order to make it more robust against measurement errors and noise. In an embodiment of the present invention, bandwidth is not reduced if there are less than 10 KB of data in the line. In an embodiment of the present invention, the number of bytes in the line can be estimated by $c-c_i$, where c is the current total number of bytes that were sent to the client up to that point in time and $c_i$ is the total number of bytes that were sent to the client at the time the current timestamp message was sent. In an embodiment of the present invention, if a bandwidth limit is already active it is never reduced by more than 50%.

The resulting feedback scheme leads to a transmission rate on the server side that constantly oscillates around the estimated sustained transfer bandwidth $b_{est}$. Usually oscillation frequency is higher if the total latency between server and client is lower. This is because timestamp messages return earlier at the server, and thus the server can adjust transmission rate more quickly. On higher latency connections oscillation frequency is lower, and amplitude of latency oscillation is greater. In various embodiments of the present invention, the overall behavior of the feedback scheme can be tuned by varying the different parameters. In practice, the values stated above turned out to work very well for different kinds of networks ranging from metropolitan area networks, domestic connections, and intercontinental lines.

Feedback scheme pseudo code:

```
if (e > e_max)
then
    if (number of bytes in line > threshold)
    then
        b_limit := max (Factor_1 * b_est, Factor_2 * b_limit)
    end
else
if (b_read > Factor_3 * b_limit)
then
    d := Factor_4 * b_limit * (e_max - e)/e_max
    b_limit := b_limit + d
end
```

Adjusting Compression Settings and Buffering

In an embodiment of the present invention, the server always stays responsive by limiting send bandwidth. In an embodiment of the present invention, if a large number of data files (e.g., images) are queued for transfer on the server, when the client requests a large data file (e.g., a new image) or some other information be delivered instantly, then this new data can be sent without significant extra delay as seen in FIG. 23.

In an embodiment of the present invention, a good estimate of transfer bandwidth also allows the application to dynamically adjust other settings to current network quality, like image compression settings. If network bandwidth is poor, the application can react to that occurrence. For a single-stream application, such as streaming a single video or audio channel, the compression ratio can simply be adjusted such that the resulting bandwidth is slightly under the available bandwidth, which combined with buffering yields the desired result.

In another embodiment of the present invention, in an interactive visualization application, adjustable lossy compression can be applied in a similar manner in order to achieve smooth interaction. Image quality might be degraded, but images can still be displayed very quickly. Higher quality versions of the images can be resent later and the view can be refined. It is not obvious though, how buffering can be applied, because the interaction is not known ahead of time.

An example for such an application is a client server system to display medical image studies. Medical image studies can consist of multiple images that can be organized in multiple series. It is desirable to be able to view these images in a multi-viewport layout on the client computer. As the user looks at a series of images, the user will interact with the images, e.g., scrolling, rotating panning or zooming. It is not known in advance, in which direction a user will scroll, or if multiple image series exist, which of these the user will look at first. The same is true for any other interaction with the scene, such as rotation of a 3D volume rendering.

Another embodiment of the present invention monitors the current user interaction and allows the application to anticipate the next views to be streamed. These views are then streamed to the client and buffered, so that they can be displayed without delay.

For example if a user looks at and interacts with a viewport displaying one image series ("Current Series"), images from that series will more likely be displayed next than images from other series. Thus these images will be streamed to a buffer on the client side first. The order is determined by the distance of images to the currently displayed image in the sorting order of the series: The closest image will be streamed first. The same concept applies to other types of displays and other types of interaction. For example if a 3D volume rendered view of a data set is shown and the user currently rotates the model about e.g. the X-axis, then from the current view, the next views can be anticipated and pre-streamed and buffered locally.

In another embodiment of the present invention, if the user stops rotating, then some views that may have been buffered already may need to be discarded from the buffer, but that is typically a small number compared to the whole sequence. In order to use these techniques in interactive applications, a high-degree of responsiveness is required to avoid lags when the user decides to change e.g. scrolling or rotation direction or starts interacting with another view port. This responsiveness is achieved by the adaptive bandwidth management as described above.

TABLE 1

Symbols and Meaning

| Symbol | Description |
| --- | --- |
| T | Server time in msec (since session was started) |
| C | Total number of bytes that were sent from server to client |
| $b_{send}$ | Send bandwidth at server |
| $b_{read}$ | Read bandwidth at client |
| $b_{est}$ | Estimate of sustained transfer bandwidth |
| $b_{limit}$ | Bandwidth limit on server side (send) |
| D | Difference between client and server time when TS arrives at client |
| E | Extra travel time for messages sent from server to client (delay) |

While the present invention has been described in some detail for purposes of clarity and understanding, one skilled in the art will appreciate that various changes in form and detail can be made without departing from the true scope of the invention. All figures, tables, and appendices, as well as patents, applications, and publications, referred to above, are hereby incorporated by reference.

Aspects of the Invention

In an embodiment of the invention, a method of identifying network latency comprising the steps of sending a request for image data from a client computer, including inserting a first timestamp message into the request for image data at an application level, transferring the request and the first timestamp message to a server using a standard Transmission Communications Protocol (TCP) connection, receiving the first timestamp message at the server, calculating a first time for the first timestamp message to be sent from the client computer to the server, sending one or more second timestamp messages from the server to the client computer, returning the one or more second timestamp messages from the client computer to the server, receiving the one or more second timestamp messages from the client computer at the server, calculating a second time and subsequent times taken for the one or more second timestamp messages to be sent from the client computer to the server, calculating an estimate of current network bandwidth based on one or more of the first time, the second time and the subsequent times and using the estimate of current network bandwidth to determine network latency.

In an embodiment of the invention, a method of identifying network latency comprising the steps of sending a request for image data from a client computer, including inserting a first timestamp message into the request for image data at an application level, transferring the request and the first timestamp message to a server using a standard Transmission Communications Protocol (TCP) connection, receiving the first timestamp message at the server, calculating a first time for the first timestamp message to be sent from the client computer to the server, sending one or more second timestamp messages from the server to the client computer, returning the one or more second timestamp messages from the client computer to the server, receiving the one or more second timestamp messages from the client computer at the server, calculating a second time and subsequent times taken for the one or more second timestamp messages to be sent from the client computer to the server, calculating an estimate of current network bandwidth based on one or more of the first time, the second time and the subsequent times and using the estimate of current network bandwidth to determine network latency, where the estimate of current network bandwidth is calculated from a difference between the first time and the second time or the second time and the subsequent times.

In an embodiment of the invention, a method of identifying network latency comprising the steps of sending a request for image data from a client computer, including inserting a first timestamp message into the request for image data at an application level, transferring the request and the first timestamp message to a server using a standard Transmission Communications Protocol (TCP) connection, receiving the first timestamp message at the server, calculating a first time for the first timestamp message to be sent from the client computer to the server, sending one or more second timestamp messages from the server to the client computer, returning the one or more second timestamp messages from the client computer to the server, receiving the one or more second timestamp messages from the client computer at the server, calculating a second time and subsequent times taken for the one or more second timestamp messages to be sent from the client computer to the server, calculating an estimate of current network bandwidth based on one or more of the first time, the second time and the subsequent times and using the estimate of current network bandwidth to determine network latency, where the estimate of current network bandwidth is compared with a minimum network bandwidth.

In an embodiment of the invention, a method of identifying network latency comprising the steps of sending a request for image data from a client computer, including inserting a first timestamp message into the request for image data at an application level, transferring the request and the first timestamp message to a server using a standard Transmission Communications Protocol (TCP) connection, receiving the first timestamp message at the server, calculating a first time for the first timestamp message to be sent from the client computer to the server, sending one or more second timestamp messages from the server to the client computer, returning the one or more second timestamp messages from the client computer to the server, receiving the one or more second timestamp messages from the client computer at the server, calculating a second time and subsequent times taken for the one or more second timestamp messages to be sent from the client computer to the server, calculating an estimate of current network bandwidth based on one or more of the first time, the second time and the subsequent times and using the estimate of current network bandwidth to determine network latency, where the estimate of current network bandwidth is compared with a minimum network bandwidth, further comprising refining the estimate of current network bandwidth based on a comparison.

In an embodiment of the invention, a method of identifying network latency comprising the steps of sending a request for image data from a client computer, including inserting a first timestamp message into the request for image data at an application level, transferring the request and the first timestamp message to a server using a standard Transmission Communications Protocol (TCP) connection, receiving the first timestamp message at the server, calculating a first time for the first timestamp message to be sent from the client computer to the server, sending one or more second timestamp messages from the server to the client computer, returning the one or more second timestamp messages from the client computer to the server, receiving the one or more second timestamp messages from the client computer at the server, calculating a second time and subsequent times taken for the one or more second timestamp messages to be sent from the client computer to the server, calculating an estimate of current network bandwidth based on one or more of the first time, the second time and the subsequent times and using the estimate of current network bandwidth to determine network latency, where information related to one or more of the first timestamp message and the one or more second timestamp messages is not included in the first timestamp message, where the information is stored in a first in first out queue, so that the information can be evaluated when the first timestamp message arrives back at the server.

In an embodiment of the invention, a method of identifying network latency comprising the steps of sending a request for image data from a client computer, including inserting a first timestamp message into the request for image data at an application level, transferring the request and the first timestamp message to a server using a standard Transmission Communications Protocol (TCP) connection, receiving the first timestamp message at the server, calculating a first time for the first timestamp message to be sent from the client computer to the server, sending one or more second timestamp messages from the server to the client computer, returning the one or more second timestamp messages from the client computer to the server, receiving the one or more second timestamp messages from the client computer at the server, calculating a second time and subsequent times taken for the one or more second timestamp messages to be sent from the client computer to the server, calculating an estimate of current network bandwidth based on one or more of the first time, the second time and the subsequent times and using the estimate of current network bandwidth to determine network latency, where one or more of the first timestamp message and the one or more second timestamp messages are used to compute read bandwidth (C/T), where $C=c_i-c_{i-1}$, where C is an amount of data C that was read in a time between a last two timestamp messages $(c_i, c_{i-1})$, and $T=t_i-t_{i-1}+d_i-d_{i-1}$, where $d_i$ and $d_{i-1}$ are client time and $t_i-t_{i-1}$ are server time in a last two incoming timestamp messages.

In an embodiment of the invention, a method of identifying network latency comprising the steps of sending a request for image data from a client computer, including inserting a first timestamp message into the request for image data at an application level, transferring the request and the first timestamp message to a server using a standard Transmission Communications Protocol (TCP) connection, receiving the first timestamp message at the server, calculating a first time for the first timestamp message to be sent from the client computer to the server, sending one or more second timestamp messages from the server to the client computer, returning the one or more second timestamp messages from the client computer to the server, receiving the one or more second timestamp messages from the client computer at the server, calculating a second time and subsequent times taken for the one or more second timestamp messages to be sent from the client computer to the server, calculating an estimate of current network bandwidth based on one or more of the first time, the second time and the subsequent times and using the estimate of current network bandwidth to determine network latency, where one or more of the first timestamp message and the one or more second timestamp messages are used to compute read bandwidth (C/T), where $C=c_i-c_{i-1}$, where C is an amount of data C that was read in a time between a last two timestamp messages $(c_i, c_{i-1})$, and $T=t_i-t_{i-1}+d_i-d_{i-1}$, where $d_i$ and $d_{i-1}$ are client time and $t_i-t_{i-1}$ are server time in a last two incoming timestamp messages, further comprising determining a running average, where samples of read bandwidth are combined into the running average.

In an embodiment of the invention, a method of identifying network latency comprising the steps of sending a request for image data from a client computer, including inserting a first timestamp message into the request for image data at an application level, transferring the request and the first timestamp message to a server using a standard Transmission Communications Protocol (TCP) connection, receiving the first timestamp message at the server, calculating a first time for the first timestamp message to be sent from the client computer to the server, sending one or more second timestamp messages from the server to the client computer, returning the one or more second timestamp messages from the client computer to the server, receiving the one or more second timestamp messages from the client computer at the server, calculating a second time and subsequent times taken for the one or more second timestamp messages to be sent from the client computer to the server, calculating an estimate of current network bandwidth based on one or more of the first time, the second time and the subsequent times and using the estimate of current network bandwidth to determine network latency, where one or more of the first timestamp message and the one or more second timestamp messages are used to compute read bandwidth (C/T), where $C=c_i-c_{i-1}$, where C is an amount of data C that was read in a time between a last two timestamp messages $(c_i, c_{i-1})$, and $T=t_i-t_{i-1}+d_i-d_{i-1}$, where $d_i$ and $d_{i-1}$ are client time and $t_i-t_{i-1}$ are server time in a last two incoming timestamp messages, further comprising determining a running average, where samples of read bandwidth are combined into the running average, where samples are excluded from the running average when send bandwidth is less than between a lower limit of approximately 20 percent of read bandwidth and an upper limit of approximately 40 percent of read bandwidth.

In an alternative embodiment of the present invention, a method of minimizing network latency comprises the steps of sending a request for image data from a client computer, including inserting one or more first timestamp messages into the request for image data at an application level, transferring the request and the one or more first timestamp messages to a server using a standard Transmission Communications Protocol (TCP) connection, receiving the one or more first timestamp messages at the server, calculating a first time for the one or more first timestamp messages sent from the client computer to the server, sending one or more second timestamp messages from the server to the client computer, sending the one or more second timestamp messages from the client computer to the server, receiving the one or more second timestamp messages from the client computer at the server, calculating a second time and subsequent times taken for the one or more second timestamp messages to be sent from the client computer to the server, calculating an estimate of current network bandwidth based on one or more of the first time, the second time and the subsequent times, determining situations where network latency will otherwise increase due to congestion and using the estimate of current network bandwidth to one or both reduce and modify client computer requests to minimize network latency.

In an alternative embodiment of the present invention, a method of minimizing network latency comprises the steps of sending a request for image data from a client computer, including inserting one or more first timestamp messages into the request for image data at an application level, transferring the request and the one or more first timestamp messages to a server using a standard Transmission Communications Protocol (TCP) connection, receiving the one or more first timestamp messages at the server, calculating a first time for the one or more first timestamp messages sent from the client computer to the server, sending one or more second timestamp messages from the server to the client computer, sending the one or more second timestamp messages from the client computer to the server, receiving the one or more second timestamp messages from the client computer at the server, calculating a second time and subsequent times taken for the one or more second timestamp messages to be sent from the client computer to the server, calculating an estimate of current network bandwidth based on one or more of the first time, the second time and the subsequent times, determining situations where network latency will otherwise increase due to congestion and using the estimate of current network bandwidth to one or both reduce and modify client computer requests to minimize network latency, where the estimate of current network bandwidth is calculated from a difference between the first time and the second time or the second time and the subsequent times.

In an alternative embodiment of the present invention, a method of minimizing network latency comprises the steps of sending a request for image data from a client computer, including inserting one or more first timestamp messages into the request for image data at an application level, transferring the request and the one or more first timestamp messages to a server using a standard Transmission Communications Protocol (TCP) connection, receiving the one or more first timestamp messages at the server, calculating a first time for the one or more first timestamp messages sent from the client computer to the server, sending one or more second timestamp messages from the server to the client computer, sending the one or more second timestamp messages from the client computer to the server, receiving the one or more second timestamp messages from the client computer at the server, calculating a second time and subsequent times taken for the one or more second timestamp messages to be sent from the client computer to the server, calculating an estimate of current network bandwidth based on one or more of the first time, the second time and the subsequent times, determining situations where network latency will otherwise increase due to congestion and using the estimate of current network bandwidth to one or both reduce and modify client computer requests to minimize network latency, where the estimate of current network bandwidth is compared with a minimum network bandwidth.

In an alternative embodiment of the present invention, a method of minimizing network latency comprises the steps of sending a request for image data from a client computer, including inserting one or more first timestamp messages into the request for image data at an application level, transferring the request and the one or more first timestamp messages to a server using a standard Transmission Communications Protocol (TCP) connection, receiving the one or more first timestamp messages at the server, calculating a first time for the one or more first timestamp messages sent from the client computer to the server, sending one or more second timestamp messages from the server to the client computer, sending the one or more second timestamp messages from the client computer to the server, receiving the one or more second timestamp messages from the client computer at the server, calculating a second time and subsequent times taken for the one or more second timestamp messages to be sent from the client computer to the server, calculating an estimate of current network bandwidth based on one or more of the first time, the second time and the subsequent times, determining situations where network latency will otherwise increase due to congestion and using the estimate of current network bandwidth to one or both reduce and modify client computer requests to minimize network latency, where the estimate of current network bandwidth is compared with a minimum network bandwidth, further comprising refining the estimate of current network bandwidth based on a comparison between times.

In an alternative embodiment of the present invention, a method of minimizing network latency comprises the steps of sending a request for image data from a client computer, including inserting one or more first timestamp messages into the request for image data at an application level, transferring the request and the one or more first timestamp messages to a server using a standard Transmission Communications Protocol (TCP) connection, receiving the one or more first timestamp messages at the server, calculating a first time for the one or more first timestamp messages sent from the client computer to the server, sending one or more second timestamp messages from the server to the client computer, sending the one or more second timestamp messages from the client computer to the server, receiving the one or more second timestamp messages from the client computer at the server, calculating a second time and subsequent times taken for the one or more second timestamp messages to be sent from the client computer to the server, calculating an estimate of current network bandwidth based on one or more of the first time, the second time and the subsequent times, determining situations where network latency will otherwise increase due to congestion and using the estimate of current network bandwidth to one or both reduce and modify client computer requests to minimize network latency, where information related to one or both the one or more first timestamp messages and the one or more second timestamp messages is not included in the one or more first timestamp messages and the one or more second timestamp messages, where the information is stored in a first in first out queue, so that the information can be evaluated when the one or more first timestamp messages and the one or more second timestamp messages arrives back at the server.

In an alternative embodiment of the present invention, a method of minimizing network latency comprises the steps of sending a request for image data from a client computer, including inserting one or more first timestamp messages into the request for image data at an application level, transferring the request and the one or more first timestamp messages to a server using a standard Transmission Communications Protocol (TCP) connection, receiving the one or more first timestamp messages at the server, calculating a first time for the one or more first timestamp messages sent from the client computer to the server, sending one or more second timestamp messages from the server to the client computer, sending the one or more second timestamp messages from the client computer to the server, receiving the one or more second timestamp messages from the client computer at the server, calculating a second time and subsequent times taken for the one or more second timestamp messages to be sent from the client computer to the server, calculating an estimate of current network bandwidth based on one or more of the first time, the second time and the subsequent times, determining situations where network latency will otherwise increase due to congestion and using the estimate of current network bandwidth to one or both reduce and modify client computer requests to minimize network latency, where information related to one or both the one or more first timestamp messages and the one or more second timestamp messages is not included in the one or more first timestamp messages and the one or more second timestamp messages, where the information is stored in a first in first out queue, so that the information can be evaluated when the one or more first timestamp messages and the one or more second timestamp messages arrives back at the server, where one or both the one or more first timestamp messages and the one or more second timestamp messages are used to compute read bandwidth (C/T), where $C=c_i-c_{i-1}$, where C is an amount of data C that was read in a time between a last two timestamp messages ($c_i$, $c_{i-1}$), and $T=t_i-t_{i-1}+d_i-d_{i-1}$ is the time elapsed on the client computer between the last two timestamp messages, where $t_i-t_{i-1}$ is the time elapsed on the server between the last two timestamp messages, and $d_i$ and $d_{i-1}$ are differences between client computer time and server time when the messages arrived at the client computer.

In an alternative embodiment of the present invention, a method of minimizing network latency comprises the steps of sending a request for image data from a client computer, including inserting one or more first timestamp messages into the request for image data at an application level, transferring the request and the one or more first timestamp messages to a server using a standard Transmission Communications Protocol (TCP) connection, receiving the one or more first timestamp messages at the server, calculating a first time for the one or more first timestamp messages sent from the client computer to the server, sending one or more second timestamp messages from the server to the client computer, sending the one or more second timestamp messages from the client computer to the server, receiving the one or more second timestamp messages from the client computer at the server, calculating a second time and subsequent times taken for the one or more second timestamp messages to be sent from the client computer to the server, calculating an estimate of current network bandwidth based on one or more of the first time, the second time and the subsequent times, determining situations where network latency will otherwise increase due to congestion and using the estimate of current network bandwidth to one or both reduce and modify client computer requests to minimize network latency, where information related to one or both the one or more first timestamp messages and the one or more second timestamp messages is not included in the one or more first timestamp messages and the one or more second timestamp messages, where the information is stored in a first in first out queue, so that the information can be evaluated when the one or more first timestamp messages and the one or more second timestamp messages arrives back at the server, where one or both the one or more first timestamp messages and the one or more second timestamp messages are used to compute read bandwidth (C/T), where $C=c_i-c_{i-1}$, where C is an amount of data C that was read in a time between a last two timestamp messages ($c_i$, $c_{i-1}$), and $T=t_i-t_{i-1}+d_i-d_{i-1}$ is the time elapsed on the client computer between the last two timestamp messages, where $t_i-t_{i-1}$ is the time elapsed on the server between the last two timestamp messages, and $d_i$ and $d_{i-1}$ are differences between client computer time and server time when the messages arrived at the client computer, further comprising determining a running average, where samples of read bandwidth are combined into the running average.

In an alternative embodiment of the present invention, a method of minimizing network latency comprises the steps of sending a request for image data from a client computer, including inserting one or more first timestamp messages into the request for image data at an application level, transferring the request and the one or more first timestamp messages to a server using a standard Transmission Communications Protocol (TCP) connection, receiving the one or more first timestamp messages at the server, calculating a first time for the one or more first timestamp messages sent from the client computer to the server, sending one or more second timestamp messages from the server to the client computer, sending the one or more second timestamp messages from the client computer to the server, receiving the one or more second timestamp messages from the client computer at the server, calculating a second time and subsequent times taken for the one or more second timestamp messages to be sent from the client computer to the server, calculating an estimate of current network bandwidth based on one or more of the first time, the second time and the subsequent times, determining situations where network latency will otherwise increase due to congestion and using the estimate of current network bandwidth to one or both reduce and modify client computer requests to minimize network latency, where information related to one or both the one or more first timestamp messages and the one or more second timestamp messages is not included in the one or more first timestamp messages and the one or more second timestamp messages, where the information is stored in a first in first out queue, so that the information can be evaluated when the one or more first timestamp messages and the one or more second timestamp messages arrives back at the server, where one or both the one or more first timestamp messages and the one or more second timestamp messages are used to compute read bandwidth (C/T), where $C=c_i-c_{i-1}$, where C is an amount of data C that was read in a time between a last two timestamp messages ($c_i$, $c_{i-1}$), and $T=t_i-t_{i-1}+d_i-d_{i-1}$ is the time elapsed on the client computer between the last two timestamp messages, where $t_i-t_{i-1}$ is the time elapsed on the server between the last two timestamp messages, and $d_i$ and $d_{i-1}$ are differences between client computer time and server time when the messages arrived at the client computer, further comprising determining a running average, where samples of read bandwidth are combined into the running average, where samples are excluded from the running average when send bandwidth is less than between a lower limit of approximately 130 percent of the read bandwidth measured at a time a timestamp message arrived at the client computer and an upper limit of approximately 140 percent of the estimate of current network bandwidth.

In an alternative embodiment of the present invention, a method of minimizing network latency comprises the steps of sending a request for image data from a client computer, including inserting one or more first timestamp messages into the request for image data at an application level, transferring the request and the one or more first timestamp messages to a server using a standard Transmission Communications Protocol (TCP) connection, receiving the one or more first timestamp messages at the server, calculating a first time for the one or more first timestamp messages sent from the client computer to the server, sending one or more second timestamp messages from the server to the client computer, sending the one or more second timestamp messages from the client computer to the server, receiving the one or more second timestamp messages from the client computer at the server, calculating a second time and subsequent times taken for the one or more second timestamp messages to be sent from the client computer to the server, calculating an estimate of current network bandwidth based on one or more of the first time, the second time and the subsequent times, determining situations where network latency will otherwise increase due to congestion and using the estimate of current network bandwidth to one or both reduce and modify client computer requests to minimize network latency, where information related to one or both the one or more first timestamp messages and the one or more second timestamp messages is not included in the one or more first timestamp messages and the one or more second timestamp messages, where the information is stored in a first in first out queue, so that the information can be evaluated when the one or more first timestamp messages and the one or more second timestamp messages arrives back at the server, where one or both the one or more first timestamp messages and the one or more second timestamp messages are used to compute read bandwidth (C/T), where $C=c_i-c_{i-1}$, where C is an amount of data C that was read in a time between a last two timestamp messages ($c_i$, $c_{i-1}$), and $T=t_i-t_{i-1}+d_i-d_{i-1}$ is the time elapsed on the client computer between the last two timestamp messages, where $t_i-t_{i-1}$ is the time elapsed on the server between the last two timestamp messages, and $d_i$ and $d_{i-1}$ are differences between client computer time and server time when the messages arrived at the client computer, further comprising determining a running average, where samples of read bandwidth are combined into the running average, where a bandwidth limit is applied on the server in order to avoid network delays, where the bandwidth limit is computed using a feedback scheme.

In an alternative embodiment of the present invention, a method of minimizing network latency comprises the steps of sending a request for image data from a client computer, including inserting one or more first timestamp messages into the request for image data at an application level, transferring the request and the one or more first timestamp messages to a server using a standard Transmission Communications Protocol (TCP) connection, receiving the one or more first timestamp messages at the server, calculating a first time for the one or more first timestamp messages sent from the client computer to the server, sending one or more second timestamp messages from the server to the client computer, sending the one or more second timestamp messages from the client computer to the server, receiving the one or more second timestamp messages from the client computer at the server, calculating a second time and subsequent times taken for the one or more second timestamp messages to be sent from the client computer to the server, calculating an estimate of current network bandwidth based on one or more of the first time, the second time and the subsequent times, determining situations where network latency will otherwise increase due to congestion and using the estimate of current network bandwidth to one or both reduce and modify client computer requests to minimize network latency, where information related to one or both the one or more first timestamp messages and the one or more second timestamp messages is not included in the one or more first timestamp messages and the one or more second timestamp messages, where the information is stored in a first in first out queue, so that the information can be evaluated when the one or more first timestamp messages and the one or more second timestamp messages arrives back at the server, where one or both the one or more first timestamp messages and the one or more second timestamp messages are used to compute read bandwidth (C/T), where $C=c_i-c_{i-1}$, where C is an amount of data C that was read in a time between a last two timestamp messages ($c_i$, $c_{i-1}$), and $T=t_i-t_{i-1}+d_i-d_{i-1}$ is the time elapsed on the client computer between the last two timestamp messages, where $t_i-t_{i-1}$ is the time elapsed on the server between the last two timestamp messages, and $d_i$ and $d_{i-1}$ are differences between client computer time and server time when the messages arrived at the client computer, further comprising determining a running average, where samples of read bandwidth are combined into the running average, where a bandwidth limit is applied on the server in order to avoid network delays, where the bandwidth limit is computed using a feedback scheme, where the feedback scheme uses a pseudo code.

In an alternative embodiment of the present invention, a method of minimizing network latency comprises the steps of sending a request for image data from a client computer, including inserting one or more first timestamp messages into the request for image data at an application level, transferring the request and the one or more first timestamp messages to a server using a standard Transmission Communications Protocol (TCP) connection, receiving the one or more first timestamp messages at the server, calculating a first time for the one or more first timestamp messages sent from the client computer to the server, sending one or more second timestamp messages from the server to the client computer, sending the one or more second timestamp messages from the client computer to the server, receiving the one or more second timestamp messages from the client computer at the server, calculating a second time and subsequent times taken for the one or more second timestamp messages to be sent from the client computer to the server, calculating an estimate of current network bandwidth based on one or more of the first time, the second time and the subsequent times, determining situations where network latency will otherwise increase due to congestion and using the estimate of current network bandwidth to one or both reduce and modify client computer requests to minimize network latency, where information related to one or both the one or more first timestamp messages and the one or more second timestamp messages is not included in the one or more first timestamp messages and the one or more second timestamp messages, where the information is stored in a first in first out queue, so that the information can be evaluated when the one or more first timestamp messages and the one or more second timestamp messages arrives back at the server, where one or both the one or more first timestamp messages and the one or more second timestamp messages are used to compute read bandwidth (C/T), where $C=c_i-c_{i-1}$, where C is an amount of data C that was read in a time between a last two timestamp messages ($c_i$, $c_{i-1}$), and $T=t_i-t_{i-1}+d_i-d_{i-1}$ is the time elapsed on the client computer between the last two timestamp messages, where $t_i-t_{i-1}$ is the time elapsed on the server between the last two timestamp messages, and $d_i$ and $d_{i-1}$ are differences between client computer time and server time when the messages arrived at the client computer, further comprising determining a running average, where samples of read bandwidth are combined into the running average, where a bandwidth limit is applied on the server in order to avoid network delays, where the bandwidth limit is computed using a feedback scheme, where the feedback scheme uses a pseudo code, where the pseudo code includes an expression

```
if (e > emax)
then
   if (number of bytes in line > threshold)
   then
      blimit := max(Factor1 * best, Factor2 * blimit)
   end
else
if (bread > Factor3 * blimit)
then
   d := Factor4 * blimit * (emax − e)/emax
   blimit := blimit + d
end.
```

In an alternative embodiment of the present invention, a method of minimizing network latency comprises the steps of sending a request for image data from a client computer, including inserting one or more first timestamp messages into the request for image data at an application level, transferring the request and the one or more first timestamp messages to a server using a standard Transmission Communications Protocol (TCP) connection, receiving the one or more first timestamp messages at the server, calculating a first time for the one or more first timestamp messages sent from the client computer to the server, sending one or more second timestamp messages from the server to the client computer, sending the one or more second timestamp messages from the client computer to the server, receiving the one or more second timestamp messages from the client computer at the server, calculating a second time and subsequent times taken for the one or more second timestamp messages to be sent from the client computer to the server, calculating an estimate of current network bandwidth based on one or more of the first time, the second time and the subsequent times, determining situations where network latency will otherwise increase due to congestion and using the estimate of current network bandwidth to one or both reduce and modify client computer requests to minimize network latency, where information related to one or both the one or more first timestamp messages and the one or more second timestamp messages is not included in the one or more first timestamp messages and the one or more second timestamp messages, where the information is stored in a first in first out queue, so that the information can be evaluated when the one or more first timestamp messages and the one or more second timestamp messages arrives back at the server, where one or both the one or more first timestamp messages and the one or more second timestamp messages are used to compute read bandwidth (C/T), where $C=c_i-c_{i-1}$, where C is an amount of data C that was read in a time between a last two timestamp messages ($c_i$, $c_{i-1}$), and $T=t_i-t_{i-1}+d_i-d_{i-1}$ is the time elapsed on the client computer between the last two timestamp messages, where $t_i-t_{i-1}$ is the time elapsed on the server between the last two timestamp messages, and $d_i$ and $d_{i-1}$ are differences between client computer time and server time when the messages arrived at the client computer, further comprising determining a running average, where samples of read bandwidth are combined into the running average, where a bandwidth limit is applied on the server in order to avoid network delays, where the bandwidth limit is computed using a feedback scheme, where the bandwidth limit is used to compute a lossy compression rate, where the lossy compression rate is calculated in order to achieve a desired interactive speed, where the feedback scheme uses a pseudo code, where the lossy compression rate is used to stream compressed images with a compression ratio, where the pseudo code includes an expression

```
if (e > emax)
then
   if (number of bytes in line > threshold)
   then
      blimit := max(Factor1 * best, Factor2 * blimit)
   end
else
if (bread > Factor3 * blimit)
then
   d := Factor4 * blimit * (emax − e)/emax
   blimit := blimit + d
end.
```

In an alternative embodiment of the present invention, a method of minimizing network latency comprises the steps of sending a request for image data from a client computer, including inserting one or more first timestamp messages into the request for image data at an application level, transferring the request and the one or more first timestamp messages to a server using a standard Transmission Communications Protocol (TCP) connection, receiving the one or more first timestamp messages at the server, calculating a first time for the one or more first timestamp messages sent from the client computer to the server, sending one or more second timestamp messages from the server to the client computer, sending the one or more second timestamp messages from the client computer to the server, receiving the one or more second timestamp messages from the client computer at the server, calculating a second time and subsequent times taken for the one or more second timestamp messages to be sent from the client computer to the server, calculating an estimate of current network bandwidth based on one or more of the first time, the second time and the subsequent times, determining situations where network latency will otherwise increase due to congestion and using the estimate of current network bandwidth to one or both reduce and modify client computer requests to minimize network latency, where information related to one or both the one or more first timestamp messages and the one or more second timestamp messages is not included in the one or more first timestamp messages and the one or more second timestamp messages, where the information is stored in a first in first out queue, so that the information can be evaluated when the one or more first timestamp messages and the one or more second timestamp messages arrives back at the server, where one or both the one or more first timestamp messages and the one or more second timestamp messages are used to compute read bandwidth (C/T), where $C=c_i-c_{i-1}$, where C is an amount of data C that was read in a time between a last two timestamp messages ($c_i$, $c_{i-1}$), and $T=t_i-t_{i-1}+d_i-d_{i-1}$ is the time elapsed on the client computer between the last two timestamp messages, where $t_i-t_{i-1}$ is the time elapsed on the server between the last two timestamp messages, and $d_i$ and $d_{i-1}$ are differences between client computer time and server time when the messages arrived at the client computer, further comprising determining a running average, where samples of read bandwidth are combined into the running average, where a bandwidth limit is applied on the server in order to avoid network delays, where the bandwidth limit is computed using a feedback scheme, where the bandwidth limit is used to compute a lossy compression rate, where the lossy compression rate is calculated in order to achieve a desired interactive speed, where the feedback scheme uses a pseudo code, where the lossy compression rate is used to stream compressed images with a compression ratio, where images are streamed to the client computer using a buffering system, where the pseudo code includes an expression

```
if (e > emax)
then
    if (number of bytes in line > threshold)
    then
        blimit := max(Factor1 * best, Factor2 * blimit)
    end
else
if (bread > Factor3 * blimit)
then
    d := Factor4 * blimit * (emax − e)/emax
    blimit := blimit + d
end.
```

In an alternative embodiment of the present invention, a method of minimizing network latency comprises the steps of sending a request for image data from a client computer, including inserting one or more first timestamp messages into the request for image data at an application level, transferring the request and the one or more first timestamp messages to a server using a standard Transmission Communications Protocol (TCP) connection, receiving the one or more first timestamp messages at the server, calculating a first time for the one or more first timestamp messages sent from the client computer to the server, sending one or more second timestamp messages from the server to the client computer, sending the one or more second timestamp messages from the client computer to the server, receiving the one or more second timestamp messages from the client computer at the server, calculating a second time and subsequent times taken for the one or more second timestamp messages to be sent from the client computer to the server, calculating an estimate of current network bandwidth based on one or more of the first time, the second time and the subsequent times, determining situations where network latency will otherwise increase due to congestion and using the estimate of current network bandwidth to one or both reduce and modify client computer requests to minimize network latency, where information related to one or both the one or more first timestamp messages and the one or more second timestamp messages is not included in the one or more first timestamp messages and the one or more second timestamp messages, where the information is stored in a first in first out queue, so that the information can be evaluated when the one or more first timestamp messages and the one or more second timestamp messages arrives back at the server, where one or both the one or more first timestamp messages and the one or more second timestamp messages are used to compute read bandwidth (C/T), where $C=c_i-c_{i-1}$, where C is an amount of data C that was read in a time between a last two timestamp messages ($c_i$, $c_{i-1}$), and $T=t_i-t_{i-1}+d_i-d_{i-1}$ is the time elapsed on the client computer between the last two timestamp messages, where $t_i-t_{i-1}$ is the time elapsed on the server between the last two timestamp messages, and $d_i$ and $d_{i-1}$ are differences between client computer time and server time when the messages arrived at the client computer, further comprising determining a running average, where samples of read bandwidth are combined into the running average, where a bandwidth limit is applied on the server in order to avoid network delays, where the bandwidth limit is computed using a feedback scheme, where the bandwidth limit is used to compute a lossy compression rate, where the lossy compression rate is calculated in order to achieve a desired interactive speed, where the feedback scheme uses a pseudo code, where the lossy compression rate is used to stream compressed images with a compression ratio, where images are streamed to the client computer using a buffering system, where the buffering system is based on monitoring user interaction and anticipating a next image that will be requested by the client computer, where the pseudo code includes an expression

```
if (e > emax)
then
    if (number of bytes in line > threshold)
    then
        blimit := max(Factor1 * best, Factor2 * blimit)
    end
else
if (bread > Factor3 * blimit)
then
    d := Factor4 * blimit * (emax − e)/emax
    blimit := blimit + d
end.
```

In an alternative embodiment of the present invention, a method of minimizing network latency comprises the steps of sending a request for image data from a client computer, including inserting one or more first timestamp messages into the request for image data at an application level, transferring the request and the one or more first timestamp messages to a server using a standard Transmission Communications Protocol (TCP) connection, receiving the one or more first timestamp messages at the server, calculating a first time for the one or more first timestamp messages sent from the client computer to the server, sending one or more second timestamp messages from the server to the client computer, sending the one or more second timestamp messages from the client computer to the server, receiving the one or more second timestamp messages from the client computer at the server, calculating a second time and subsequent times taken for the one or more second timestamp messages to be sent from the client computer to the server, calculating an estimate of current network bandwidth based on one or more of the first time, the second time and the subsequent times, determining situations where network latency will otherwise increase due to congestion and using the estimate of current network bandwidth to one or both reduce and modify client computer requests to minimize network latency, where information related to one or both the one or more first timestamp messages and the one or more second timestamp messages is not included in the one or more first timestamp messages and the one or more second timestamp messages, where the information is stored in a first in first out queue, so that the information can be evaluated when the one or more first timestamp messages and the one or more second timestamp messages arrives back at the server, where one or both the one or more first timestamp messages and the one or more second timestamp messages are used to compute read bandwidth (C/T), where $C=c_i-c_{i-1}$, where C is an amount of data C that was read in a time between a last two timestamp messages ($c_i$, $c_{i-1}$), and $T=t_i-t_{i-1}+d_i-d_{i-1}$ is the time elapsed on the client computer between the last two timestamp messages, where $t_i-t_{i-1}$ is the time elapsed on the server between the last two timestamp messages, and $d_i$ and $d_{i-1}$ are differences between client computer time and server time when the messages arrived at the client computer, further comprising determining a running average, where samples of read bandwidth are combined into the running average, where a bandwidth limit is applied on the server in order to avoid network delays, where the bandwidth limit is computed using a feedback scheme, where the bandwidth limit is used to compute a lossy compression rate, where the lossy compression rate is calculated in order to achieve a desired interactive speed, where the feedback scheme uses a pseudo code, where the lossy compression rate is used to stream compressed images with a compression ratio, where images are streamed to the client computer using a buffering system, where the buffering system is based on monitoring user interaction and anticipating a next image that will be requested by the client computer, where the bandwidth limit is used to compute the lossy compression rate, where the lossy compression rate is used to calculate a compression ratio, where one or more compressed images are streamed with the compression ratio, where a target compression quality is defined by a user, where a first image is streamed with a first compression quality, where the first compression quality minimizes network latency during interaction based on bandwidth monitoring and where the first image is streamed with a second compression quality when the user stops interacting, where the second compression quality is greater than the first compression quality if the first compression quality is lower than a target compression quality, where the pseudo code includes an expression

```
        then
            if (number of bytes in line > threshold)
            then
                blimit := max(Factor1 * best, Factor2 * blimit)
            end
        else
        if (bread > Factor3 * blimit)
        then
            d := Factor4 * blimit * (emax - e)/emax
            blimit := blimit + d
    end.
```

In an alternative embodiment of the present invention, a method of minimizing network latency comprises the steps of sending a request for image data from a client computer, including inserting one or more first timestamp messages into the request for image data at an application level, transferring the request and the one or more first timestamp messages to a server using a standard Transmission Communications Protocol (TCP) connection, receiving the one or more first timestamp messages at the server, calculating a first time for the one or more first timestamp messages sent from the client computer to the server, sending one or more second timestamp messages from the server to the client computer, sending the one or more second timestamp messages from the client computer to the server, receiving the one or more second timestamp messages from the client computer at the server, calculating a second time and subsequent times taken for the one or more second timestamp messages to be sent from the client computer to the server, calculating an estimate of current network bandwidth based on one or more of the first time, the second time and the subsequent times, determining situations where network latency will otherwise increase due to congestion and using the estimate of current network bandwidth to one or both reduce and modify client computer requests to minimize network latency, where information related to one or both the one or more first timestamp messages and the one or more second timestamp messages is not included in the one or more first timestamp messages and the one or more second timestamp messages, where the information is stored in a first in first out queue, so that the information can be evaluated when the one or more first timestamp messages and the one or more second timestamp messages arrives back at the server, where one or both the one or more first timestamp messages and the one or more second timestamp messages are used to compute read bandwidth (C/T), where $C=c_i-c_{i-1}$, where C is an amount of data C that was read in a time between a last two timestamp messages ($c_i$, $c_{i-1}$), and $T=t_i-t_{i-1}+d_i-d_{i-1}$ is the time elapsed on the client computer between the last two timestamp messages, where $t_i-t_{i-1}$ is the time elapsed on the server between the last two timestamp messages, and $d_i$ and $d_{i-1}$ are differences between client computer time and server time when the messages arrived at the client computer, further comprising determining a running average, where samples of read bandwidth are combined into the running average, where a bandwidth limit is applied on the server in order to avoid network delays, where the bandwidth limit is computed using a feedback scheme, where the bandwidth limit is used to compute a lossy compression rate, where the lossy compression rate is calculated in order to achieve a desired interactive speed, where the feedback scheme uses a pseudo code, where the lossy compression rate is used to stream compressed images with a compression ratio, where images are streamed to the client computer using a buffering system, where the buffering system is based on monitoring user interaction and anticipating a next image that will be requested by the client computer, where the bandwidth limit is used to compute the lossy compression rate, where the lossy compression rate is used to calculate a compression ratio, where one or more compressed images are streamed with the compression ratio, where the pseudo code includes an expression

```
        if (e > emax)
        then
            if (number of bytes in line > threshold)
            then
                blimit := max(Factor1 * best, Factor2 * blimit)
            end
        else
        if (bread > Factor3 * blimit)
        then
            d := Factor4 * blimit * (emax - e)/emax
            blimit := blimit + d
    end.
```

In an alternative embodiment of the present invention, a method of minimizing network latency comprises the steps of sending a request for image data from a client computer, including inserting one or more first timestamp messages into the request for image data at an application level, transferring the request and the one or more first timestamp messages to a server using a standard Transmission Communications Protocol (TCP) connection, receiving the one or more first timestamp messages at the server, calculating a first time for the one or more first timestamp messages sent from the client computer to the server, sending one or more second timestamp messages from the server to the client computer, sending the one or more second timestamp messages from the client computer to the server, receiving the one or more second timestamp messages from the client computer at the server, calculating a second time and subsequent times taken for the one or more second timestamp messages to be sent from the client computer to the server, calculating an estimate of current network bandwidth based on one or more of the first time, the second time and the subsequent times, determining situations where network latency will otherwise increase due to congestion and using the estimate of current network bandwidth to one or both reduce and modify client computer requests to minimize network latency, where information related to one or both the one or more first timestamp messages and the one or more second timestamp messages is not included in the one or more first timestamp messages and the one or more second timestamp messages, where the information is stored in a first in first out queue, so that the information can be evaluated when the one or more first timestamp messages and the one or more second timestamp messages arrives back at the server, where one or both the one or more first timestamp messages and the one or more second timestamp messages are used to compute read bandwidth (C/T), where $C=c_i-c_{i-1}$, where C is an amount of data C that was read in a time between a last two timestamp messages ($c_i$, $c_{i-1}$), and $T=t_i-t_{i-1}+d_i-d_{i-1}$ is the time elapsed on the client computer between the last two timestamp messages, where $t_i-t_{i-1}$ is the time elapsed on the server between the last two timestamp messages, and $d_i$ and $d_{i-1}$ are differences between client computer time and server time when the messages arrived at the client computer, further comprising determining a running average, where samples of read bandwidth are combined into the running average, where a bandwidth limit is applied on the server in order to avoid network delays, where the bandwidth limit is computed using a feedback scheme, where the bandwidth limit is used to compute a lossy compression rate, where the lossy compression rate is calculated in order to achieve a desired interactive speed, where the feedback scheme uses a pseudo code, where the lossy compression rate is used to stream compressed images with a compression ratio, where images are streamed to the client computer using a buffering system, where the buffering system is based on monitoring user interaction and anticipating a next image that will be requested by the client computer, where the bandwidth limit is used to compute the lossy compression rate, where the pseudo code includes an expression

```
    if (e > emax)
    then
        if (number of bytes in line > threshold)
        then
            blimit := max(Factor1 * best, Factor2 * blimit)
        end
    else
    if (bread > Factor3 * blimit)
    then
```

-continued

```
        d := Factor4 * blimit * (emax − e)/emax
        blimit := blimit + d
    end.
```

In an alternative embodiment of the present invention, a method of minimizing network latency comprises the steps of sending a request for image data from a client computer, including inserting one or more first timestamp messages into the request for image data at an application level, transferring the request and the one or more first timestamp messages to a server using a standard Transmission Communications Protocol (TCP) connection, receiving the one or more first timestamp messages at the server, calculating a first time for the one or more first timestamp messages sent from the client computer to the server, sending one or more second timestamp messages from the server to the client computer, sending the one or more second timestamp messages from the client computer to the server, receiving the one or more second timestamp messages from the client computer at the server, calculating a second time and subsequent times taken for the one or more second timestamp messages to be sent from the client computer to the server, calculating an estimate of current network bandwidth based on one or more of the first time, the second time and the subsequent times, determining situations where network latency will otherwise increase due to congestion and using the estimate of current network bandwidth to one or both reduce and modify client computer requests to minimize network latency, where information related to one or both the one or more first timestamp messages and the one or more second timestamp messages is not included in the one or more first timestamp messages and the one or more second timestamp messages, where the information is stored in a first in first out queue, so that the information can be evaluated when the one or more first timestamp messages and the one or more second timestamp messages arrives back at the server, where one or both the one or more first timestamp messages and the one or more second timestamp messages are used to compute read bandwidth (C/T), where $C=c_i-c_{i-1}$, where C is an amount of data C that was read in a time between a last two timestamp messages ($c_i$, $c_{i-1}$), and $T=t_i-t_{i-1}+d_i-d_{i-1}$ is the time elapsed on the client computer between the last two timestamp messages, where $t_i-t_{i-1}$ is the time elapsed on the server between the last two timestamp messages, and $d_i$ and $d_{i-1}$ are differences between client computer time and server time when the messages arrived at the client computer, further comprising determining a running average, where samples of read bandwidth are combined into the running average, where a bandwidth limit is applied on the server in order to avoid network delays, where the bandwidth limit is computed using a feedback scheme, where the bandwidth limit is used to compute a lossy compression rate, where the lossy compression rate is calculated in order to achieve a desired interactive speed, where the feedback scheme uses a pseudo code, where the pseudo code includes an expression

```
    if (e > emax)
    then
        if (number of bytes in line > threshold)
        then
            blimit := max(Factor1 * best, Factor2 * blimit)
        end
    else
```

```
        if (bread > Factor3 * blimit)
        then
            d := Factor4 * blimit * (emax – e)/emax
            blimit := blimit + d
    end.
```

In an alternative embodiment of the present invention, a method of minimizing network latency comprises the steps of sending a request for image data from a client computer, including inserting one or more first timestamp messages into the request for image data at an application level, transferring the request and the one or more first timestamp messages to a server using a standard Transmission Communications Protocol (TCP) connection, receiving the one or more first timestamp messages at the server, calculating a first time for the one or more first timestamp messages sent from the client computer to the server, sending one or more second timestamp messages from the server to the client computer, sending the one or more second timestamp messages from the client computer to the server, receiving the one or more second timestamp messages from the client computer at the server, calculating a second time and subsequent times taken for the one or more second timestamp messages to be sent from the client computer to the server, calculating an estimate of current network bandwidth based on one or more of the first time, the second time and the subsequent times, determining situations where network latency will otherwise increase due to congestion and using the estimate of current network bandwidth to one or both reduce and modify client computer requests to minimize network latency, where information related to one or both the one or more first timestamp messages and the one or more second timestamp messages is not included in the one or more first timestamp messages and the one or more second timestamp messages, where the information is stored in a first in first out queue, so that the information can be evaluated when the one or more first timestamp messages and the one or more second timestamp messages arrives back at the server, where one or both the one or more first timestamp messages and the one or more second timestamp messages are used to compute read bandwidth (C/T), where $C=c_i-c_{i-1}$, where C is an amount of data C that was read in a time between a last two timestamp messages ($c_i$, $c_{i-1}$), and $T=t_i-t_{i-1}+d_i-d_{i-1}$ is the time elapsed on the client computer between the last two timestamp messages, where $t_i-t_{i-1}$ is the time elapsed on the server between the last two timestamp messages, and $d_i$ and $d_{i-1}$ are differences between client computer time and server time when the messages arrived at the client computer, further comprising determining a running average, where samples of read bandwidth are combined into the running average, where a bandwidth limit is applied on the server in order to avoid network delays, where the bandwidth limit is computed using a feedback scheme, where the bandwidth limit is used to compute a lossy compression rate, where the feedback scheme uses a pseudo code, where the pseudo code includes an expression

```
        if (e > emax)
        then
            if (number of bytes in line > threshold)
            then
                blimit := max(Factor1 * best, Factor2 * blimit)
            end
        else
            if (bread > Factor3 * blimit)
            then
                d := Factor4 * blimit * (emax – e)/emax
                blimit := blimit + d
        end.
```

What is claimed is:

1. A system for rendering images comprising:
   a) a render server program;
   b) a server memory;
   c) a server digital data processor; and
   d) one or more graphics processing units, where the render server program responds to a first render request of a first client, where the first render request is a first three dimensional (3D) volume rendering of a first data set located on the server memory to generate a first View, where the render server program divides the first data set into a first 3D sub-volume and a second 3D sub-volume, the render server program executes two or more first render commands to render independently the first 3D sub-volume and the second 3D sub-volume with the one or more graphics processing units, where the rendered first 3D sub-volume and the rendered second 3D sub-volume corresponding to the first View are stored in a first cache, where the render server program responds to a second render request from the first client, where the second render request is a second volume rendering of the first data set to generate a second View, where the render server program divides the first data set into a third 3D sub-volume and a fourth 3D sub-volume, where the third 3D sub-volume corresponds with the first 3D sub-volume, where the render server program executes one or more second render commands to render the fourth 3D sub-volume with the one or more graphics processing units, where the rendered fourth 3D sub-volume and the rendered first 3D sub-volume stored in the first cache are used to reassemble a 3D volume with only the information in the first data set, where the 3D volume is used to generate the second View.

2. The system of claim 1, where the render server program resides in the server memory.

3. The system of claim 1, where the first cache is accessible by the server digital data processor.

4. The system of claim 1, where the first cache is accessible by the first client.

5. The system of claim 1, where the first cache resides on the server memory.

6. The system of claim 1, where the second View is stored in a second cache.

7. The system of claim 6, where the second cache resides in the server memory.

8. The system of claim 6, where the second cache is located in the first cache.

9. The system of claim 1, where the first cache is selected from the group consisting of server cache, bus cache and AGP cache.

10. The system of claim 1, where the first data set is generated by a device selected from the group consisting of a computer tomographic scanner (CT), a magnetic resonance imaging scanner (MRI), a confocal microscope, an ultrasound device, a positron emission tomographic scanner (PET), an x-ray scanner and other imaging devices.

11. The system of claim 10, where the first cache is selected from the group consisting of server cache, bus cache and AGP cache.

12. A system for rendering images comprising:
a) a render server program;
b) a server digital data processor; and
c) one or more graphics processing units, where the render server program responds to a first render request of a first client, where the first render request is a first three dimensional (3D) volume rendering of a first data set to generate a first View, where the render server program divides the first data set into a first 3D sub-volume and a second 3D sub-volume, the render server program executes two or more first render commands to render independently the first 3D sub-volume and the second 3D sub-volume with the one or more graphics processing units, where the rendered first 3D sub-volume and the rendered second 3D sub-volume corresponding to the first View are stored in a first cache, where the render server program responds to a second render request from the first client, where the second render request is a second volume rendering of the first data set to generate a second View, where the render server program divides the first data set into a third 3D sub-volume and a fourth 3D sub-volume, where the third 3D sub-volume corresponds with the first 3D sub-volume, where the render server program executes one or more second render commands to render the fourth 3D sub-volume with the one or more graphics processing units, where the rendered fourth 3D sub-volume and the rendered first 3D sub-volume stored in the first cache are used to reassemble a 3D volume with only the information in the first data set, where the 3D volume is used to generate the second View.

13. The system of claim 12, where the render server program resides in a memory accessible to the server digital data processor.

14. The system of claim 13, where the first cache resides on the memory.

15. The system of claim 12, where the first cache is accessible by the server digital data processor.

16. The system of claim 12, where the first cache is accessible by the first client.

17. The system of claim 12, where the first data set is generated by a device selected from the group consisting of a computer tomographic scanner (CT), a magnetic resonance imaging scanner (MRI), a confocal microscope, an ultrasound device, a positron emission tomographic scanner (PET), an x-ray scanner and other imaging devices.

18. A system for rendering images comprising:
a) a render server program;
b) a server memory;
c) a server digital data processor; and
d) one or more graphics processing units, where the render server program responds to a first render request of a first client, where the first render request is a high-resolution three dimensional (3D) volume rendering of a first data set to generate a first View, where the render server program divides the first data set into a first 3D sub-volume and a second 3D sub-volume, the render server program executes two or more first render commands to render independently the first 3D sub-volume and the second 3D sub-volume with the one or more graphics processing units, where the rendered first 3D sub-volume and the rendered second 3D sub-volume corresponding to the first View are stored in a first cache, where the render server program responds to a second render request from the first client, where the second render request is a low resolution 3D volume rendering of the first data set to generate a second View, where the render server program divides the first data set into a third 3D sub-volume and a fourth 3D sub-volume, where the third 3D sub-volume corresponds to a low resolution rendering of the high resolution rendered first 3D sub-volume, where the render server program executes one or more second render commands to render the 3D fourth sub-volume with the one or more graphics processing units, where the high resolution data stored in the first cache is used to generate the low resolution rendering of the third 3D sub-volume, where the rendered fourth 3D sub-volume and the generated rendered third 3D sub-volume are used to reassemble a 3D volume with only the information in the first data set, where the 3D volume is used to generate the second View.

19. The system of claim 18, where the first cache resides on the server memory.

20. The system of claim 18, where the second View is stored in a second cache.

* * * * *